(12) United States Patent
Qi et al.

(10) Patent No.: US 11,421,095 B2
(45) Date of Patent: Aug. 23, 2022

(54) METHODS OF RECYCLING AND RESHAPING THERMOSETTING POLYMERS AND COMPOSITES THEREOF

(71) Applicant: Georgia Tech Research Corporation, Atlanta, GA (US)

(72) Inventors: Hang Qi, Atlanta, GA (US); Kai Yu, Atlanta, GA (US); Qian Shi, Atlanta, GA (US); Xiao Kuang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 105 days.

(21) Appl. No.: 17/089,401

(22) Filed: Nov. 4, 2020

(65) Prior Publication Data
US 2021/0087353 A1    Mar. 25, 2021

Related U.S. Application Data

(62) Division of application No. 16/314,549, filed as application No. PCT/US2017/040596 on Jul. 3, 2017, now Pat. No. 10,829,612.

(60) Provisional application No. 62/357,642, filed on Jul. 1, 2016.

(51) Int. Cl.
| | | |
|---|---|---|
| C08J 11/24 | (2006.01) | |
| C08F 4/16 | (2006.01) | |
| C08G 63/195 | (2006.01) | |
| C08J 5/12 | (2006.01) | |
| C08J 5/24 | (2006.01) | |
| C08K 5/103 | (2006.01) | |
| C08K 7/14 | (2006.01) | |

(52) U.S. Cl.
CPC ............... $C08J\ 11/24$ (2013.01); $C08F\ 4/16$ (2013.01); $C08G\ 63/195$ (2013.01); $C08J\ 5/121$ (2013.01); $C08J\ 5/24$ (2013.01); $C08K\ 5/103$ (2013.01); $C08K\ 7/14$ (2013.01); $C08J\ 2363/00$ (2013.01); $C08J\ 2367/06$ (2013.01)

(58) Field of Classification Search
USPC .................................................. 521/48.4, 49
See application file for complete search history.

(56) References Cited

U.S. PATENT DOCUMENTS

2019/0001532 A1*  1/2019  Guha ..................... C01B 32/05

* cited by examiner

*Primary Examiner* — Terressa Boykin
(74) *Attorney, Agent, or Firm* — Thomas | Horstemeyer, LLP

(57) ABSTRACT

Various methods of reshaping and recycling thermoset polymers and composites containing thermoset polymers are provided. The methods involve the bond exchange reaction of exchangeable covalent bonds in the polymer matrix with a suitable small molecule solvent in the presence of a catalyst. In some aspects, the methods are applied to a carbon fiber reinforced polymer or a thermoset polymer where the thermoset polymer matrix includes a plurality of ester bonds. Using a small molecule alcohol, the methods provide for recycling one or both of the carbon fiber and the polymer, for welding two surfaces, or for repairing a damaged surface in the materials.

20 Claims, 50 Drawing Sheets

METHODS OF RECYCLING AND RESHAPING THERMOSETTING POLYMERS AND COMPOSITES THEREOF

CROSS-REFERENCE TO RELATED APPLICATIONS

This application is a divisional application of U.S. non-provisional application Ser. No. 16/314,549, filed on Dec. 31, 2018, which claims priority to, and the benefit of U.S. provisional application Ser. No. 62/357,642, filed Jul. 1, 2016.

STATEMENT REGARDING FEDERALLY SPONSORED RESEARCH OR DEVELOPMENT

This invention was made with government support under award CMMI-1404627 awarded by the National Science Foundation. The government has certain rights in the invention.

TECHNICAL FIELD

The present disclosure generally relates to crosslinked polymers and polymer composites and methods of processing crosslinked polymers and polymer composites, and more particularly to methods of recycling and reshaping thermosetting polymers and composites containing thermosetting polymers.

BACKGROUND

Thermosetting polymers are a group of polymers extensively used in a variety of high-temperature applications, such as coatings, adhesives, composites, electrical insulators and car bodies. See, e.g. the various discussions in Epoxy Polymers. 2010, Wiley-VCH Verlag GmbH & Co. KGaA. They generally exhibit better thermomechanical properties and chemical resistance than thermoplastic materials due to their chemically crosslinked nature. However, reshaping and recycling these materials is inherently difficult; reprocessing thermosetting polymer waste can lead to both environmental and economic issues.

Thermosetting polymers are also used in a variety of composite materials. For example, carbon fiber reinforced polymer (CFRP) composites, with their superior combination of stiffness, strength, and light weight, have been leading contenders in various applications ranging from aerospace to ground transportation to sporting goods. With the increasing amount of CFRPs being used, their waste materials, including off-cuts during manufacture and end-of-life components, are reaching a significant level, which has raised environmental and economic awareness for the need to recycle the CFRP waste. Fully recycling CFRP composites involves the recycling of both the polymer matrix and the carbon fibers. This presents some significant challenges.

First, the thermosetting polymers that are routinely applied as binders in the composite system are difficult to recycle. Second, complete recycling of CFRPs requires stripping away the polymer to reclaim the embedded fibers, as the high performance reinforcement is the most expensive part in CFRP. Currently, a variety of technologies have been investigated, which can be classified into two categories: mechanical recycling and thermo-chemical recycling.

The mechanical recycling of CFRPs involves mechanical comminution on the composite by shredding, crushing, milling, or other similar mechanical process The resulting scrap pieces can then be segregated by sieving into powdered products (rich in thermoset powder) and fibrous products (rich in fibers). Typical applications for mechanically-recycled composites include their re-incorporation in new composites as filler and use in the construction industry (e.g. as fillers for artificial woods or asphalt). However, these products represent low-value applications because mechanical recycling does not recover individual carbon fibers.

For more efficient fiber reclamation, thermo-chemical recycling techniques are routinely applied, using thermal (e.g. pyrolysis) or chemical processes to break down the thermoset matrix. For example, in the previous work of Jiang and Rudd et al., the epoxy resin matrix was oxidized into gas products, light aliphatic hydrocarbons and aromatic hydrocarbons at 550° C. Clean carbon fiber was then elutriated with about 80% of the original strength. A similar thermal oxidative process was used by Jody et al. where the recycled fibers retained 95% of the modulus and 50% of the original strength. Some other recycling techniques in this realm rely on the use of supercritical chemicals to dissolve the polymer matrix. For example, Liu et al. used nitric acid to break down epoxy fiber composite at 90° C. for 20-100 h. The loss of tensile strength was about 1.1%. Pinero-Hernanz et al. used supercritical water to recycle carbon fiber/epoxy resin composites. The recycling was conducted at a temperature of 250-400° C., a pressure of 4-27.0 M Pa and a reaction time of 1-30 min. The removal of epoxy was about 95% with the addition of catalysts in the supercritical water. The tensile strength of the recycled fiber was reduced to 90-98% of the virgin fiber. The carbon fibers are vulnerable to length shorting and property degradation in the aforementioned recycling methods. The thermo-chemical recycling techniques usually involve the use of supercritical chemicals, which are inconvenient to handle, and economically unfavorable in large scale engineering applications. Besides, during the recycling, only the carbon fibers are reclaimed while the polymer matrix is sacrificed without recovering useful chemicals. This issue has limited the application of a recycling technique, especially when the composites are manufactured in combination with other materials.

The recent development of reversible networks provides exciting opportunities for reshaping and recycling thermoset polymers. For example, the so-called covalent adaptable networks (CANs), or dynamic covalent networks (DCNs), can alter the arrangement of network connections by bond exchange reactions (BERs). See, e.g. Bowman, C. N. and C. J. Kloxin, Angewandte Chemie-International Edition, 2012. 51(18): p. 4272-4274; Kloxin, C. J., et al., Macromolecules, 2010. 43(6): p. 2643-2653; Long, R., et al., Journal of the Mechanics and Physics of Solids, 2013. 61(11): p. 2212-2239; Wojtecki, R. J., et al., Nature Materials, 2011. 10(1): p. 14-27; and Rowan, S. J., et al., Angewandte Chemie-International Edition, 2002. 41(6): p. 898-952.

However, most of the existing CAN polymers require some special processing conditions that are inconvenient in practical applications (Taynton et al., Adv. Mater., 28: 2904-2909). For example, during the surface welding of the aforementioned CANs, an external pressure ranging from hundreds to thousands of kPas is usually preferred to gain a good contact on the interface. A welding pressure is also desired to reprocess and recycle thermosetting polymers from the powder state, where numerous interfaces are involved. Additionally, in some CAN systems such as DGEBA epoxy-fatty acid, the concentration of interfacial active groups would decay when idling in the atmosphere via oxidation or self-annihilation, which consequently requires special treatment (e.g. additional cutting or polish) on the surface in order to regain sufficient active groups for welding.

There remains a need for improved methods of recycling and reshaping of thermosetting polymers and composites containing thermosetting polymers that overcome the aforementioned deficiencies.

Furthermore, there remains a need for improved methods of recycling and reshaping of carbon fiber composites that overcome the aforementioned deficiencies.

In addition, there remains a need for improved recycled thermosetting polymers and composites thereof that overcome the aforementioned deficiencies.

In particular, there remains a need for improved recycled carbon fibers and recycled carbon fiber composites that overcome the aforementioned deficiencies.

SUMMARY

In various aspects, methods are provided that overcome one or more of the aforementioned problems. Methods are provided for repairing a thermoset polymer or a composite thereof. Methods are also provided for welding a surface of a thermoset polymer or a composite thereof to a different surface containing the thermoset polymer or a composite thereof. Methods of recycling thermoset polymers and composites thereof are also provided. The methods can allow for the recovery of one or both of the thermoset polymer and the reinforcing material.

In various aspects, methods are provided for recycling a carbon fiber reinforced polymer. The carbon fiber reinforced polymer can include (i) a thermoset polymer matrix having a plurality of ester bonds and (ii) carbon fiber dispersed within the thermoset polymer matrix. The methods can include washing the carbon fiber reinforced polymer in a small molecule alcohol in the presence of a catalyst at a first elevated temperature for a first period of time sufficient to dissolve the thermoset polymer matrix and reclaim the carbon fiber; wherein the small molecule alcohol has a boiling point above a bond exchange reaction (BER) activation temperature for the plurality of ester bonds; and wherein the boiling point of the small molecule alcohol is below a thermal decomposition temperature of the carbon fiber. The methods can also include evaporating the small molecule alcohol at a second elevated temperature for a second period of time to re-polymerize the thermoset polymer matrix. In some aspects, the method further includes recombining the small molecule alcohol and the reclaimed carbon fiber prior to the evaporating step, wherein the re-polymerizing of the thermoset polymer matrix produces a recycled carbon fiber reinforced polymer including (i) the thermoset polymer matrix having the plurality of ester bonds and (ii) the reclaimed carbon fiber dispersed within the thermoset polymer matrix.

In various aspects, methods are provided for recycling a thermoset polymer or a composite thereof, wherein the thermoset polymer or composite thereof includes a thermoset polymer matrix having a plurality of ester bonds. The method can include washing the thermoset polymer or a composite thereof in a small molecule alcohol in the presence of a catalyst at a first elevated temperature for a first period of time sufficient to dissolve the thermoset polymer matrix; and evaporating the small molecule alcohol at a second elevated temperature for a second period of time to re-polymerize the thermoset polymer matrix; wherein the small molecule alcohol has a boiling point above a bond exchange reaction (BER) activation temperature for the plurality of ester bonds. In some aspects, a composite is recycled, and the methods include reclaiming the reinforcing material from the thermoset polymer matrix prior to re-polymerizing the thermoset polymer matrix.

In various aspects, methods are provided for repairing a surface of a thermoset polymer or a composite thereof. The thermoset polymer or composite thereof can include a thermoset polymer matrix having a plurality of ester bonds, and the surface can have an imperfection. The methods can include (A) applying a powder of the thermoset polymer to the surface of the thermoset polymer or composite thereof, (B) contacting the surface of the thermoset polymer or composite thereof and the powder with a small molecule alcohol in the presence of a catalyst at a first elevated temperature for a first period of time sufficient to dissolve the powder and at least a portion of the thermoset polymer matrix at the surface of the thermoset polymer or composite thereof, and (C) evaporating the small molecule alcohol at a second elevated temperature for a second period of time sufficient to re-polymerize the thermoset polymer matrix incorporating the thermoset polymer from the powder to repair the imperfection; wherein the small molecule alcohol has a boiling point above a bond exchange reaction (BER) activation temperature for the plurality of ester bonds.

In some aspects, a method is provided for chemically welding a first surface to a second surface, wherein both the first surface and the second surface include a thermoset polymer matrix having a plurality of ester bonds. The methods can include (A) contacting the first surface and the second surface with a small molecule alcohol in the presence of a catalyst at a first elevated temperature for a first period of time; (B) contacting the first surface and the second surface to form an interface; and (C) evaporating the small molecule alcohol to polymerize the thermoset polymer matrix at the interface; wherein the small molecule alcohol has a boiling point above a bond exchange reaction (BER) activation temperature for the plurality of ester bonds. The interface can have an interfacial fracture energy of about 1200 $J/m^2$ to 5000 $J/m^2$.

In some aspects, a method is provided for recycling a carbon fiber from a carbon fiber reinforced polymer, wherein the carbon fiber reinforced polymer includes (i) a thermoset polymer matrix having a plurality of exchangeable covalent bonds and (ii) a carbon fiber dispersed within the thermoset polymer matrix. The method can include (A) washing the carbon fiber reinforced polymer in a small molecule solvent capable of a bond exchange reaction with the plurality of exchangeable covalent bonds in the presence of a catalyst at a first elevated temperature for a first period of time sufficient to dissolve the thermoset polymer matrix and reclaim the carbon fiber; wherein the small molecule solvent has a boiling point above a bond exchange reaction (BER) activation temperature for the plurality of exchangeable covalent bonds; and wherein the boiling point of the small molecule solvent is below a thermal decomposition temperature of the carbon fiber.

In some aspects, a method is provided for recycling a thermoset polymer or a composite thereof, wherein the thermoset polymer or composite thereof includes a thermoset polymer matrix having a plurality of exchangeable covalent bonds. The methods can include (A) washing the thermoset polymer or a composite thereof in a small molecule solvent in the presence of a catalyst at a first elevated temperature for a first period of time sufficient to dissolve the thermoset polymer matrix; and (B) evaporating the small molecule solvent at a second elevated temperature for a second period of time to re-polymerize the thermoset polymer matrix; wherein the small molecule solvent has a boiling point above a bond exchange reaction (BER) activation temperature for the plurality of exchangeable covalent bonds.

In some aspects, a method is provided for repairing a surface of a thermoset polymer or a composite thereof, wherein the thermoset polymer or composite thereof includes a thermoset polymer matrix having a plurality of exchangeable covalent bonds, and wherein the surface has an imperfection. The method can include (A) applying a powder of the thermoset polymer to the surface of the thermoset polymer or composite thereof, (B) contacting the surface of the thermoset polymer or composite thereof and the powder with a small molecule solvent in the presence of a catalyst at a first elevated temperature for a first period of time sufficient to dissolve the powder and at least a portion of the thermoset polymer matrix at the surface of the thermoset polymer or composite thereof, and (C) evaporating the small molecule solvent at a second elevated temperature for a second period of time sufficient to re-polymerize the thermoset polymer matrix incorporating the thermoset polymer from the powder to repair the imperfection; wherein the small molecule solvent has a boiling point above a bond exchange reaction (BER) activation temperature for the plurality of exchangeable covalent bonds.

In some aspects, a method is provided for chemically welding a first surface to a second surface, wherein both the first surface and the second surface include a thermoset polymer matrix having a plurality of exchangeable covalent bonds. The method can include (A) contacting the first surface and the second surface with a small molecule solvent in the presence of a catalyst at a first elevated temperature for a first period of time; (B) contacting the first surface and the second surface to form an interface; and (C) evaporating the small molecule solvent to polymerize the thermoset polymer matrix at the interface; wherein the small molecule solvent has a boiling point above a bond exchange reaction (BER) activation temperature for the plurality of exchangeable covalent bonds. The interface can have an interfacial fracture energy of about 1200 $J/m^2$ to 5000 $J/m^2$.

The methods can use a small molecule solvent. In various aspects, the small molecule solvent can be a small molecule alcohol, a small molecule thiol, or a small molecule amine. In some aspects the plurality of exchangeable covalent bonds are ester bonds and the small molecule solvent is a small molecule alcohol. In some aspects, the plurality of exchangeable covalent bonds are sulfide bonds and the small molecule solvent is a small molecule thiol. In some aspects, the plurality of exchangeable covalent bonds are imide bonds and the small molecule solvent is a small molecule amine.

In some aspects, the small molecule solvent is a small molecule alcohol. The small molecule alcohol can be a polyol. The small molecule alcohol can be a diol, a triol, or a polyol. The small molecule alcohol can be ethylene glycol, propylene glycol, 1,3-butanediol, diethylene glycol, 2-ethylhexanol, or benzyl alcohol. The small molecule alcohol can have a boiling point of about 160° C. to 180° C. The small molecule alcohol can have a molecular weight of about 50 g/mol to 150 g/mol. The boiling point of the small molecule alcohol can be about 250° C. or less.

In some aspects, the small molecule solvent is a small molecule thiol. The thiol can be a mono-thiol or poly-thiol solvents. The small molecule thiol can be 2-mercaptoethanol, dithiothreitol, 3-mercaptopropane-1,2-diol, butanethiol, or 1,3-propanedithiol.

In some aspects, the small molecule solvent is a small molecule amine. The small molecule amine can be a mono-amine or poly-amine solvent. The small molecule amine can be hexylamine, 2-ethyl-1-hexylamine, 2-amino-5-methylhexane, ethylenediamine, or diethylenetriamine.

The thermoset polymer can include a plurality of exchangeable covalent bonds. In some aspects, the exchangeable covalent bonds are esters and the thermoset polymer matrix includes an anhydride cured epoxy, an unsaturated polyester, or a combination thereof. In some aspects, the exchangeable covalent bonds are sulfide bonds and the thermoset polymer matrix includes a dithiodianiline cured epoxy, a disulfide based epoxy, or a combination thereof. In some aspects, the exchangeable covalent bonds are imide bonds and the thermoset polymer matrix includes a polyimine crosslinked by tris(2-aminoethyl)amine with a spacer monomer of diethylene triamine, ethylene diamine, or a combination thereof.

The methods can include a variety of catalysts. The catalyst can be present in any amount sufficient to catalyze the bond exchange reaction. In some aspects, the catalyst is present in an amount from about 2 mol-% to about 10 mol-%. In some aspects, the catalyst is a transesterification such as a lead oxide, a lead sulfide, a lead hydroxide, a plumbite, a plumbate, a lead carbonate, a copper compound, a silver compound, a gold compound, a zinc compound, a cadmium compound, an iron compound, a cobalt compound, a salt thereof, or a combination thereof. In some aspects, the catalyst is a metal-ligand complex, wherein the metal-ligand complex comprises a metal selected from the group consisting of Cu, Li, Zn, Cd, Fe, and Co; and wherein the metal-ligand complex comprises one or more ligands independently selected from the group consisting of acetylacetone, a halide, and a combination thereof. In some aspects, the catalyst is an organic base such as 4-dimethylaminopropyridine, 1,8-diazabicyclo[5,4,0]undec-7-ene, diethylenetriamine, triethylamine, triphenylphosphine, or n-butyl phosphate. In some aspects, the catalyst is a Brønsted acid or Lewis acid.

The methods can include heating to a first elevated temperature for a first period of time and/or to a second elevated temperature for a second period of time. In various aspects, one or both of the first elevated temperature and the second elevated temperature are independently about 160° C. to 200° C. In various aspects, one or both of the first period of time and the second period of time are independently about 2 hours to 6 hours.

In some aspects, the method are applied to a composite of a thermoset polymer, and the thermoset polymer includes a reinforcing material dispersed within the thermoset polymer matrix. The reinforcing material can be a material such as a glass fiber, a carbon fiber, an aramid fiber, a boron fiber, a graphite, or a combination thereof. In some aspects, the reinforcing material is a carbon fiber and the composite is a carbon fiber reinforced polymer. In some aspects, the reinforcing material has a thermal decomposition temperature of about 500° C. or less. The reinforcing material can have a structure such as a continuous fiber, a cloth, a fabric, a yarn, or a tape.

Other systems, methods, features, and advantages of methods of recycling and reshaping thermosetting polymers and composites thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 1A is a schematic of the polymerization reaction of epoxy thermoset with dicarboxylic and tricarboxylic groups from fatty acid. FIG. 1B is a schematic of the BER in a representative polymer network, showing how the network topology can be rearranged when such reactions occur in a large amount through (I) the network before a BER; (II) intermediate state of the exchange reaction; (III) and after the BER.

FIG. 2A is a schematic of the dissolution of the epoxy thermoset in ethylene glycol (EG) solvent in an enclosed (sealed) environment. FIG. 2B is a schematic of the repolymerization of the dissolved epoxy thermoset in an open-air environment. FIG. 2C is a schematic of the view illustrating the EG-assisted dissolution and repolymerization of epoxy thermosets.

FIG. 3A is a schematic demonstrating an exemplary process for welding of partially dissolved CANs on the interface: (I) the epoxy samples are immersed in EG; (II) the samples are taken out of solvent; (III) the two samples are stacked together; (IV) producing the welded material. FIG. 3B is a schematic demonstrating an exemplary process for the welding using EG-epoxy glue: (I) the epoxy wastes are immersed in EG; (II) EG-epoxy glue is added onto surface; (III) the two materials are stacked together; and (IV) producing the welded material. FIG. 3C is a schematic demonstrating an exemplary process for repairing procedure of surface damage via EG-assisted transesterification: (I) starting from a fresh epoxy thermoset with smooth surface; (II) the epoxy thermoset can have surface damage, e.g. via manual scratching; (III) epoxy glue is added to cover the scratches on the damaged surface; and (IV) producing the fully repaired epoxy thermoset with smooth surface.

FIG. 5A is a time-lapse series of photographs demonstrating the appearance and size of an epoxy sample after being soaked in 4 g EG solvent for different periods of time and with a catalyst concentration in the epoxy of 5 mol % and a temperature of about 180° C. FIG. 5B is a graph of the normalized residual mass of epoxy sample as a function of heating time at 180° C. and EG weight. FIG. 5C is a graph of the normalized residual mass of epoxy as a function of heating time at 180° C. and catalyst concentrations. FIG. 5D is a graph of the normalized residual mass of epoxy as a function of heating time and temperature. The catalyst concentration in the epoxy is 5 mol %.

FIG. 7A is a graph comparing the normalized tan δ and storage modulus as a function of temperature. FIG. 7B is a graph comparing the normalized stress relaxation curves at different temperatures. FIG. 7C is a graph comparing the relaxation time between re-polymerized and fresh CANs.

FIG. 8A is a series of experimental imagines and microscopic optical images of the fresh-cut and pre-treated surfaces: (I) fresh cut samples; (II) pre-treated surfaces; (III) stacking the strips together at room temperature; (IV) fully welded strips. FIG. 8B is a series of microscopic optical images of fully welded CANs: top view and middle view of the interface. (The arrows in the top image indicate the welded interfaces and the lines represent middle surface)

FIG. 9A is a series of snapshots of the process: (I) fresh samples of CANs; (II) adding EG-epoxy onto the surface; (III) stacking the strips together at room temperature; and (IV) fully welded strips. FIG. 9B is a series of microscopic views of fully welded epoxy strips from top and middle surfaces. (arrows indicate the welded interfaces and lines represent middle surface.)

FIG. 10A is a graph of the typical peeling force as a function of displacement during the T-peeling test of the sample heating for 180 min. FIG. 10B is a graph of the interfacial fracture energy of welded epoxy samples via pre-treatment method. FIG. 10C is a graph of the interfacial fracture energy of welded epoxy samples via EG-epoxy glue method. FIG. 10D is a graph comparing the interfacial fracture energy between pressure-assisted welding and the pressure-free welding methods. The catalyst concentration in the epoxy sample is 5 mol %.

FIG. 11A is an optical microscope imaged epoxy thermoset after scratching the surface with needles. FIG. 11B is an optical microscope image of the repaired surface after adding epoxy glue followed by heating for 3 h at 180° C.

FIG. 13A is a graph comparing the tensile stress-strain behaviors of a fresh sample with those of reprocessed samples. The reprocessing time at 180° C. is 180 min. FIG. 13B is a graph of the tensile modulus as a function of heating time with different catalyst concentrations. FIG. 13C is a graph of the ultimate strength as a function of heating time with different catalyst concentrations.

FIG. 14A are FTIR traces demonstrating conversions of esters (1735-1750 cm$^{-1}$), and epoxy COC (900-930 cm$^{-1}$). FIG. 14B are FTIR traces demonstrating conversion of hydroxyls (3200-3550 cm$^{-1}$).

FIG. 15A demonstrates the dissolution/repolymerization cycle of the epoxy thermosets in 2E1H. FIG. 15B is a graph comparing normalized tan δ and storage modulus as a function of temperature between fresh, EG-recycled and 2E1H-recycled CANs.

FIG. 16A demonstrates the conversions between esters (1735-1750 cm$^{-1}$) and epoxy COC (900-930 cm$^{-1}$). FIG. 16B demonstrates the conversion of hydroxyls (3200-3550 cm$^{-1}$).

FIG. 17A is a schematic view of the formation of fatty acid linkers within the thermosetting network. FIG. 17B is a schematic view of the dissolution and repolymerization of the epoxy thermoset via transesterification. FIG. 17C is a graph of the normalized weight of epoxy as a function of soaking time. The weight of EG is 3 g. The temperature is 180° C. FIG. 17D is a graph of the residual weight of epoxy after being soaked for 4 h, as a function of EG weight. The temperature is 180° C. FIG. 17E is a graph of the BER induced stress relaxation behavior between fresh epoxy (solid lines) and recycled epoxy (dashed lines)

FIG. 18A is a schematic view demonstrating the exemplary process for repairing CFRP composite with surface damage. FIG. 18B is a series of optical images demonstrating the exemplary process for repairing CFRP composite with surface damage.

FIG. 19A is a schematic view of the exemplary closed-loop recycling paradigm for CFRP composite. FIG. 19B is a series of photographs showing the epoxy matrix is gradually dissolved in EG at 180° C., and the clean fiber fabric is reclaimed FIG. 19C is a series of photographs demonstrating refabricating the thermoset composite by using the reclaimed fiber and dissolved polymer solution.

FIG. 20A is a series of SEM images of the fresh carbon fiber. FIG. 20B is a series of SEM images of the reclaimed carbon fiber. FIG. 20C is a graph of the stress-strain curves of both fresh and reclaimed carbon fibers. FIG. 20D is a graph of the room-temperature stress-strain behavior of fresh, recycled and repaired composite. FIG. 20E is a bar graph summary of the elastic modulus (within the first 2% stretch, top) and ultimate strength of each generation of recycled CFRP composite (bottom).

DETAILED DESCRIPTION

Figure 1A:
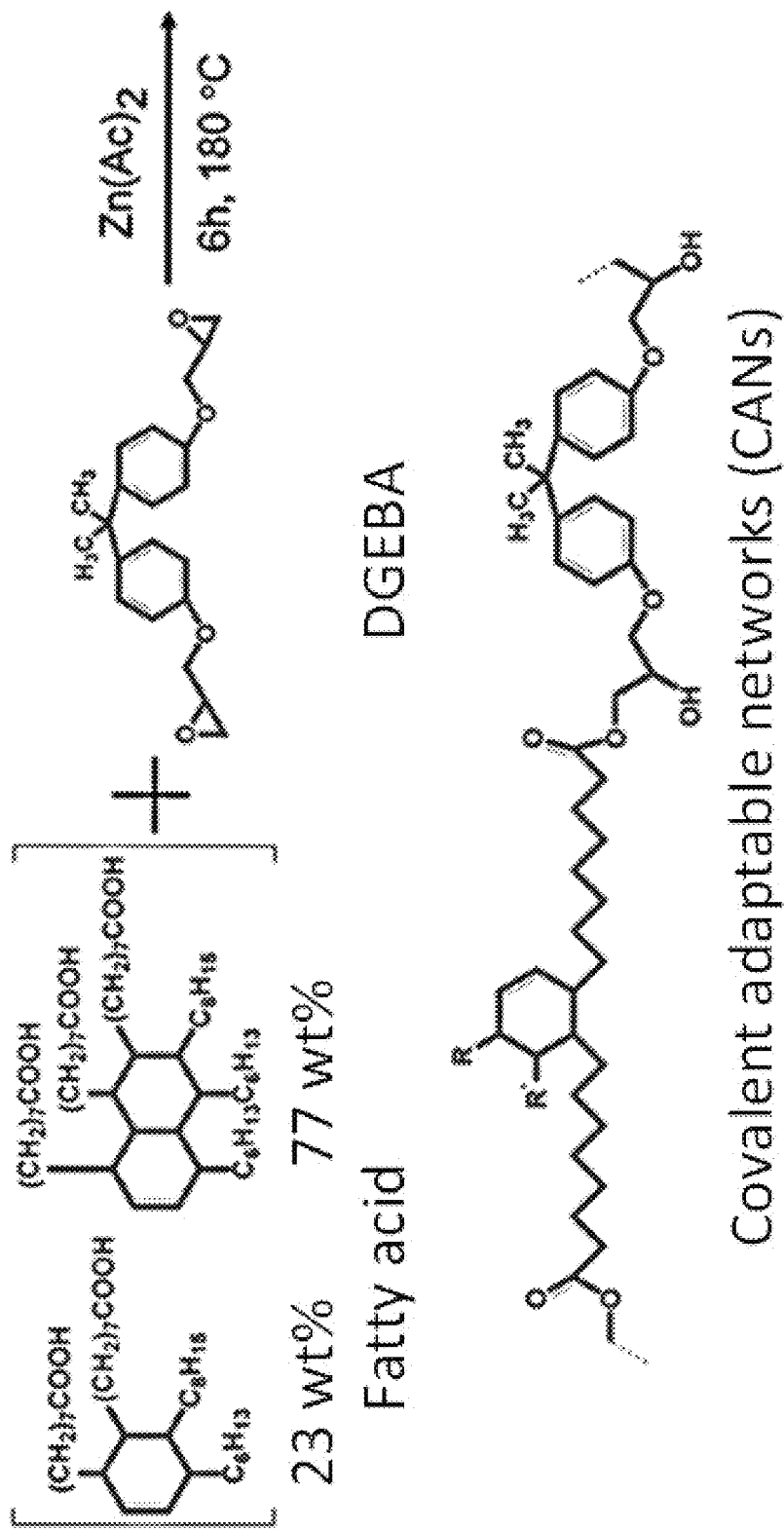
FIGS. 1A-1B are schematic graphs showing the polymerization process and network adaptiveness.
Figure 1B:
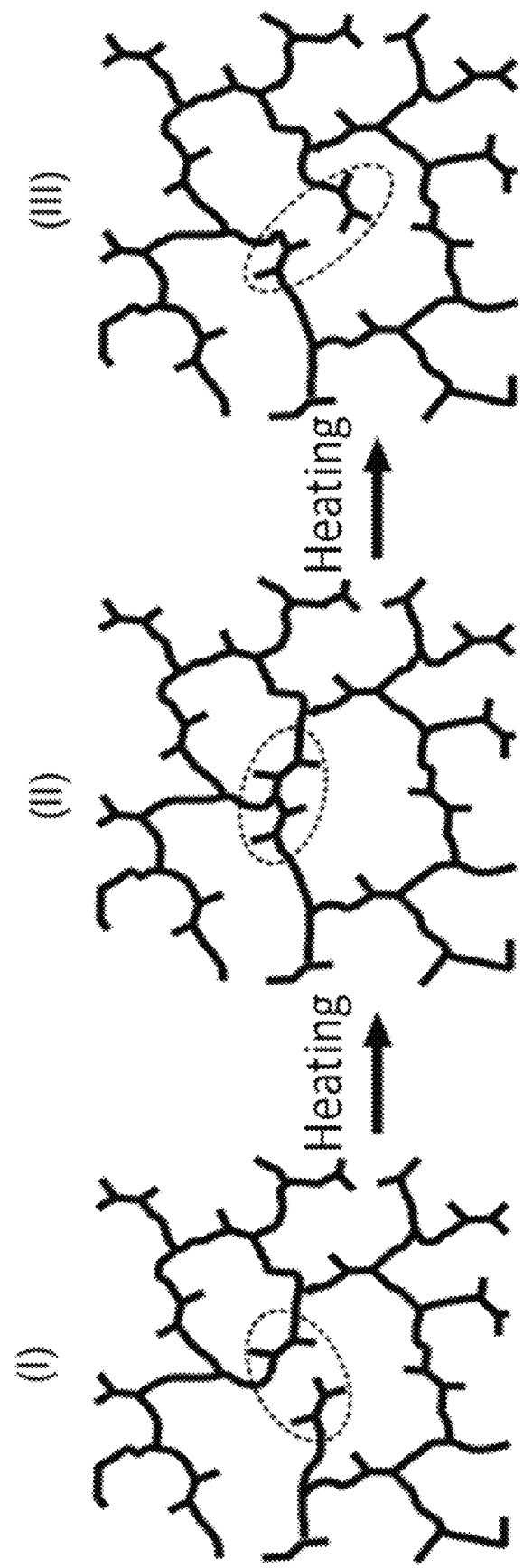

In various aspects, methods of reshaping and recycling thermoset polymers and composited containing thermoset polymers are provided. The methods can use a bond exchange reaction between exchangeable covalent bonds and a suitable small molecule solvent to facilitate dissolving the polymer matrix under conditions that preserve the integrity of the reinforcing materials in the composite and allow for recovery of both the polymer and the reinforcing material with no or only minimal degradation of mechanical integrity.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "small molecule," as used herein, refers to a molecule having a molecular weight of about 1000 g/mol, about 800 g/mol, about 600 g/mol, about 500 g/mol, about 400 g/mol, about 350 g/mol, about 300 g/mol, about 250 g/mol, about 200 g/mol, or less.

The term "thermoset polymer," as used herein, refers to polymers characterized by rigid, three-dimensional network structures with high cross-link densities and high molecular weight. Thermoset polymers, when set, generally stay in the shape when heated until they decompose. Thermoset polymers are insoluble in most common solvents, except for under the specific conditions and using the specific solvents provided for herein.

Thermoset Polymers and Composites Thereof

Various methods are provided herein for processing thermoset polymers and composites containing thermoset polymers. The thermoset polymers described herein include an exchangeable covalent bond capable of a bond exchange reaction with a suitable small molecule solvent. For example, where the thermoset polymer contains a plurality of ester bonds, the ester bonds can undergo bond exchange reactions with small molecule alcohols. See, for example FIG. 1B and FIGS. 2A-2C. In addition to the ester-containing polymers, the bond exchange can be readily extended to other types of thermoset. For example, epoxy thermosets with dynamic C—S bonds can undergo bond exchange with a thiol-containing solvent (e.g. 2-mercaptoethanol solvent). Polyimide thermosets with dynamic C—N bonds can undergo bond exchange with an amine solvent.

In various aspects, the thermoset polymers include a polymer matrix having a plurality of exchangeable covalent bonds. The exchangeable covalent bonds can be ester bonds, sulfide bonds, imide bonds, or other covalent bonds capable of undergoing bond exchange with a small molecule solvent at temperatures of about 300° C., about 275° C., about 250° C., about 225° C., about 200° C., or less.

In some aspects, the exchangeable covalent bond is an ester capable of undergoing bond exchange reaction with a small molecule alcohol at a temperature of about 300° C., about 275° C., about 250° C., about 225° C., about 200° C., or less. For example, the thermoset polymer matrix can include an anhydride cured epoxy, an unsaturated polyester, or a combination thereof.

In some aspects, the exchangeable covalent bond is a sulfide capable of undergoing bond exchange reaction with a small molecule thiol at a temperature of about 300° C., about 275° C., about 250° C., about 225° C., about 200° C., or less. For example, the thermoset polymer matrix can include a dithiodianiline cured epoxy, a disulfide based epoxy, or a combination thereof.

In some aspects, the exchangeable covalent bond is an imide capable of undergoing bond exchange reaction with a small molecule amine at a temperature of about 300° C., about 275° C., about 250° C., about 225° C., about 200° C., or less. For example, the thermoset polymer matrix can include a polyimine crosslinked by tris(2-aminoethyl)amine with a spacer monomer of diethylene triamine, ethylene diamine, or a combination thereof.

The bond exchange reaction can be facilitated by the presence of the appropriate catalyst. For example, where the exchangeable covalent bond is an ester and the small molecule solvent is an alcohol, the catalyst can be an appropriate transesterification catalyst. The catalyst can be present in any amount suitable to catalyze the bond exchange reaction between the exchangeable covalent bonds and the small molecule solvent. In some aspects, the catalysts is present in an amount from about 1 mol-% to about 15 mol-%, 2 mol-% to about 15 mol-%, about 2 mol-% to about 12 mol-%, about 2 mol-% to about 10 mol-%, or about 3 mol-% to about 10 mol-%.

The catalyst can be a transesterification catalyst, for example a lead oxide, a lead sulfide, a lead hydroxide, a plumbite, a plumbate, a lead carbonate, a copper compound, a silver compound, a gold compound, a zinc compound, a cadmium compound, an iron compound, a cobalt compound, a salt thereof, or a combination thereof. The transesterification catalyst can include a metal-ligand complex, wherein the metal-ligand complex includes a metal such as Cu, Li, Zn, Cd, Fe, or Co; and wherein the metal-ligand complex includes one or more ligands such as acetylacetone, a halide, or a combination thereof.

In some aspects, the thermoset polymer matrix includes a plurality of ester bonds and the small molecule solvent is a small molecule alcohol. The bond exchange reaction activation temperature for the plurality of ester bonds can be about 110° C., about 120° C., about 130° C., about 140° C., or higher. For example, the bond exchange reaction activation temperature for the plurality of ester bonds can be about 110° C. to 180° C., about 110° C. to 150° C., about 120° C. to 150° C., about 120° C. to 140° C., or about 110° C. to 130° C.

In some aspects, the thermoset polymer matrix includes a plurality of sulfide bonds and the small molecule solvent is a small molecule thiol. The bond exchange reaction activation temperature for the plurality of sulfide bonds can be about 80° C., about 100° C., or higher. For example, the bond exchange reaction activation temperature for the plurality of sulfide bonds can be about 80° C. to 110° C. or about 100° C. to 130° C.

In some aspects, the thermoset polymer matrix includes a plurality of imide bonds and the small molecule solvent is a small molecule amine. The bond exchange reaction activation temperature for the plurality of imide bonds can be about 40° C., or about 90° C., or higher. For example, the bond exchange reaction activation temperature for the plurality of imide bonds can be about 40° C. to 90° C., or about 90° C. to 140° C.

The methods described herein can be applied to thermoset polymers as well as to composites containing thermoset polymers. A particularly preferred composite is a carbon fiber reinforced polymer. Carbon fiber reinforced polymers can be difficult to process, and especially difficult to recycle without decreasing the mechanical integrity of the carbon fibers (the most expensive components). The methods are, however, not limited to carbon fiber composites. For example, the composite can include a thermoset polymer matrix and a reinforcing material dispersed within the thermoset polymer matrix.

Suitable reinforcing materials for use in composites can include, but are certainly not limited to, a glass fiber, a carbon fiber, an aramid fiber, a boron fiber, a graphite, or a combination thereof. The reinforcing material can have a variety of structures, for example a continuous fiber, a cloth, a fabric, a yarn, or a tape.

The reinforcing material can have a thermal decomposition temperature that is about 500° C., about 450° C., about 400° C., about 350° C., or less. The thermal decomposition is not limited to temperatures where the reinforcing material is completely decomposed, but rather to temperatures where the mechanical strength of the reinforcing material is damaged, e.g. damaged by at least 1%, at least 5%, or at least 10%.

Small Molecule Solvents

The methods can be used with a variety of small molecule solvents suitable for bond exchange reaction with the exchangeable covalent bonds in the thermoset polymer. For example, the small molecule solvent can be an alcohol, a thiol, an amine, or other suitable small molecule solvent capable of bond exchange with the exchangeable covalent bonds in the thermoset polymer. The small molecule solvent will generally have a boiling point that is greater than the bond exchange reaction (BER) activation temperature for the plurality of exchangeable covalent bonds in the thermoset polymer.

In some aspects, the small molecule solvent is a small molecule alcohol. The small molecule alcohol can have a boiling point of about 140° C. to 200° C., about 140° C. to 180° C., about 160° C. to 180° C., about 140° C. to 160° C., about 160° C. to 200° C., or about 180° C. to 200° C. The small molecule alcohol can be a polyol, e.g. a diol, a triol, or other polyol having four or more alcohol groups. The small molecule alcohol can be ethylene glycol, propylene glycol, 1,3-butanediol, diethylene glycol, 2-ethyl-hexanol, or benzyl alcohol. The small molecule alcohol can have a molecular weight of about 20 g/mol to 200 g/mol, about 50 g/mol to 200 g/mol, about 50 g/mol to 150 g/mol, about 80 g/mol to 200 g/mol, about 80 g/mol to 150 g/mol, or about 50 g/mol to 100 g/mol. The boiling point of the small molecule alcohol can be about 350° C., about 300° C., about 275° C., about 250° C., about 225° C., about 200° C., or less.

In some aspects, the small molecule solvent is a small molecule thiol. The small molecule thiol can have a boiling point of about 90° C. to 180° C., about 90° C. to 160° C., about 90° C. to 130° C., about 90° C. to 110° C., about 110° C. to 180° C., or about 110° C. to 160° C. The small molecule thiol can include 1 or more thiol groups. The small molecule thiol can be 2-Mercaptoethanol, Dithiothreitol, 3-Mercaptopropane-1,2-diol, Butanethiol, or 1,3-Propanedithiol. The small molecule thiol can have a molecular weight of about 20 g/mol to 200 g/mol, about 50 g/mol to 200 g/mol, about 50 g/mol to 150 g/mol, about 80 g/mol to 200 g/mol, about 80 g/mol to 150 g/mol, or about 50 g/mol to 100 g/mol. The boiling point of the small molecule thiol can be about 350° C., about 300° C., about 275° C., about 250° C., about 225° C., about 200° C., or less.

In some aspects, the small molecule solvent is a small molecule amine. The small molecule amine can have a boiling point of about 60° C. to 210° C., about 60° C. to 170° C., about 60° C. to 130° C., about 100° C. to 210° C., about 100° C. to 170° C., or about 100° C. to 130° C. The small molecule amine can include 1, 2, 3, or more amine groups. The small molecule amine can be Hexylamine, 2-Ethyl-1-hexylamine, 2-Amino-5-methylhexane, Ethylenediamine, or Diethylenetriamine. The small molecule amine can have a molecular weight of about 20 g/mol to 200 g/mol, about 50 g/mol to 200 g/mol, about 50 g/mol to 150 g/mol, about 80 g/mol to 200 g/mol, about 80 g/mol to 150 g/mol, about 100 g/mol to 150 g/mol, or about 100 g/mol to 130 g/mol. The boiling point of the small molecule amine can be about 350° C., about 300° C., about 275° C., about 250° C., about 225° C., about 200° C., or less.

Methods of Recycling Thermoset Polymers and Composites Thereof

Methods are provided for recycling thermoset polymer and composite containing thermoset polymers. The methods can include (A) washing the thermoset polymer or a composite thereof in a small molecule solvent in the presence of a catalyst at a first elevated temperature for a first period of time sufficient to dissolve the thermoset polymer matrix; and (B) evaporating the small molecule solvent at a second elevated temperature for a second period of time to re-polymerize the thermoset polymer matrix. The thermoset polymer matrix should contain a plurality of exchangeable covalent bonds capable of bond exchange with the small molecule solvent in the presence of the catalyst and at the first elevated temperature. The small molecule solvent can have a boiling point above the bond exchange reaction (BER) activation temperature for the plurality of exchangeable covalent bonds.

In some aspects, the thermoset polymer matrix includes a plurality of ester bonds, and the method includes (A) washing the thermoset polymer or a composite thereof in a small molecule alcohol in the presence of a catalyst at a first elevated temperature for a first period of time sufficient to dissolve the thermoset polymer matrix; and (B) evaporating the small molecule alcohol at a second elevated temperature for a second period of time to re-polymerize the thermoset polymer matrix. The small molecule alcohol can have a boiling point above the bond exchange reaction (BER) activation temperature for the plurality of ester bonds.

In some aspects, the thermoset polymer matrix includes a reinforcing material dispersed within the thermoset polymer matrix, e.g. the material is a composite containing a thermoset polymer. In some aspects, the composite is a carbon fiber reinforced polymer. The methods can include recycling or recovering one or both of the carbon fiber and the thermoset polymer from the carbon fiber reinforced polymer.

Where the carbon fiber reinforced polymer includes (i) a thermoset polymer matrix including a plurality of exchangeable covalent bonds and (ii) a carbon fiber dispersed within the thermoset polymer matrix; the method can include (A) washing the carbon fiber reinforced polymer in a small molecule solvent in the presence of a catalyst at a first elevated temperature for a first period of time sufficient to dissolve the thermoset polymer matrix and reclaim the carbon fiber; wherein the small molecule solvent has a boiling point above a bond exchange reaction (BER) activation temperature for the plurality of exchangeable covalent bonds; and wherein the boiling point of the small molecule solvent is below a thermal decomposition temperature of the carbon fiber.

Where the carbon fiber reinforced polymer includes (i) a thermoset polymer matrix including a plurality of ester bonds and (ii) a carbon fiber dispersed within the thermoset polymer matrix; the method can include (A) washing the carbon fiber reinforced polymer in a small molecule alcohol in the presence of a catalyst at a first elevated temperature for a first period of time sufficient to dissolve the thermoset polymer matrix and reclaim the carbon fiber; wherein the small molecule alcohol has a boiling point above a bond exchange reaction (BER) activation temperature for the plurality of ester bonds; and wherein the boiling point of the small molecule alcohol is below a thermal decomposition temperature of the carbon fiber.

The methods can also include evaporating the small molecule solvent at a second elevated temperature for a second period of time to re-polymerize the thermoset polymer matrix. This can be done either (i) to reform the composite by re-polymerizing the thermoset polymer matrix with the reinforcing material still in place or (ii) to recover the thermoset polymer separately from the reinforcing material by separating the reinforcing material from the solvent prior to the repolymerization of the thermoset polymer matrix. For example, by recombining the small molecule alcohol and the reclaimed carbon fiber prior to the evaporating step, the re-polymerizing of the thermoset polymer matrix can produce a recycled carbon fiber reinforced polymer including (i) the thermoset polymer matrix with the plurality of ester bonds and (ii) the reclaimed carbon fiber dispersed within the thermoset polymer matrix.

In some aspects, or both of the first elevated temperature and the second elevated temperature can be between the bond exchange reaction activation temperature and the decomposition temperature of the reinforcing material. In some aspects, one or both of the first elevated temperature and the second elevated temperature can be between the bond exchange reaction activation temperature and just above the boiling point of the small molecule solvent. In some aspects, one or both of the first elevated temperature and the second elevated temperature can be independently about 120° C. to 250° C., about 120° C. to 220° C., about 120° C. to 200° C., about 140° C. to 220° C., about 140° C. to 200° C., about 160° C. to 220° C., about 160° C. to 200° C., about 150° C. to 200° C., about 170° C. to 210° C., or about 180° C.

In some aspects, the first period of time is long enough to dissolve all or part of the thermoset polymer matrix. In some aspects, the second period of time is long enough to evaporate at least about 90%, about 95%, about 98%, about 99%, or more of the small molecule solvent. In some aspects, one or both of the first period of time and the second period of time are independently about 1 hours to 10 hours, about 1 hours to 8 hours, about 1 hours to 6 hours, about 2 hours to 6 hours, about 2 hours to 8 hours, or about 2 hours to 10 hours.

The recycled materials can retain the mechanical integrity of the materials prior to recycling. For example, where the composite is reformed the recycled composite can retain an elastic modulus that is within 95%, with 97%, within 98%, within 99%, or within 99.5% of the elastic modulus of the composite prior to the recycling and when measured under the same conditions. In some aspects, the reinforcing material is reclaimed and the reinforcing material has an elastic modulus that is within 95%, with 97%, within 98%, within 99%, or within 99.5% of the elastic modulus of the reinforcing material prior to the recycling and when measured under the same conditions. In some aspects, the reclaimed material is the carbon fiber from a carbon fiber reinforced polymer and the reclaimed carbon fiber can retain an elastic modulus that is within 95%, with 97%, within 98%, within 99%, or within 99.5% of the elastic modulus of the carbon fiber prior to the recycling and when measured under the same conditions. In some aspects, the elastic modulus is measured by uniaxial tension tests performed on a universal materials testing machine by following ASTM D638 standard.

The recycled materials can retain the strength of the materials prior to recycling. For example, where the composite is reformed the recycled composite can retain a tensile strength that is within 95%, with 97%, within 98%, within 99%, or within 99.5% of the tensile strength of the composite prior to the recycling and when measured under the same conditions. In some aspects, the reinforcing material is reclaimed and the reinforcing material has aa tensile strength that is within 95%, with 97%, within 98%, within 99%, or within 99.5% of the tensile strength of the reinforcing material prior to the recycling and when measured under the same conditions. In some aspects, the reclaimed material is the carbon fiber from a carbon fiber reinforced polymer and the reclaimed carbon fiber can retain a tensile strength that is within 95%, with 97%, within 98%, within 99%, or within 99.5% of the tensile strength of the carbon fiber prior to the recycling and when measured under the same conditions. In some aspects, the tensile strength is measured by uniaxial tension tests performed on a universal materials testing machine by following ASTM D638 standard. e Methods of Repairing Thermoset Polymers and Composites Thereof In various aspects, methods are provided for repairing thermoset polymers and composites containing thermoset polymers. For example, the methods of repair can be applied where the surface of a thermoset polymer or a composite thereof contains one or more imperfections, e.g. scratches, dents, etc.

In some aspects, where the thermoset polymer matrix includes a plurality of exchangeable covalent bonds, the methods can include (A) applying a powder of the thermoset polymer to the surface of the thermoset polymer or composite thereof, (B) contacting the surface of the thermoset polymer or composite thereof and the powder with a small molecule solvent in the presence of a catalyst at a first elevated temperature for a first period of time sufficient to dissolve the powder and at least a portion of the thermoset polymer matrix at the surface of the thermoset polymer or composite thereof, and (C) evaporating the small molecule solvent at a second elevated temperature for a second period of time sufficient to re-polymerize the thermoset polymer matrix incorporating the thermoset polymer from the powder to repair the imperfection.

In some aspects the thermoset polymer matrix includes a plurality of ester bonds and the small molecule solvent is a small molecule alcohol. The methods can include (A) applying a powder of the thermoset polymer to the surface of the thermoset polymer or composite thereof, (B) contacting the surface of the thermoset polymer or composite thereof and the powder with a small molecule alcohol in the presence of a catalyst at a first elevated temperature for a first period of time sufficient to dissolve the powder and at least a portion of the thermoset polymer matrix at the surface of the thermoset polymer or composite thereof, and (C) evaporating the small molecule alcohol at a second elevated temperature for a second period of time sufficient to re-polymerize the thermoset polymer matrix incorporating the thermoset polymer from the powder to repair the imperfection.

In some aspects, or both of the first elevated temperature and the second elevated temperature can be between the bond exchange reaction activation temperature and the decomposition temperature of the reinforcing material. In some aspects, one or both of the first elevated temperature and the second elevated temperature can be between the bond exchange reaction activation temperature and just above the boiling point of the small molecule solvent. In some aspects, one or both of the first elevated temperature and the second elevated temperature can be independently about 120° C. to 250° C., about 120° C. to 220° C., about 120° C. to 200° C., about 140° C. to 220° C., about 140° C. to 200° C., about 160° C. to 220° C., about 160° C. to 200° C., about 150° C. to 200° C., about 170° C. to 210° C., or about 180° C.

In some aspects, the first period of time is long enough to dissolve all or part of the thermoset polymer matrix. In some aspects, the second period of time is long enough to evaporate at least about 90%, about 95%, about 98%, about 99%, or more of the small molecule solvent. In some aspects, one or both of the first period of time and the second period of time are independently about 1 hours to 10 hours, about 1 hours to 8 hours, about 1 hours to 6 hours, about 2 hours to 6 hours, about 2 hours to 8 hours, or about 2 hours to 10 hours.

Methods of Welding Thermoset Polymers and Composites Thereof

In various aspects, methods are provided for chemically welding thermoset polymers and composites containing thermoset polymers. For example, methods are provided for welding a first surface to a second surface, wherein both the first surface and the second surface include a thermoset polymer matrix having a plurality of exchangeable covalent bonds. The methods can include (A) contacting the first surface and the second surface with a small molecule solvent in the presence of a catalyst at a first elevated temperature for a first period of time; (B) contacting the first surface and the second surface to form an interface; and (C) evaporating the small molecule solvent to polymerize the thermoset polymer matrix at the interface.

In some aspects, the first surface and the second surface include a plurality of ester bonds and the small molecule solvent is a small molecule alcohol. The methods can include (A) contacting the first surface and the second surface with a small molecule alcohol in the presence of a catalyst at a first elevated temperature for a first period of time; (B) contacting the first surface and the second surface to form an interface; and (C) evaporating the small molecule alcohol to polymerize the thermoset polymer matrix at the interface.

The methods can be used to chemically weld a variety of surfaces, for example to weld two thermoset polymers together, to weld to composites together containing a thermoset polymer matrix, or to weld a thermoset polymer to a composite containing a thermoset polymer.

The methods are capable of forming strong welds. In some aspects, the interface has an interfacial fracture energy of about 1000 $J/m^2$ to 10000 $J/m^2$, about 1000 $J/m^2$ to 5000 $J/m^2$, about 1200 $J/m^2$ to 5000 $J/m^2$, about 1500 $J/m^2$ to 5000 $J/m^2$, about 1500 $J/m^2$ to 2500 $J/m^2$, about 2000 $J/m^2$ to 5000 $J/m^2$, or about 2000 $J/m^2$ to 10000 $J/m^2$.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Solvent Assisted Surface Welding and Reprocessing of Malleable Epoxy Polymers In this example, ethylene glycol (EG) is used as a solvent to realize pressure-free surface welding and reprocessing of a CAN epoxy system. Here, the epoxy based CAN capable of BER in Montarnal et al (Montarnal, D., et al., Science, 2011. 334(6058): p. 965-968) is adopted and EG solvent is used, as it has a relatively high boiling point. When the mixture of EG solvent and the CAN is heated to the BER active temperature, the hydroxyl group in the EG participates in exchange reactions with the ester group in the networks; because EG is a small-molecule solvent, this results in breaking the long polymer chains at the ester group on the backbone. After dissolving the epoxy, the EG is allowed to evaporate, leaving the dissolved epoxy to reform into a solid. Surface welding can be realized when such dissolution and reformation events occur on the material interfaces. These events are strongly dependent on the molecule diffusion and the rate of BERs, which is further determined by temperature and catalyst concentration. A good control on the diffusion time of alcohol molecules will only depolymerize the skin layer of CAN (due to its surface erosion type of degradation), which leads to a tacky surface that serve as a glue for pressure-free surface welding. This welding method is also extended to facilitate polymer reprocessing from the powder state. The approach promotes the efficiency of recycling thermosets and broadens their utilization in practical situations.

Materials and Method

Materials and Synthesis

The epoxy based CAN was prepared following the method used by Leibler and coworkers (Capelot, M., et al., Journal of the American Chemical Society, 2012. 134(18): p. 7664-7667; Capelot, M., et al., ACS Macro Letters, 2012. 1(7): p. 789-792.; Montarnal, D., et al. Science, 2011. 334(6058): p. 965-968). It was synthesized by using commercially available materials, including a catalyst, monomers and crosslinkers: metal catalyst $Zn(Ac)_2$ (Sigma Aldrich, St. Louis, Mo., USA), diglycidyl ether of bisphenol A (DGEBA, Sigma Aldrich), and fatty acids Pripol 1040 (Uniqema Inc., Paterson, N.J., USA). For the alcohol solvent, anhydrous ethylene glycol (Sigma Aldrich) with purity of 99.8% was selected due to its high boiling point (197.3° C., above the BER activation temperature).

FIG. 1A illustrates the main chemical reaction during the synthesis of CANs. To prepare the epoxy, the catalyst (with different concentrations, 0 mol %, 1 mol %, 3 mol %, 5 mol % and 7 mol %, respectively) were mixed with fatty acids in a round-bottom flask and heated under vacuum. The temperature was gradually increased from 100° C. to 180°

C., and then was held at 180° C. until no gas bubble was observed and catalyst particles were fully solubilized (1 h). DGEBA in solid state was heated to 130° C. until totally melted, and then was poured into the fatty acid mixture in open air. The new mixture was manually stirred until homogeneous and translucent (stoichiometry between COOH and epoxy group is 1:1). After this, the mixture was placed in vacuum to remove the bubbles, and transferred to an oven for 6 h at 130° C. The CAN epoxy is capable of BER via transesterification reaction (FIG. 1B) at high temperature.

Dissolution and Repolymerization

Figure 2A:
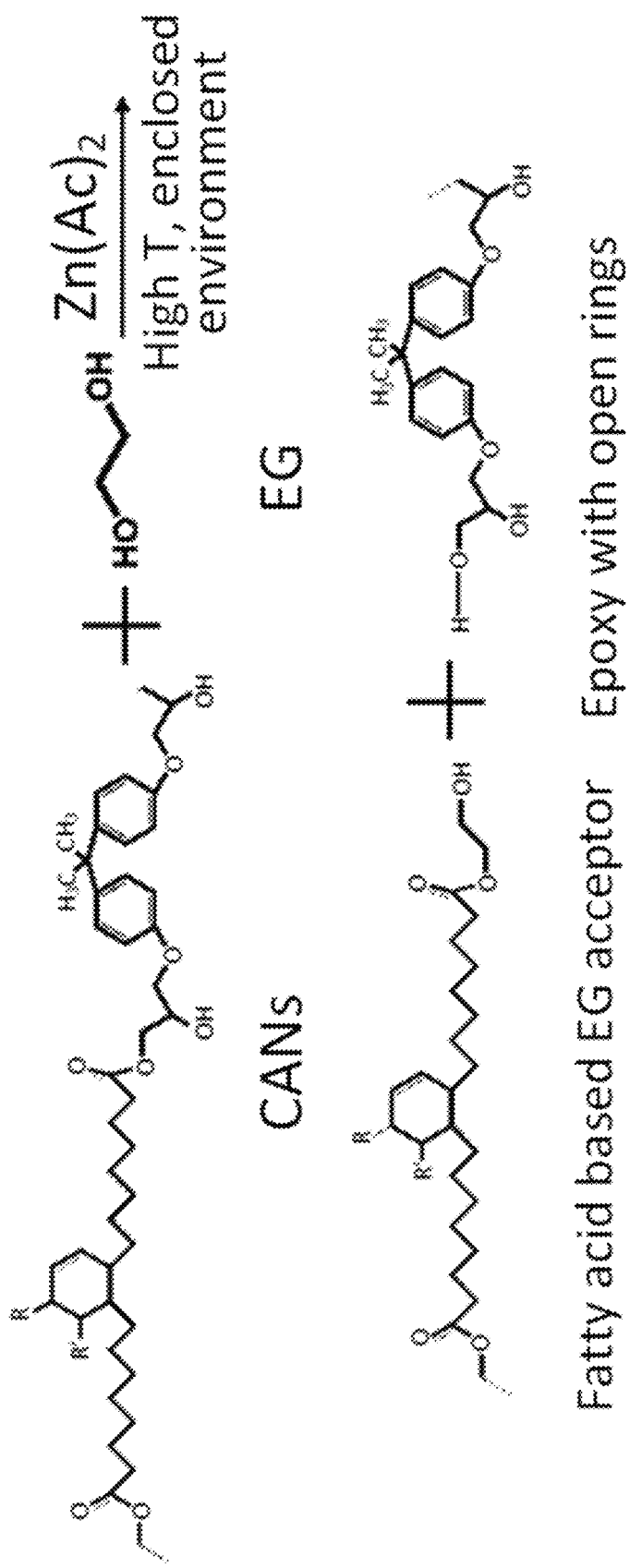
FIGS. 2A-2C are schematic graphs showing the exemplary dissolution and repolymerization mechanisms.
Figure 2B:
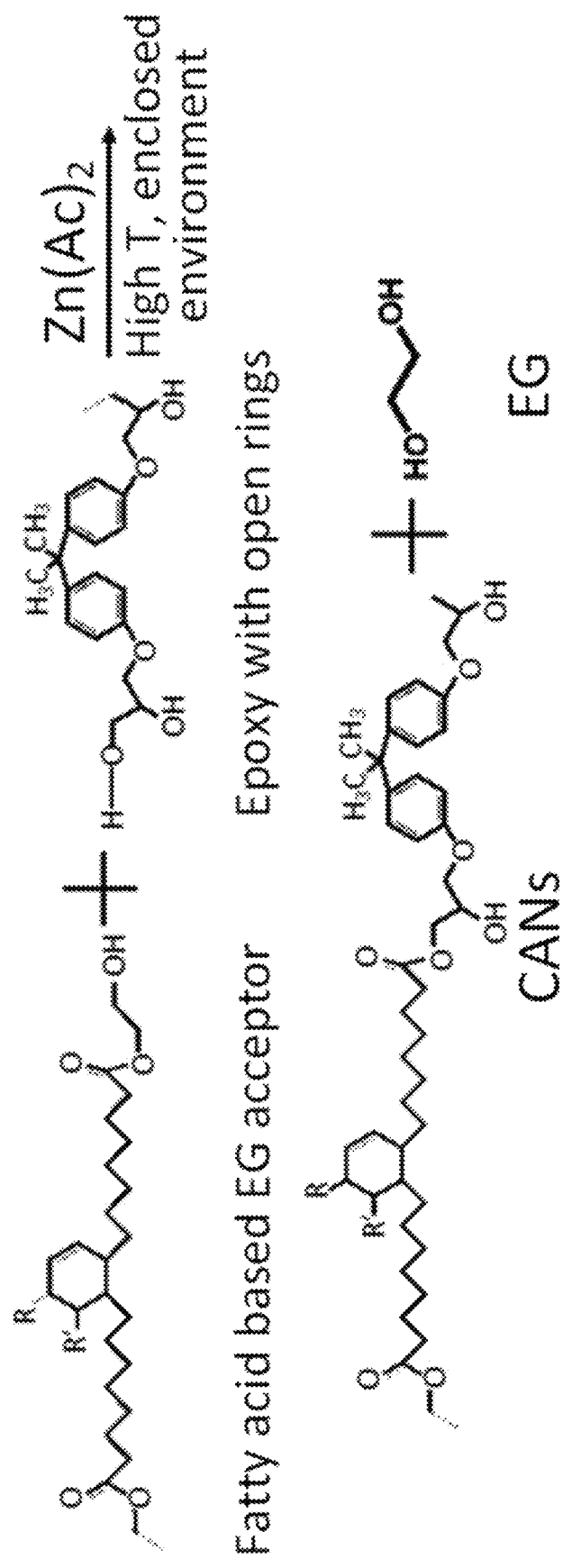
Figure 2C:
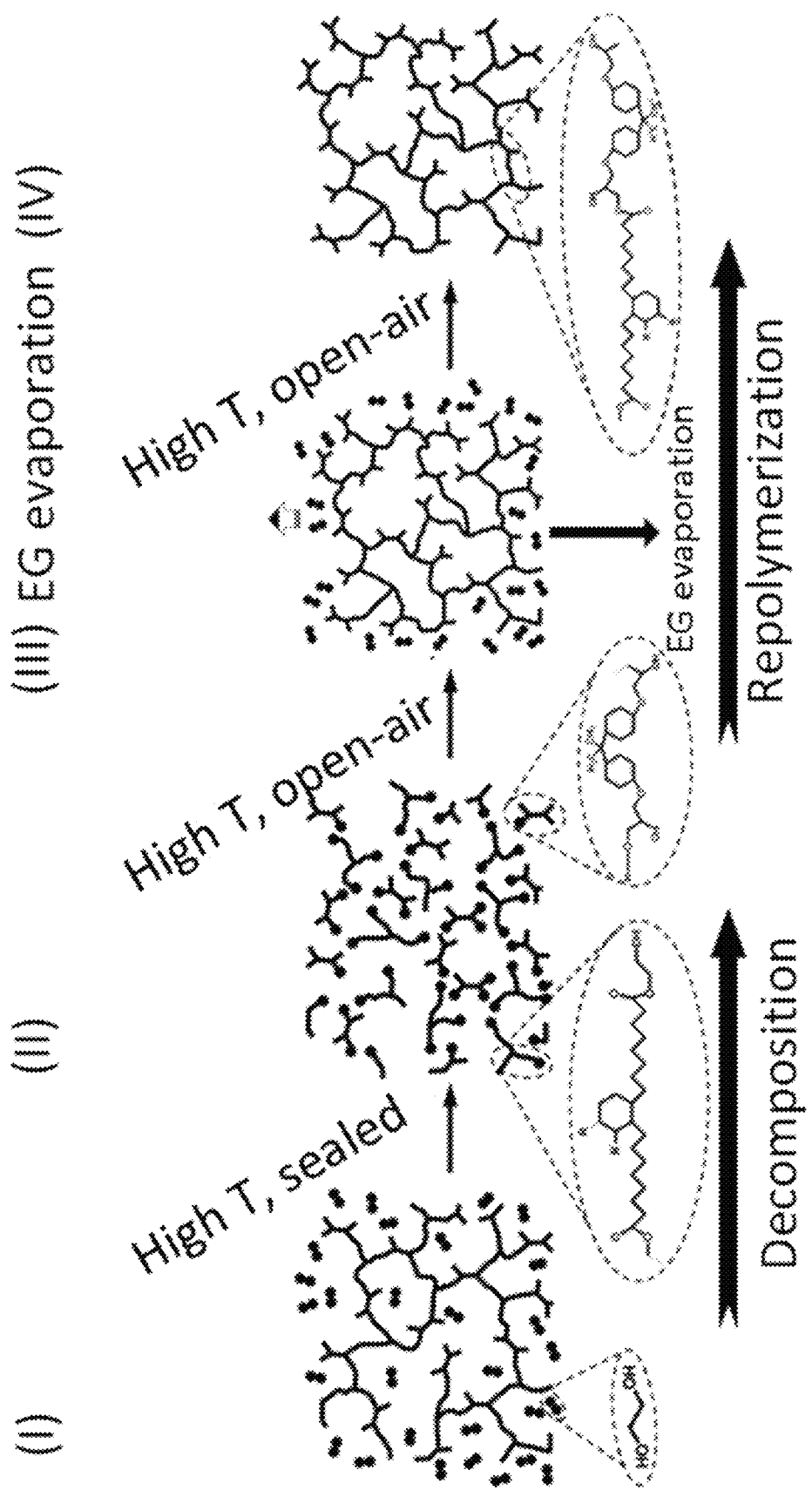

EG solvent is adopted to achieve pressure-free recycling of CAN epoxy due to a relatively higher reaction rate. FIGS. 2A-2C illustrate the dissolution and repolymerization mechanisms of CAN epoxy. In a regular CAN epoxy system, the hydroxyl groups in the ring-opened epoxy participate in the transesterification reactions. When EG is added, the hydroxyl groups in EG solvent can also participate transesterification reactions with ester groups in the polymer network; since EG molecules are small and are not linked to any long chains, they effectively break the long chain polymer into small sections, as shown in FIG. 2A. It should be noted that reactions where an EG molecule is regenerated, as shown in FIG. 2B, can also occur; but when EG is in excess amount, the reaction in FIG. 2A dominates. Therefore, as the reactions go on, the epoxy network can be gradually dissolved when sufficient EG solvent is provided. However, this will change if the reactions are conducted in an environment where the EG solvent tends to evaporate. There, the EG solvent will leave the solution, the reaction shown in FIG. 2B will dominate, resulting in repolymerization of the dissolved thermoset. Because the boiling point of EG is ~197.3° C., a moderate temperature of 180° C.-200° C. was used and an open-air environment for the epoxy repolymerization, as it will guarantee the reaction and the evaporation of excessive EG solvent. FIG. 2C schematically shows the dissolution and repolymerization mechanisms in the network, where EG molecules first penetrate into CANs, driven by the difference of EG contents between the inside and outside of the network (I). The epoxy thermoset subsequently breaks into short chain segments due to the EG-assisted transesterification (II). After dissolution, the broken chain segments start to be reconnected, as the EG evaporates at a relatively higher temperature in an open-air environment (III), and eventually, the epoxy thermoset is reformed (IV).

To measure the rate of dissolution and repolymerization, epoxy samples with different amounts of catalyst were cut into the same dimensions (12 mm×10 mm×5 mm). They were then immersed in different amounts of EG solvent in glass bottles, which were sealed and transferred into an oven with elevated temperatures (140° C., 180° C., and 220° C., respectively). Following the approach by Metters et al. (Metters, A. T., et al. Polymer, 2000. 41(11): p. 3993-4004), at intervals, the solid samples were taken out of the EG solvent, cleaned and weighed to monitor the residual mass as a function of heating time. The full dissolution of the epoxy was marked by the complete disappearance of the solid in the EG solvent. To repolymerize the epoxy, the bottle was left open to let EG naturally evaporate at high temperature. Normally, when the dissolved EG-epoxy solution was exposed to hot air, new epoxy film was formed and suspended on the top surface of the solution. Next, the film was taken out and wiped on the surface to measure the mass of the repolymerized epoxy every hour. We note that this approach may not present a sufficiently accurate method to measure the degree of polymerization; but it does offer visible and useful information about the solidification process of the epoxy. Besides, since the repolymerization is performed at high temperature for a long period, one should consider vacuum condition to avoid any significant oxidization.

Thermomechanical Characterization Tests

Two standard polymer tests were used to examine the thermomechanical properties (the glass transition and temperature dependent stress relaxation behaviors) of the repolymerized epoxy. The glass transition behaviors of the prepared and regenerated epoxy thermoset were tested by dynamic mechanical analysis (DMA). A strip sample, with the dimension of 10.0 mm×5.0 mm×1.5 mm was tested by a DMA tester (Model Q800, TA Instruments, New Castle, Del., USA) on the tensile mode. The strip sample was first heated to 100° C. and thermally equilibrated for ~20 min, and then a preload of 0.001N was applied. During the experiment, the strain was oscillated at a frequency of 1 Hz with a peak-to-peak amplitude of 0.1%. The temperature was decreased from 100° C. to −50° C. at a rate of 1° C./min. Next, the temperature was held at −50° C. for 30 min and then increased to 100° C. at the same rate. This procedure was repeated multiple times, and the data from the last cooling step was reported. For the stress relaxation tests of regenerated CANs, a polymer sample with the same dimensions mentioned above was first preloaded by 0.001N force to maintain straightness. After reaching the testing temperature (120° C., 140° C., 160° C., 180° C. and 200° C. separately), it was allowed ~20 min to reach thermal equilibrium. The specimen was stretched by 1% on the DMA tester, and the deformation was maintained during the following tests. The decrease of stress was recorded, and the stress relaxation modulus was calculated.

Pressure-Free Surface Welding Effect

Figure 3A:
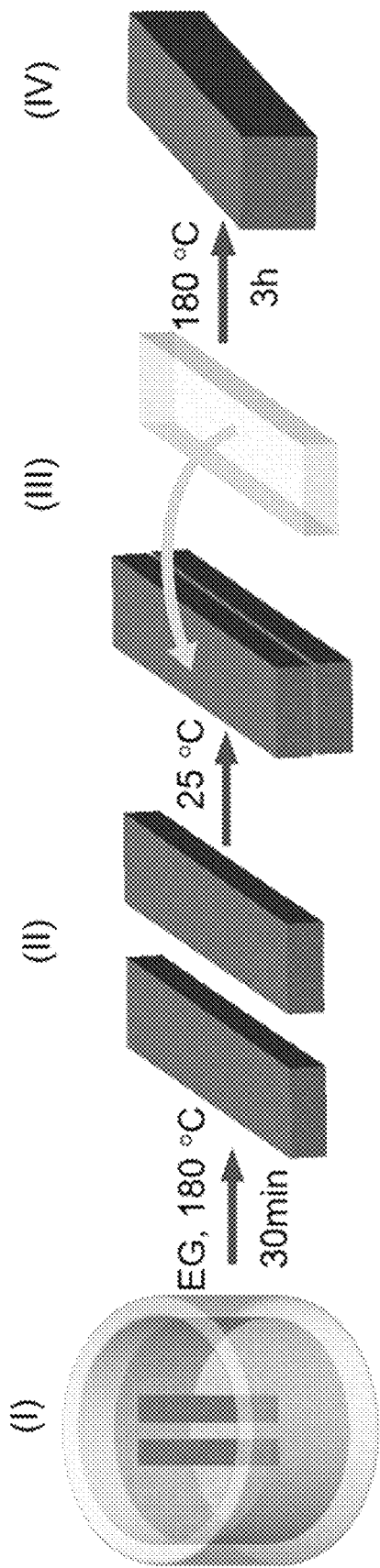
FIGS. 3A-3C are schematic illustrations of exemplary pressure-free welding and damage repair of adaptable thermosets.

We demonstrated the pressure-free surface welding effect in the CAN epoxy by using EG solvent. In the first group of experiments (FIG. 3A), prepared epoxy samples with different amounts of catalysts were cut into strips with the same dimensions (20 mm×4 mm×2 mm). These samples were then placed in a glass bottle with excess amounts of EG at the temperature of 180° C. for 30 min. As will be discussed later, such a short heating time would only dissolve a thin skin layer of CAN to create a sticky surface. After that, the two epoxy strips were attached together, and transferred to a high-temperature oven of 180° C. for different heating durations. It should be pointed out that the selected temperature was 180° C. for all of the following welding tests and powder reprocessing tests; this is high enough to permit the dynamic nature of CANs, as well as offer an acceptable EG evaporation rate during the repolymerization. Since this method requires immersing the sample in the EG solution for a certain amount of time, it is referred to as a pretreatment method herein.

Figure 3B:
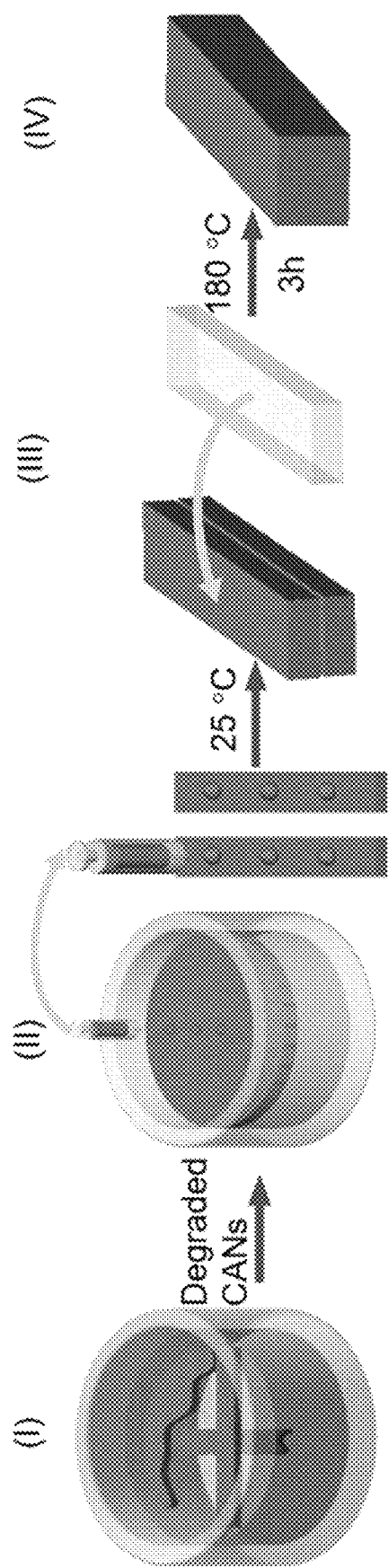

In the second group of experiments (FIG. 3B), a small amount of CAN epoxy was dissolved in EG solvent. The dissolved polymer solution, which will be called EG-epoxy glue in the following, was then used to glue two pieces of pristine strip without pre-soaking in the EG solvent. The welding condition was the same as that in the first group of experiments. This method is referred to as the EG-epoxy glue method herein.

The interfacial energy of the welded samples was quantitatively characterized by T-peeling tests (D1876-08(2015) e1, ASTM International) over different catalyst concentrations. This method was used previously for studying the healing efficiency of micro-capsuled, catalyst triggered self-healing epoxy. In the tests, an open region was cut at the end of the welded sample. After the pressure-free welding process, each end of the welded sample was loaded into two opposing grips of the DMA tester at room temperature (23° C.). During the peeling test, the grips were separated at a constant rate of speed (5%/min) for all samples. Next, the interfacial energy of the repaired samples was calculated using the measured force-displacement curves.

Figure 3C:
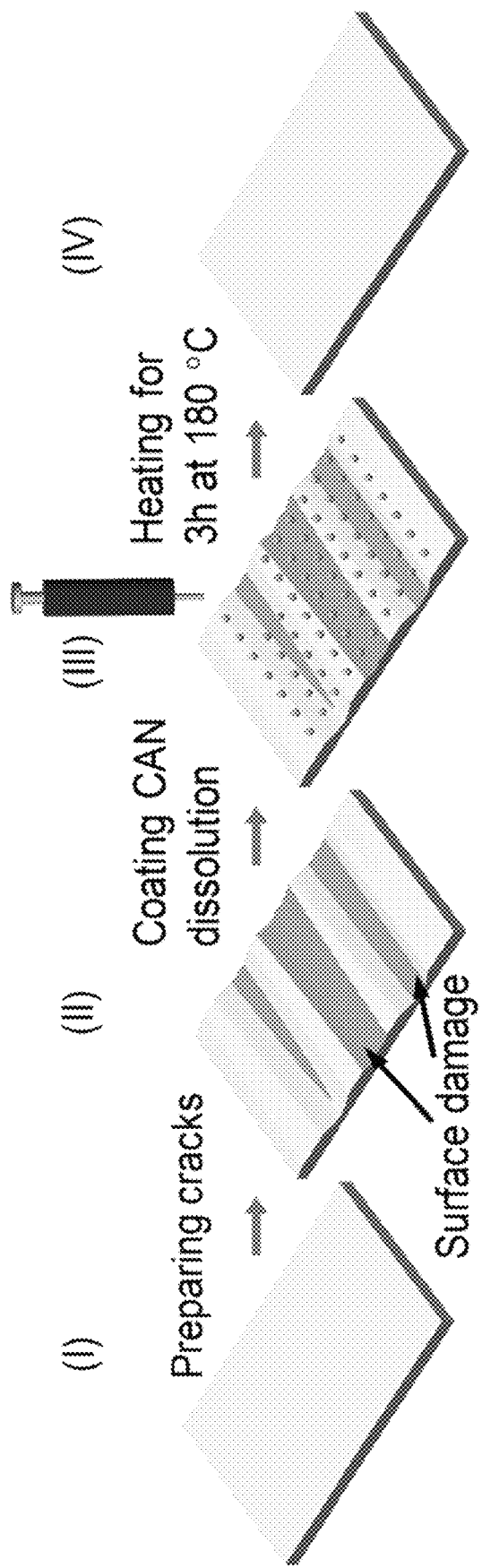

The EG-assisted welding was also applied to heal surface damage. FIG. 3C shows a schematic illustration for the procedure of damage repair. In this (the third) group of experiments, surface damage was prepared by scratching the surface of CANs by using a needle. The EG-epoxy glue was added to the damaged surface, after which the sample was placed in a 180° C. chamber for 3 h. As will be discussed in the following, the epoxy glue will flow on the CAN surface at high temperature and cover the damaged area, which eventually leads to a smoothly healed surface.

Pressure-Free Reprocessing Ability

Figure 4:
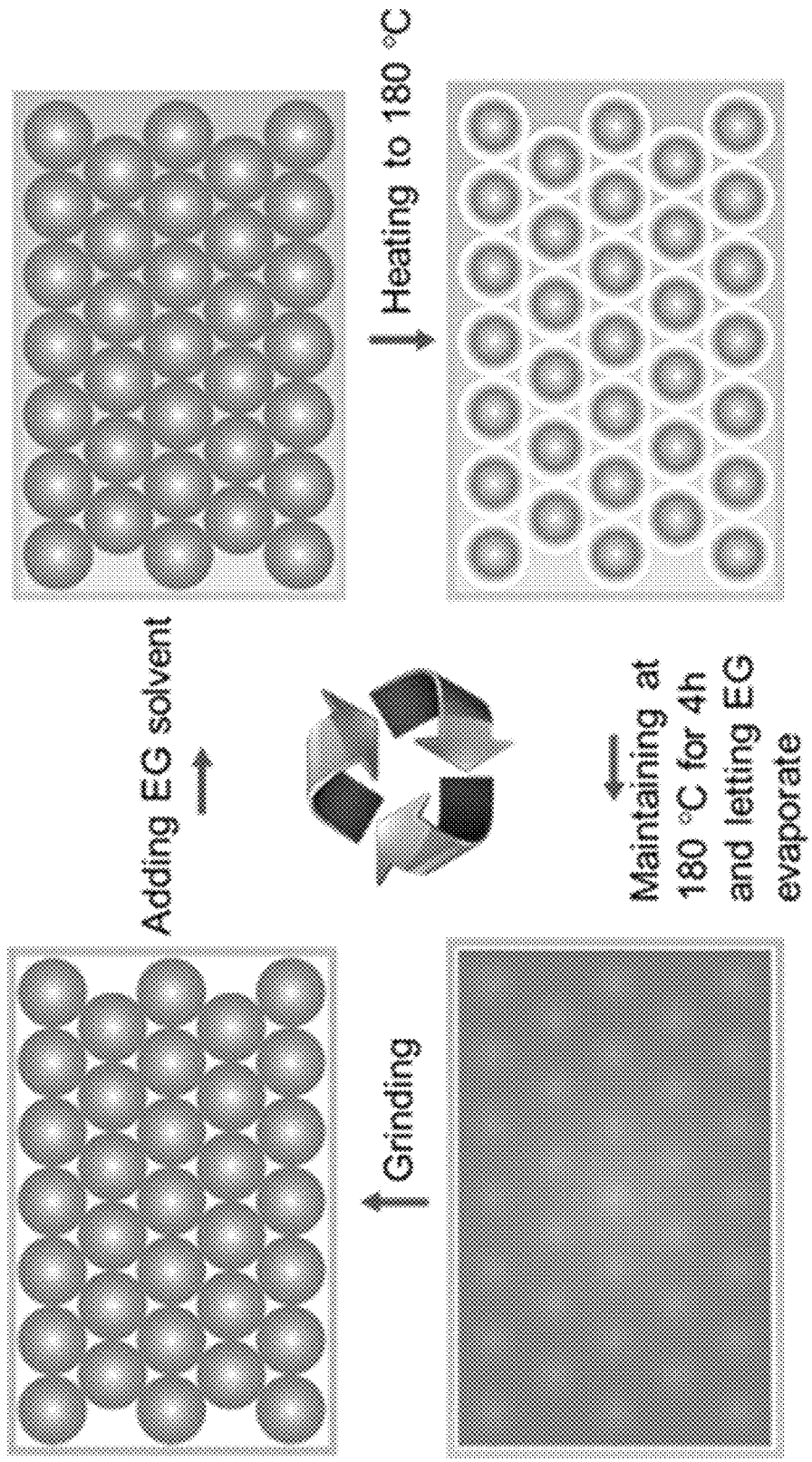
FIG. 4 is a schematic demonstrating an exemplary process for the pressure-free reprocessing of adaptable thermosets: (a) epoxy thermoset is manually ground; (b) EG is mixed with the CAN powder; (c) the polymer particles are partially dissolved on surface; and (d) the polymer particles are reassembled after heating for 4 h at 180° C.

The EG-assisted welding method was also used to reprocess the CAN epoxy from the powder state. FIG. 4 illustrates the experimental procedure. A fresh CAN epoxy was first ground into powder using a manual grinder. The typical size of the polymer powder is from ~1.30 mm to ~1.65 mm. Second, 3 g EG was added into 0.3 g ground powders followed by manual stirring for 3 min. Third, the homogeneous mixture was transferred into flat-bottomed glassware and heated at 180° C. for 4 h.

To evaluate the mechanical properties of the reprocessed sample, the DMA tester was used in tensile mode to test the mechanical behaviors at room temperature (25° C.). The loading rate was chosen to be a small value (5% per min for all tests) to minimize viscoelastic effects. The samples were trimmed uniformly to the size of 12 mm×4 mm×1 mm for testing. For each tension test, at least four samples were tested and the average values with error bars were reported.

Fourier Transform Infrared Spectroscopy Measurement

To determine the actual composition and the structure of the networks after a dissolution/re-crosslinking cycle, Fourier transform infrared spectroscopy (FTIR) tests were conducted to monitor and characterize the conversion of functional groups (esters, hydroxyls, and epoxy COC groups) in both EG-assisted dissolution and repolymerization process.

Five samples were prepared before the FTIR measurements: 1) fresh CANs, 2) pre-dissolved CANs that was dissolved in EG solvent at 180° C. for 60 min, 3) fully dissolved CANs after soaking in EG at 180° C. for 240 min, 4) pre-crosslinked CANs that was repolymerized at 180° C. for 60 min from a fully dissolved epoxy solution. 5) fully recycled CANs that was repolymerized at 180° C. for 180 min. The FTIR measurements were performed at the room temperature by using Thermo Scientific Nicolet iS50 FT-IR spectrometer fitted with an ATR cell. Tests were carried out for all these 5 samples respectively. The spectrum of each sample is the averaged result from 32 scans collected from $550^{-1}$ to 4000 $cm^{-1}$ at 1 $cm^{-1}$ resolution.

Results

Time and Temperature Dependent Dissolution and Repolymerization of CAN Epoxy

Figure 5A:
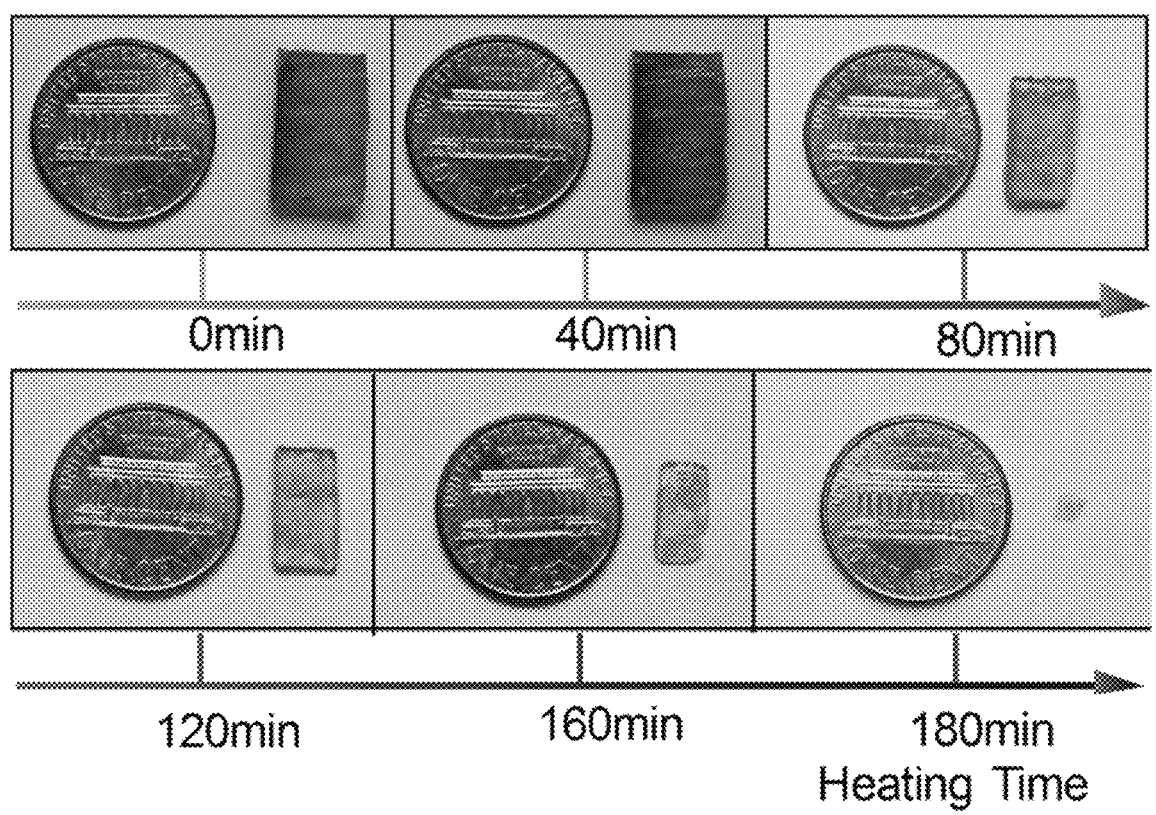
FIGS. 5A-5D demonstrate the dissolution tests on the epoxy thermosets.
Figure 5B:
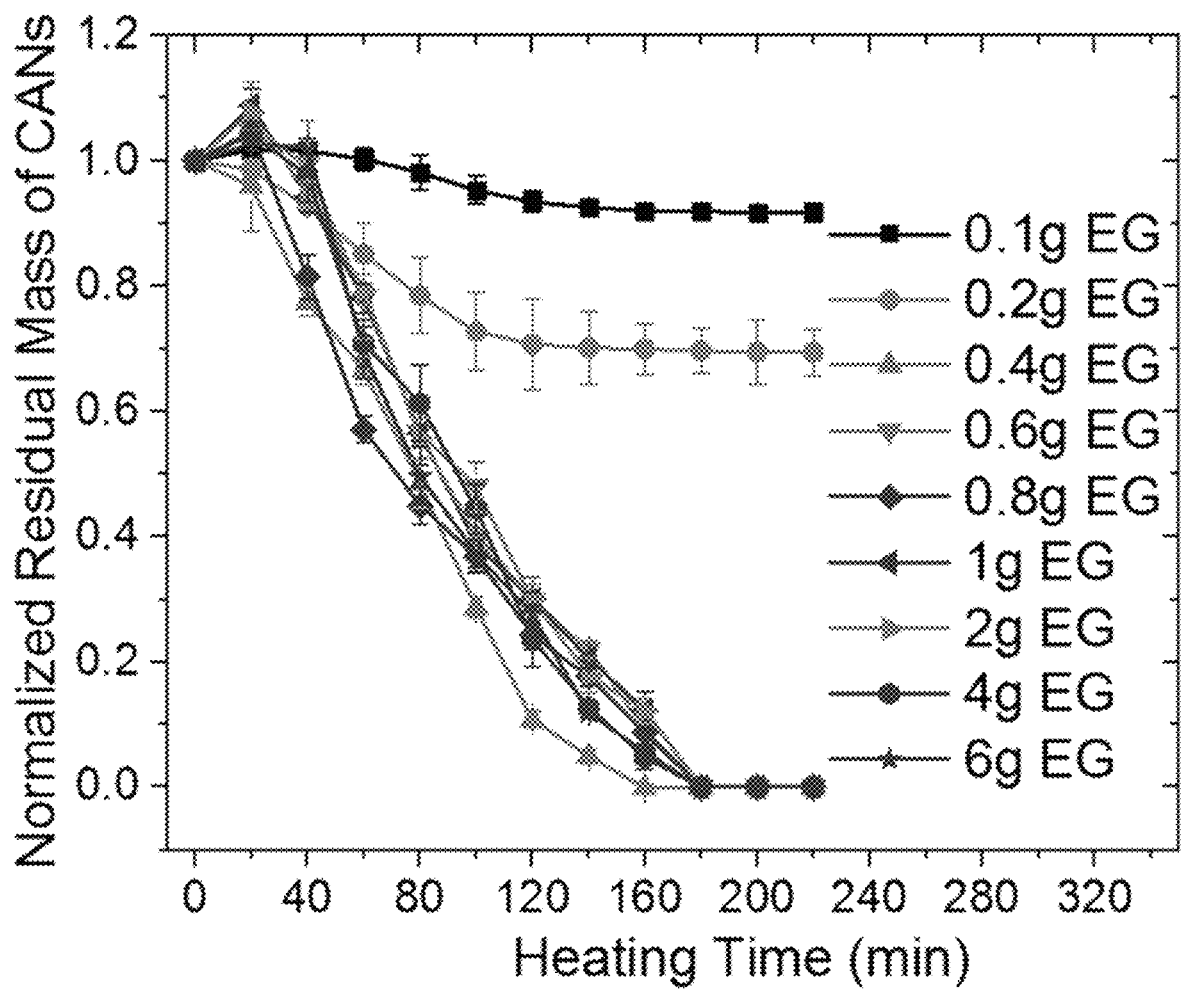

The dissolution of CAN epoxy immersed in high-temperature EG solvent was first characterized. FIG. 5A presents the evolution of appearance and size of a sample after being heated to 180° C. in EG solvent for different time periods. Apparently, the dissolution of CAN epoxy is a surface erosion type. The color of the fully dissolved CAN epoxy-EG solutions with various catalyst concentrations varied a little with the increase of catalyst content. The viscosity of all the EG dissolutions is relatively low, which assists their spreading on the material's surface when they are used for surface welding and surface damage repair. FIG. 5B shows the normalized weight of the epoxy sample as a function of heating time with different amounts of EG solvent. For FIG. 5C, the catalyst concentration is 5 mol % and the heating temperature is 180° C. When the EG content is greater than 0.4 g, the dissolution rate in each case maintains a constant around 0.01 g/min. It should be noted that since the dissolution is of the surface erosion type, this number should depend on the surface area or volume. Considering the initial sample dimension is 12 mm×10 mm×5 mm, the dissolving rate is ~2.2×$10^{-5}$ g $mm^{-2}$/min.

Figure 5C:
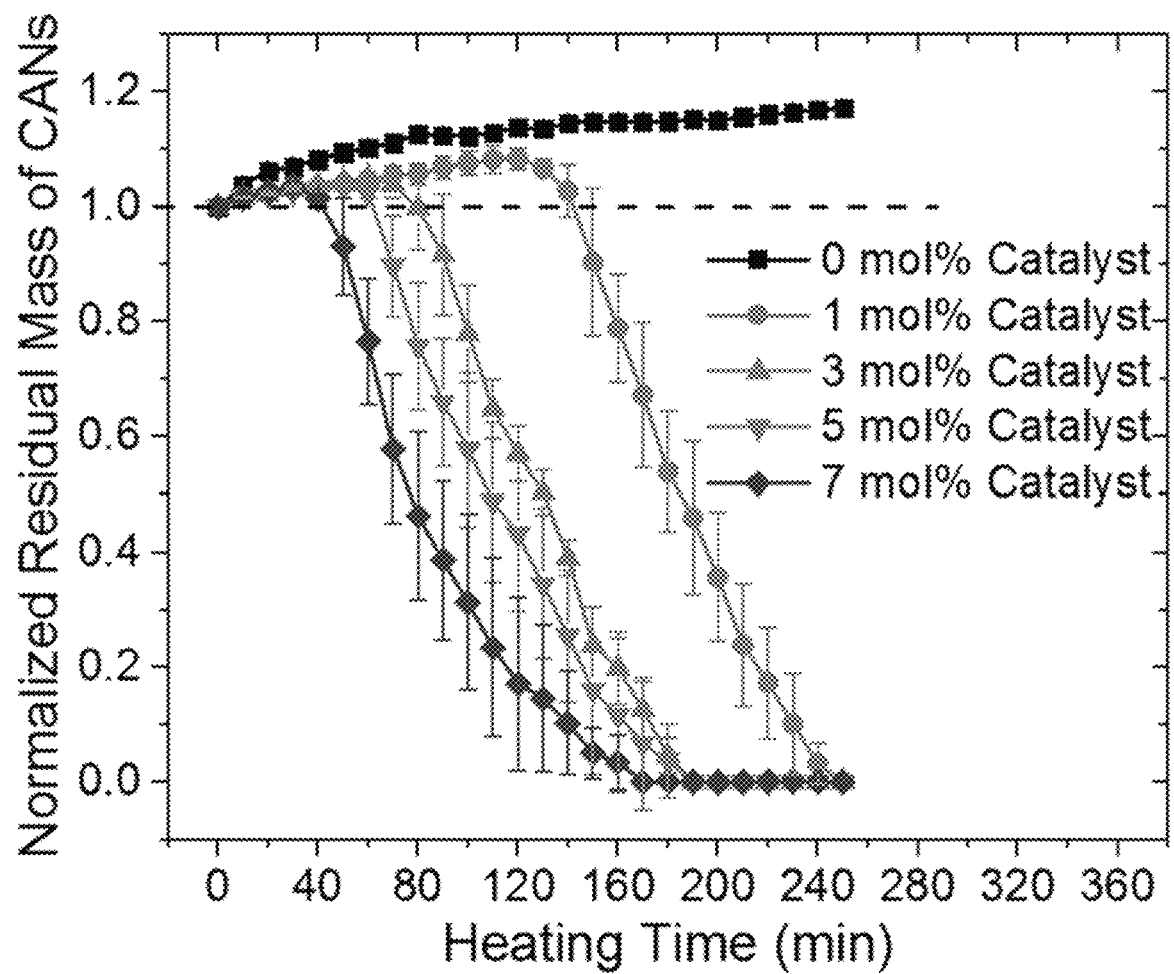
Figure 5D:
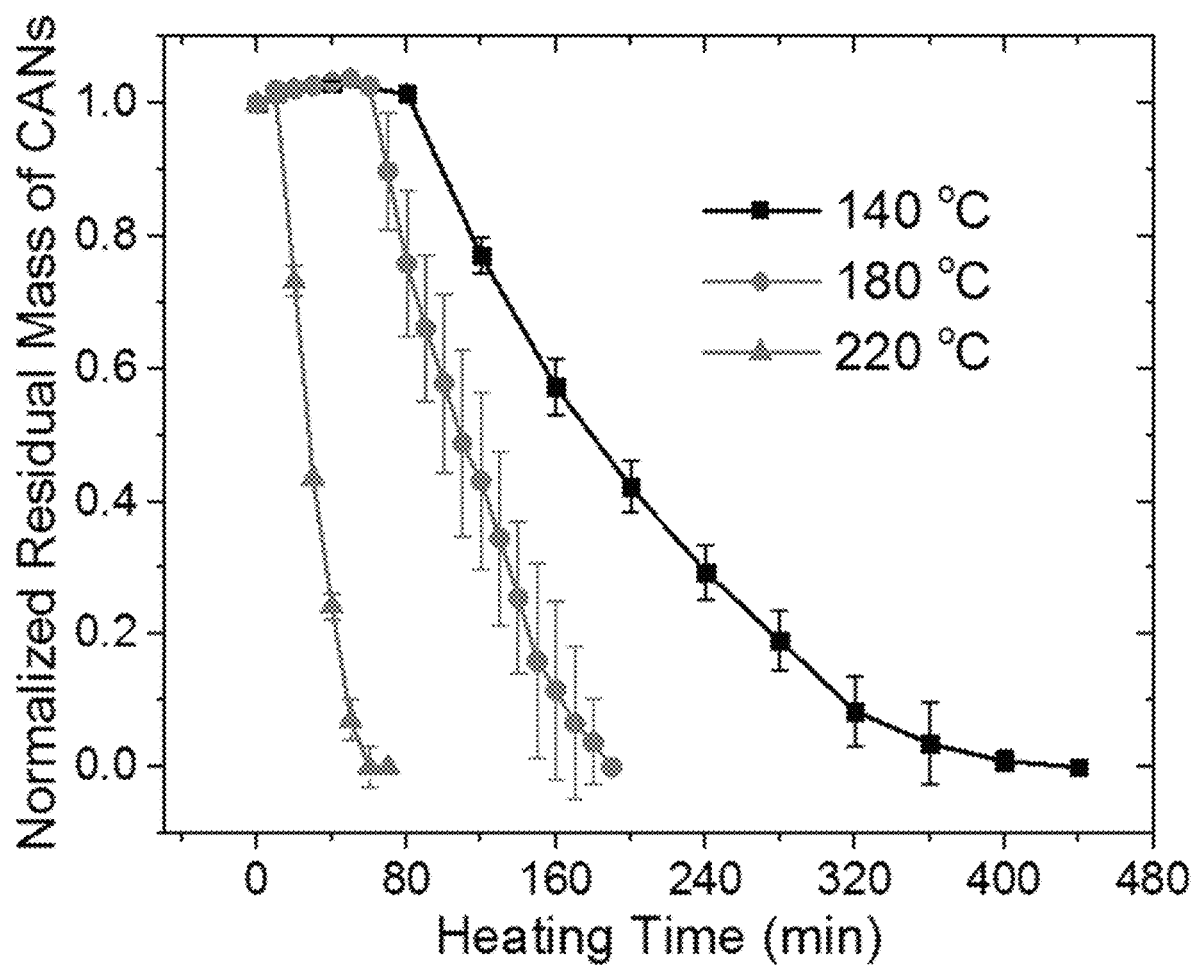

FIGS. 5C-5D show the change in the normalized weight of the epoxy sample as a function of catalyst concentration and heating temperature, respectively. In FIG. 5C, it is seen that when no BER (or no catalyst) is involved in the epoxy network, no dissolution was observed in the samples even after immersion in the solvent for 4 hours. The epoxy absorbs the EG solvent, and the final weight increase is ~4 wt %. This observation confirms that the transesterification type BERs are the reason for the dissolution of CAN epoxy. In addition, FIG. 5C also shows that the initiation of dissolution is delayed by decreasing the amount of catalyst. However, it is interesting to find that the subsequent dissolution rate is about the same at ~0.01 g/min. In contrast, FIG. 5D identifies the changes in dissolution rate due to the different heating temperatures. For example, when the temperature is increased from 140° C. to 220° C., the dissolution rate increases from ~0.0032 g/min to ~0.025 g/min. We conjecture that this temperature response can be explained according to the three processes that determine the dissolution rate: the diffusion of EG molecules into the polymer network, the breaking and reforming of polymer chains due to the BERs, and the diffusion of broken chain segments into the solvent. In FIG. 5C, for example, a higher concentration of catalyst leads to a higher rate of BERs, so the epoxy sample with 7 mol % catalyst loses its weight first. However, the subsequent dissolution is limited by the rate at which polymer chains diffuse away from the polymer-solvent interface. Since this diffusion mechanism mainly depends on the temperature, the dissolution rate in each case of In FIG. 5C, is almost the same after the starting point. On the other hand, when the temperature is increased, all the aforementioned three processes speed up, which consequently leads to a higher rate of dissolution of the CAN epoxy sample (see FIG. 5D).

Figure 6:
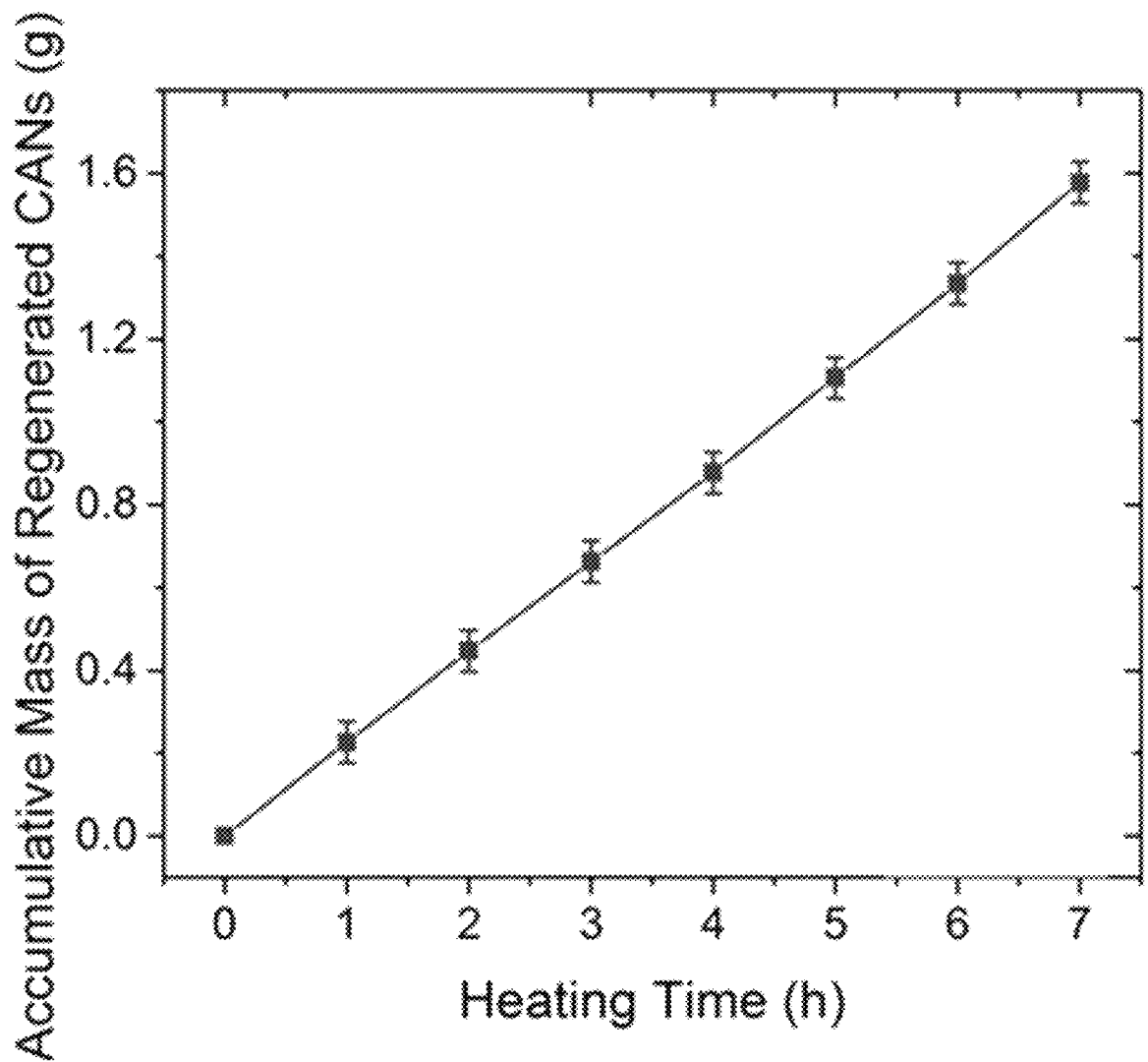
FIG. 6 is a graph of the accumulative mass of re-polymerized CANs as a function of heating time at 200° C. The catalyst concentration in epoxy thermoset is 5 mol %.

As discussed above, the transesterification-type BER allows repolymerization of CAN epoxy when EG is evaporated. FIG. 6 shows the rate of repolymerization by measuring the accumulated solid mass during the epoxy solidification. It is seen that at the temperature of 200° C., the mass of repolymerized epoxy is in an almost linear relation with the heating time, and the repolymerization rate is ~0.23 g/h (0.0038 g/min). In the experiments, we also found that because the density of dissolved epoxy is lower than that of EG solvent, it suspends in the top layer of the solution. Such a phase separation between dissolved epoxy and EG is shown in bottom inset of FIG. 6. For a dissolved polymer solution with finite depth, the repolymerization always starts on the solution-air interface where EG molecules first evaporate out of the mixture. This led to a solidified film on the surface, which acts as a barrier for further solvent evaporation. The suspended epoxy thin film will suppress the EG evaporation, and consequently the repolymerization of the epoxy beneath it. So the repolymerized epoxy may initially possess hierarchical structure with different cross-linking degree in the thickness direction. For current study, we give a sufficiently long repolymerization time so the BERs eventually lead to a uniform network.

Figure 14A:
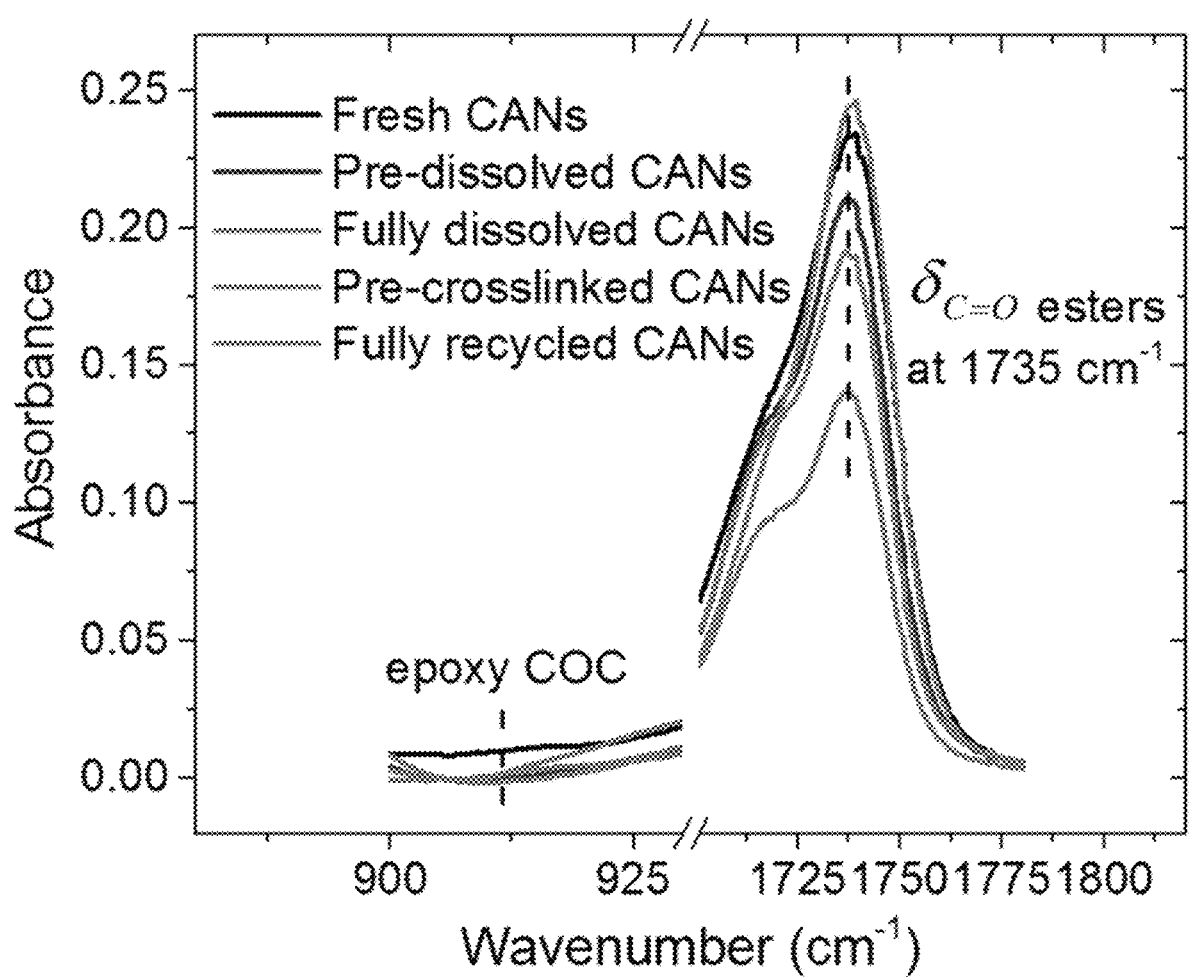
FIGS. 14A-14B are FTIR traces to monitor the functional groups in both dissolution and repolymerization steps.
Figure 14B:
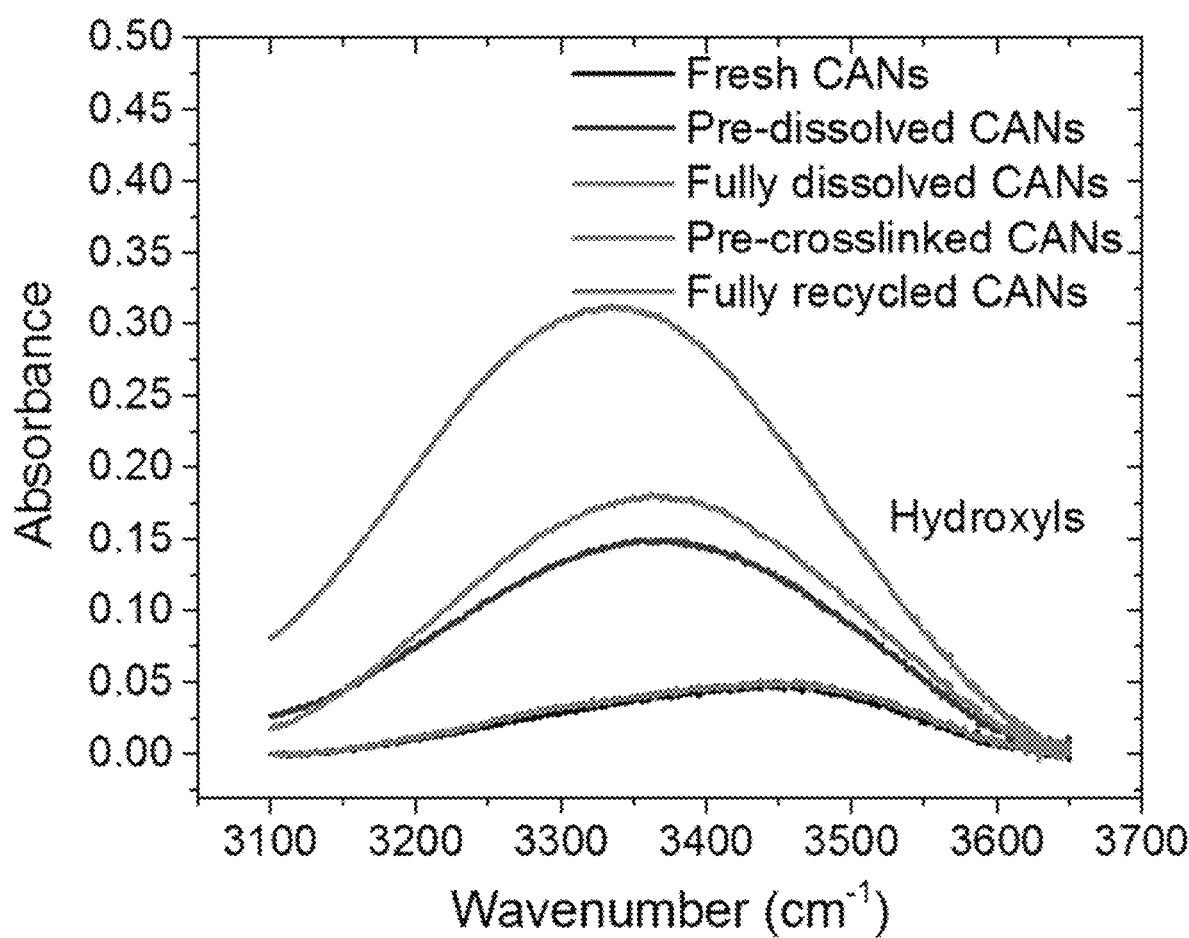

Fourier transform infrared spectroscopy (FTIR) tests were conducted on epoxy samples in both dissolution and repolymerization steps. FIGS. 14A-14B trace the conversion of esters, epoxy COC and hydroxyls. A notable characteristic peak of esters is observed at 1735 cm$^{-1}$ in FIG. 14A which remarkably decreases in the dissolution process and then completely recovers to the original level during repolymerization. On the other hand, the corresponding hydroxyl groups in FIG. 14B increases as the progressive dissolution proceeds, and then drops to the same level as that in fresh CANs after being heated at 180° C. for 180 min. This demonstrates that there is no remnant EG molecules left in the epoxy network, and the dissolved polymer solution is fully polymerized. On the other hand, the FIG. 14A also shows a relatively stable trend of the epoxy COC. It means that this group hardly participates in the EG-assisted transesterification type BERs. The conversions only occur between hydroxyls and esters during the EG-assisted transesterification type BERs. The results confirm that both ester and hydroxyl groups in recycled epoxy return to the same level of those in fresh epoxy, so all the EG solvent is evaporated and the dissolved polymer solution is fully polymerized into epoxy thin film. The results also imply that a finer control of exposure area and mechanical stirring will accelerate the rate of repolymerization. Consequently, mechanical stirring will be used in the next section to regenerate homogeneous CANs.

The aforementioned dissolution and repolymerization cycle was also tested by using a mono-alcohol 2-ethyl hexanol (2E1H), and the testing results are described below. It is seen that the epoxy thermosets can still be fully dissolved and repolymerized into a new generation epoxy sample. FTIR tests confirm that both ester and hydroxyl groups in the recycled epoxy return to the same level as that of fresh epoxy. However, it shows that that the dissolution and repolymerization rates in 2E1H are much smaller than that in EG solvent when the same temperature is given. This is because that each 2E1H molecule only provides one hydroxyl group, which consequently leads to a smaller BER efficiency compared with that using di-functional alcohol EG.

Thermomechanical Property of the Repolymerized CANs

Figure 7A:
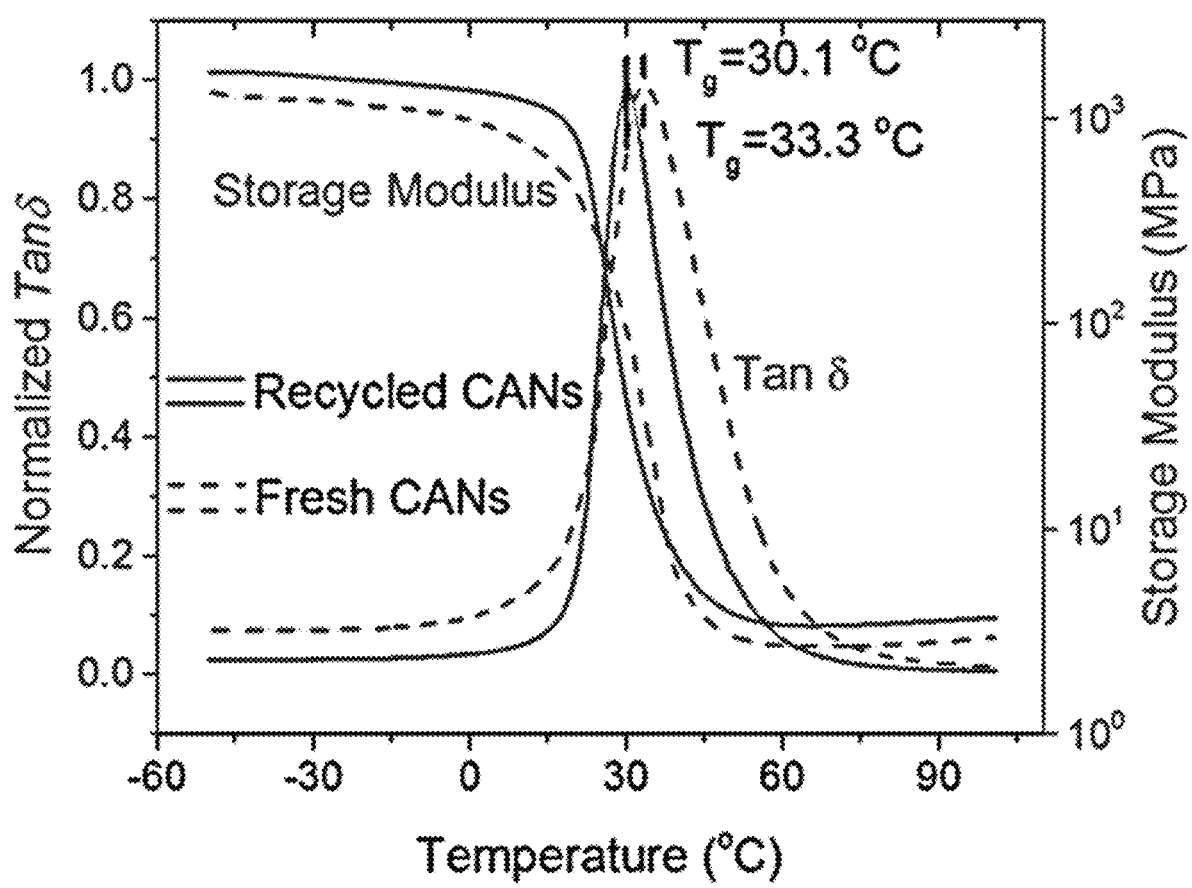
FIGS. 7A-7C demonstrate the thermomechanical behaviors of the repolymerized and fresh epoxy thermosets.
Figure 7B:
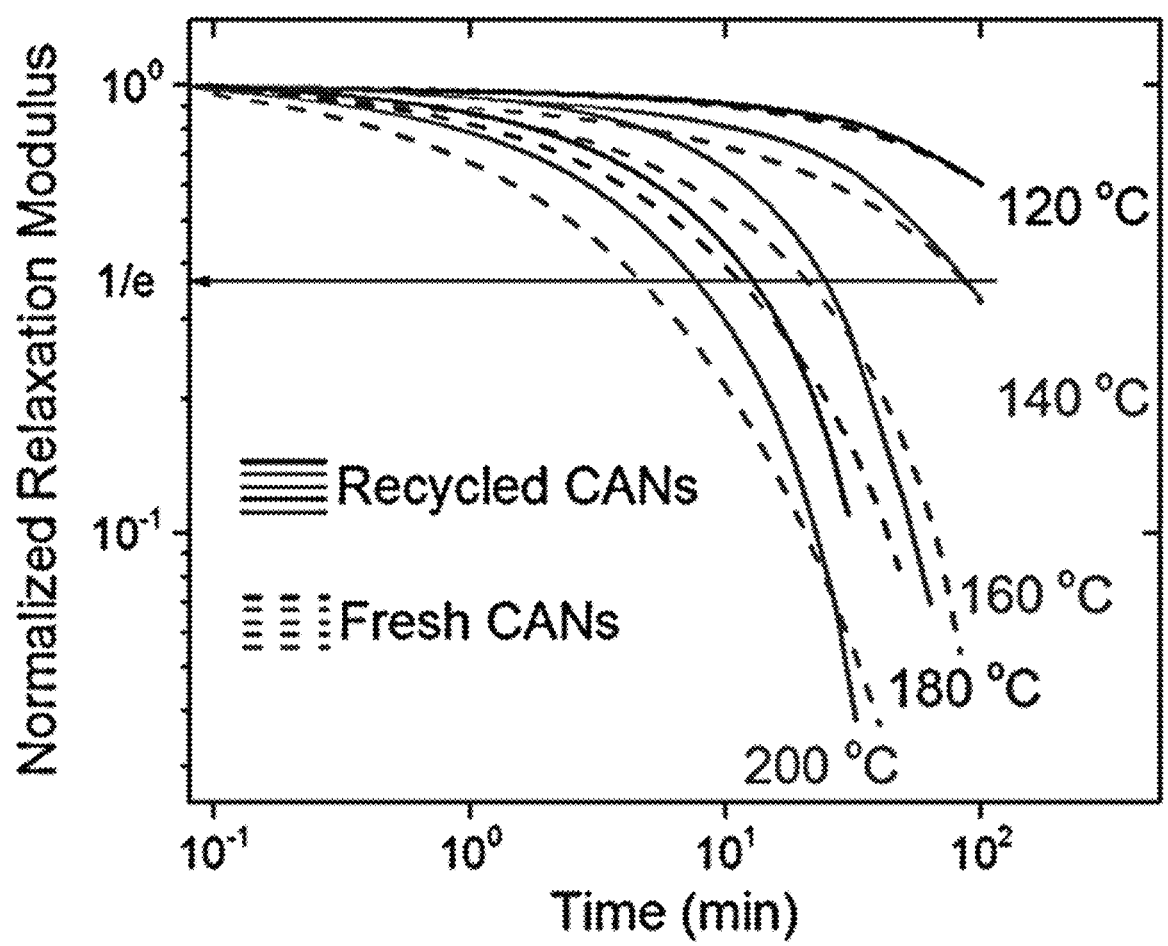

In this section, we characterize the thermomechanical properties of the repolymerized epoxy with 5 mol % catalyst. The material was obtained by heating 3 g of dissolved polymer solution on a hotplate at 200° C. with magnetic stirring. After ~30 min, the mixture was transferred to an oven at 200° C. for another 2.5 h. The former heating with mechanical stirring allows the quick evaporation of residual EG in the solution and homogeneous reformation of a solid epoxy material. FIG. 7A shows the normalized tan δ and storage modulus of both fresh and repolymerized epoxy as a function of temperature. It is seen that the storage modulus of the recycled epoxy is larger than that of fresh one, which might be resulted from the oxidation of epoxy during the repolymerization. However, since the modulus change is small, we expect a minimal influence of oxidation on the BER kinetics and associated thermomechanical properties of epoxy thermosets. In real application, oxidation should be addressed and controlled. The temperature at the peak of tan δ is referred as the glass transition temperature $T_g$ of the material. The $T_g$ of the repolymerized material is 30.1° C., which is very close to that of fresh epoxy (33.3° C.). FIG. 7B shows is a comparison of normalized stress relaxation curves at different temperatures (namely, 120° C., 140° C., 160° C., 180° C. and 200° C.) between the repolymerized and fresh CANs. The results show that the regenerated material has nearly the same stress relaxation behavior as the fresh epoxy. Epoxy thermosets recycled by using monoalcohol 2E1H is also seen to exhibit the same glass transition behavior as fresh material (Fig. S2 in the Supplementary Materials). The stress relaxation behavior of the thermoset can be captured by using a simple exponential function, namely:

$$\frac{\sigma}{\sigma_0} = \exp\left[-\frac{t}{\tau}\right], \quad (1)$$

with the stress relaxation time:

$$\tau = \frac{1}{k}\exp\left[\frac{E_a}{R(T+273.15)}\right]. \quad (2)$$

Figure 7C:
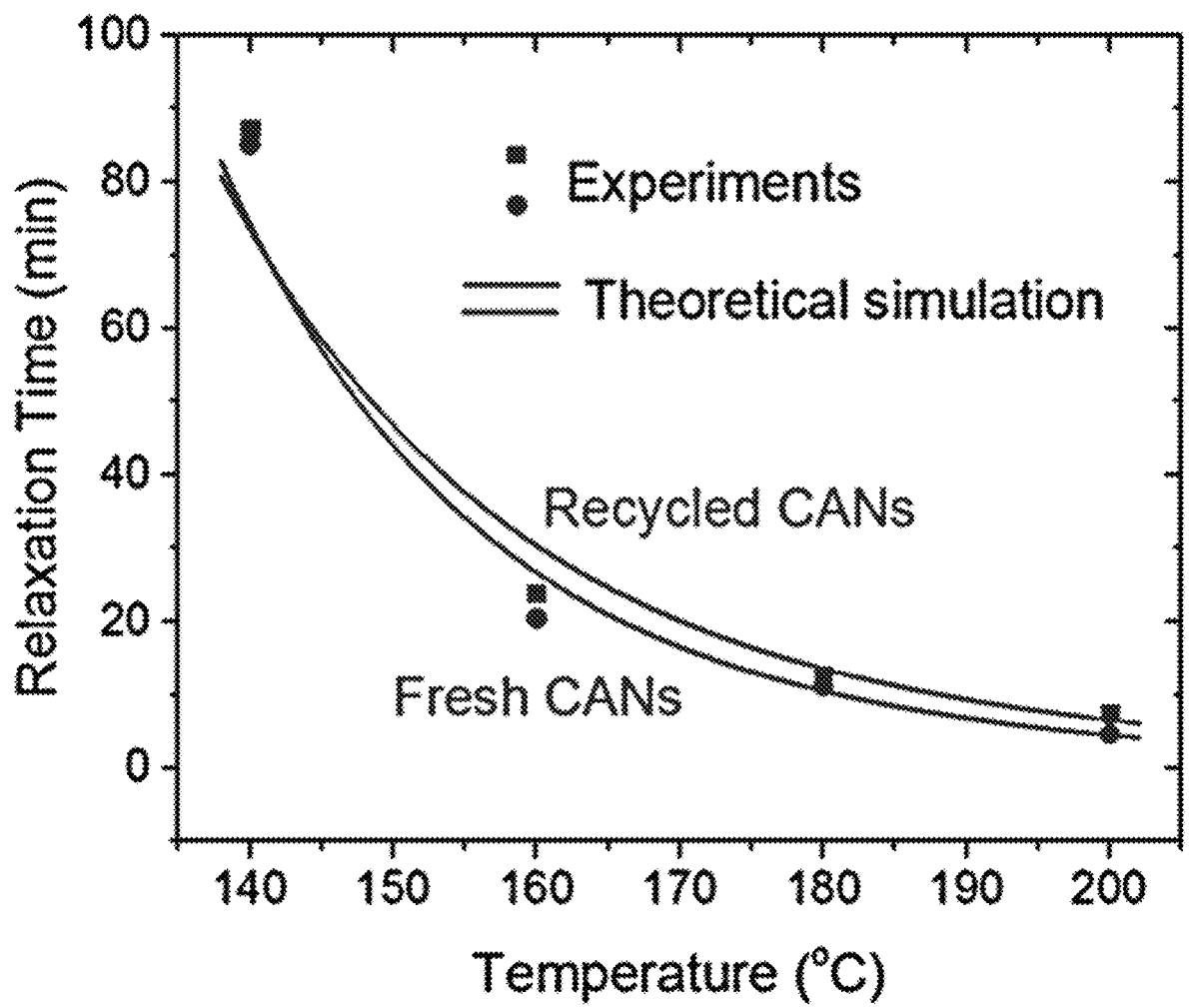

In the above equations, $\sigma_0$ is the stress before relaxation, k is a kinetic coefficient (k>0), R is the gas constant of 8.314 J/(mol·K), T is the Celsius temperature, and $E_a$ is the activation energy for BERs. In FIG. 7B, after fitting the experimental curves by using exponential functions, we can obtain the stress relaxation times at different temperatures, and they are plotted in FIG. 7C. It is seen that the relaxation times of the repolymerized epoxy agree very well with those of fresh epoxy. The activation energy $E_a$ is ~70 kJ/mol, which is close to that of fresh epoxy reported before (68.2 kJ/mol). Based on the above mentioned similarities of glass transition point and stress relaxation capability, we can claim that the epoxy thermosets can be easily and efficiently recycled via EG-assisted transesterification BERs without pressure.

EG-Assisted Surface Welding of the CAN Epoxy

The interfacial welding ability of the CAN epoxy was investigated. Here, we demonstrate the welding process, where it can be done over any surfaces rather than exclusively the fresh cut ones, and welding pressure is not required. Two methods for pressure-free welding are presented. The first of these is the pre-treatment approach, where the epoxy strips were pre-treated by being soaked in the EG solvent at high temperature and then attached together for welding.

Figure 8A:
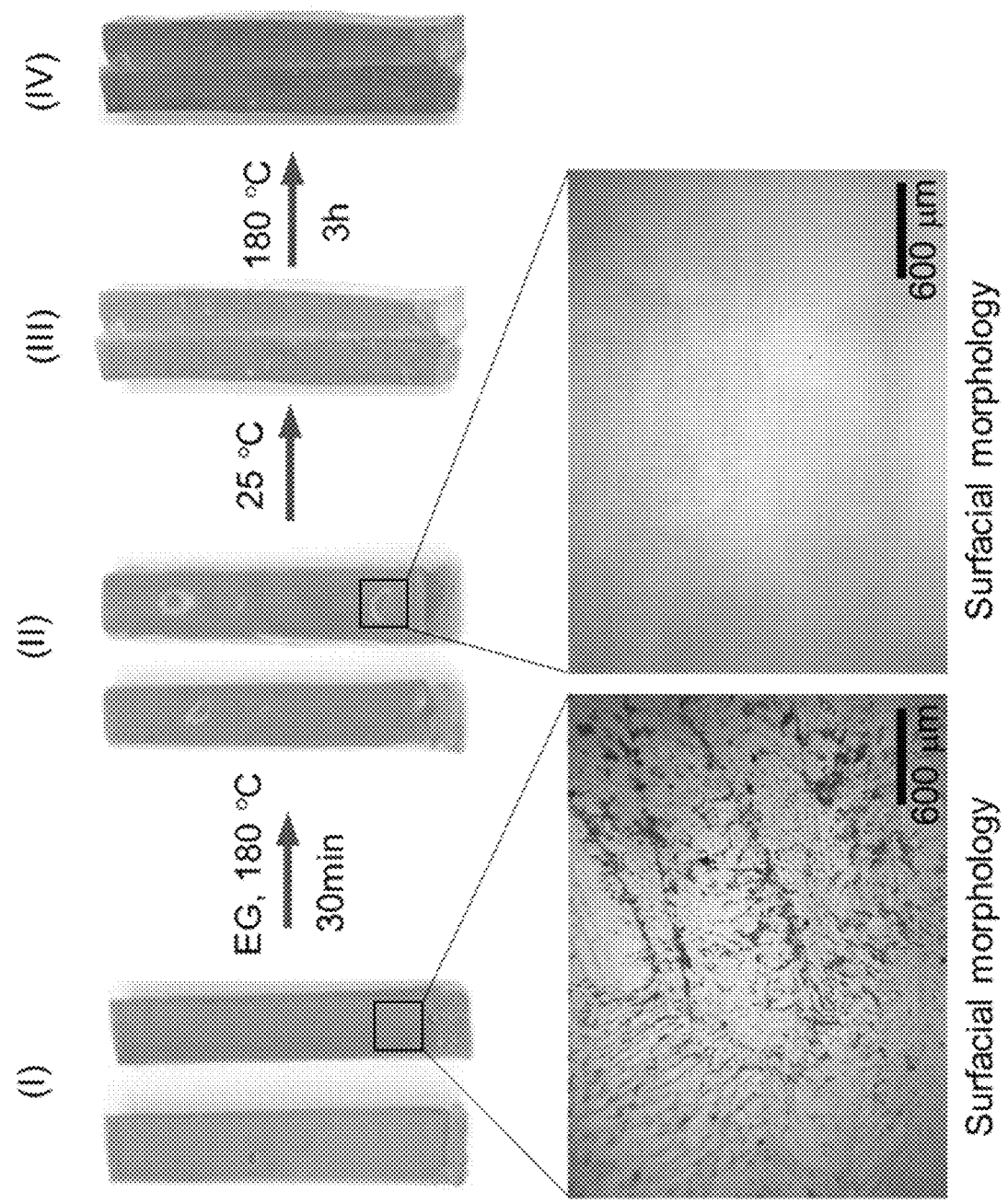
FIGS. 8A-8B demonstrate an exemplary pre-treatment welding procedure.
Figure 8B:
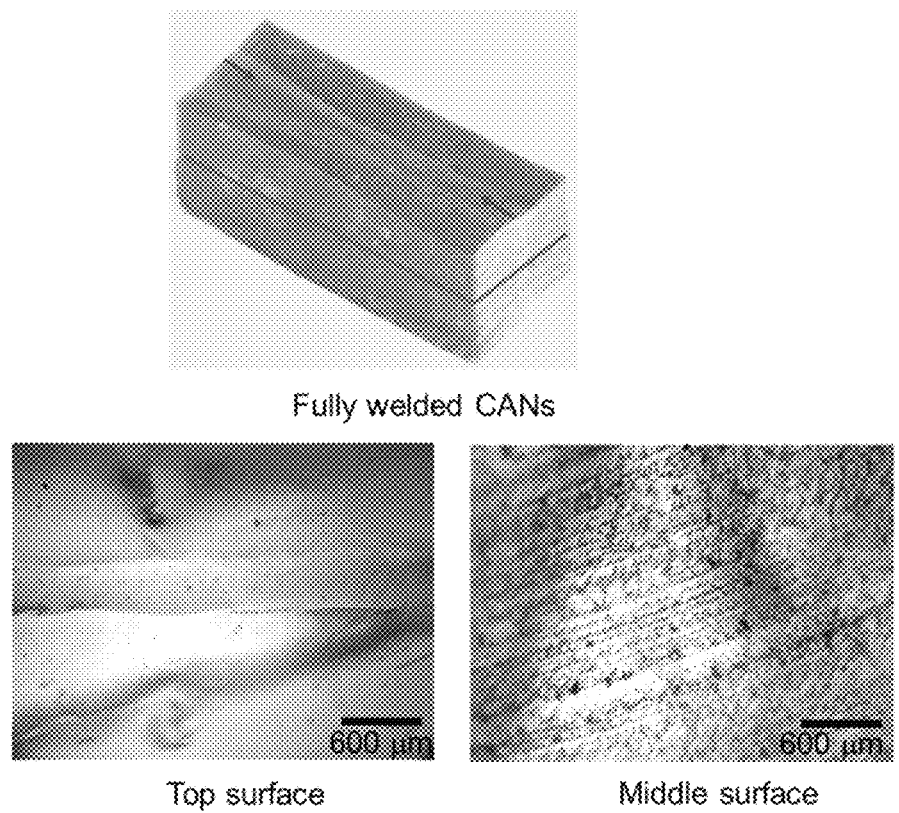
Figure 9A:
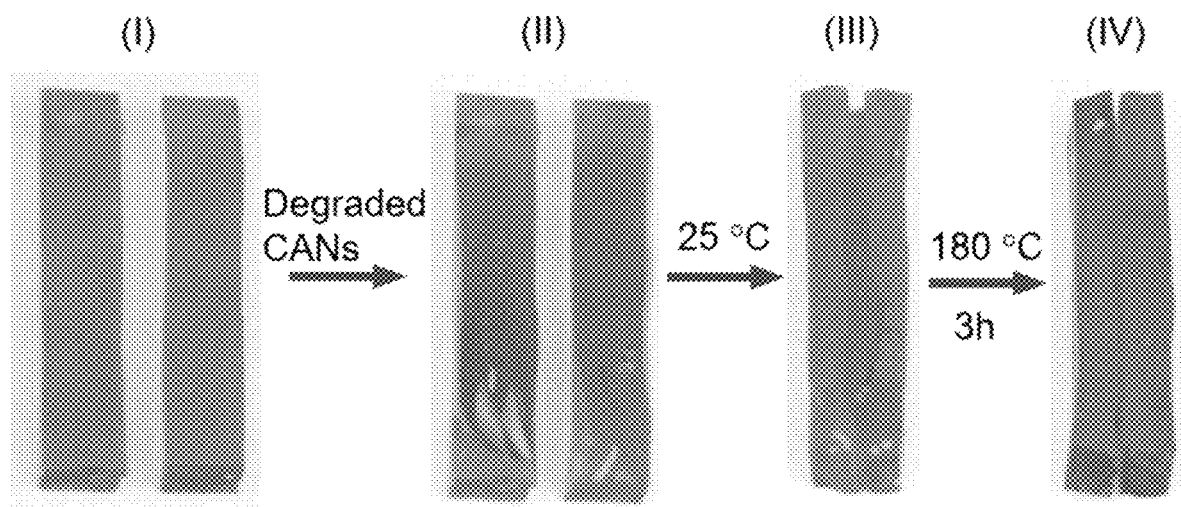
FIGS. 9A-9B demonstrate an exemplary EG-epoxy glue welding procedure.
Figure 9B:
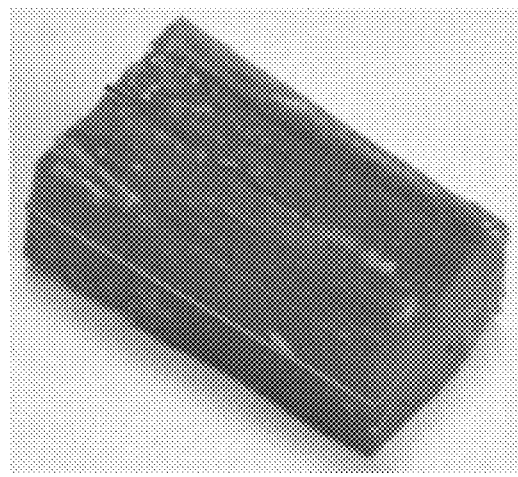
Figure 9B:
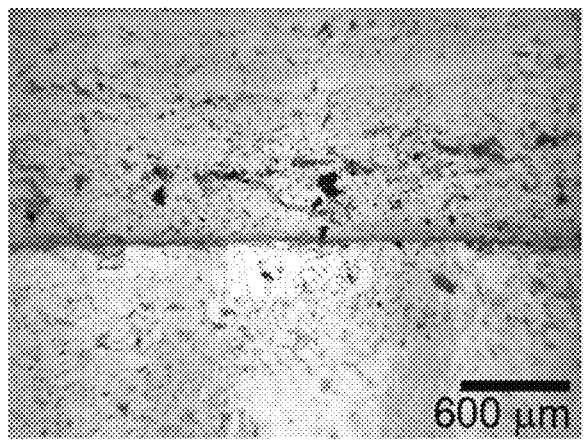
Figure 9B:
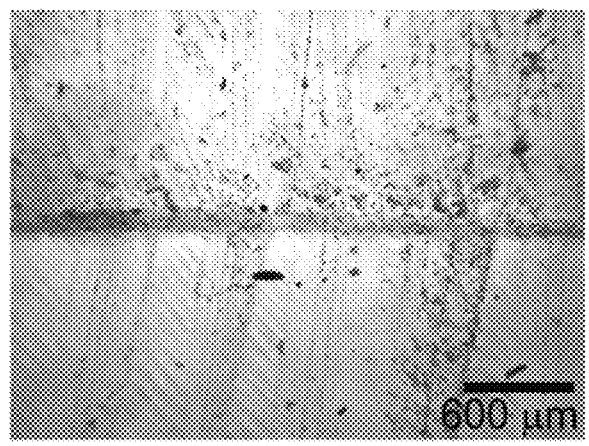

FIG. 8A shows the results obtained from tests of the pre-treatment welding method. First, the prepared CANs were cut into strips with specific dimensions. The cut surface was observed by an optical microscope (model V5MP, VWR International, Radnor, Pa., USA) (see bottom-left in FIG. 8A), which shows many tiny defects. There are also some scratches due to the cutting blade. The sample was then immersed in the EG solvent at 180° C. for 30 min. Polymer dissolution occurred on the surface (see bottom-left in FIG. 8A), which shows that the originally rough surface (in bottom-left) became smooth. Next, the two strips were stacked together at room temperature without applying pressure; because the dissolved surface was tacky, the two strips stuck together easily. Finally, the two strips were transferred to an oven maintaining 180° C. for 3 h. FIG. 8B shows optical images of the completely welded sample in the top surface and middle surface. Here, the middle surface was obtained by cutting the welded sample along the green lines (shown in FIG. 8B). The top surface image shows the mark of the interface; however, the image from the cut in the middle does not show any sign of an interface, indicating almost perfect welding. This is different from our previous work for surface welding, where welding pressure was necessary to close the voids on the interface, yet there were still voids and debris (Yu, K., et al., Journal of the Mechanics and Physics of Solids). In the current work, no pressure is applied, yet an almost perfect welding is achieved. This is mainly for two reasons: first, the pre-treated epoxy surface is smooth enough and is in viscous liquid state, which guarantees a good contact on the interface (see FIG. 8A); second, the surface layer of the epoxy sample has been partially dissolved before welding. The capillary force of the viscous solution could further assist the mixing and bonding of the interfacial material. It should be noted that the quality of this welding method depends on the pre-treatment time of CAN. Over-soaking an epoxy thermoset sample will lead to excessive surface corrosion, and consequently notable deformation of sample after welding. A good selection of pre-treatment time can maintain both welding strength and welding quality at the same time In the second method of pressure-free welding, the epoxy was fully dissolved first, and the dissolved polymer solution was used as glue to weld another two pieces of fresh epoxy sample (shown in FIG. 9A). In our experiments, five drops of dissolved epoxy (~0.02 ml) were carefully coated onto the surface of two epoxy strips (20 mm×4 mm×2 mm). We also rubbed the two surfaces against each other to ensure a good spreading of the EG-epoxy glue. The EG-epoxy glue makes the two samples easily stick together. Finally, the two strips were transferred to an oven at 180° C. for 3 h (no pressure was applied during the welding). To examine the influence of catalyst concentration on the welding efficiency, five groups of epoxy thermosets with different amounts of catalyst (1 mol %, 3 mol %, 5 mol % and 7 mol % respectively) were dissolved and used as glue for the aforementioned EG-epoxy glue welding. It should be noted that the catalyst concentration in the epoxy samples to be welded was always the same as that in the epoxy glue. Optical morphology images of the top and middle surfaces of the welded epoxy samples are represented in the bottom figure of FIG. 9B. In contrast to the tests of pre-treatment welding, an interface can be observed between the welded epoxy strips (see the red arrows).

Figure 10A:
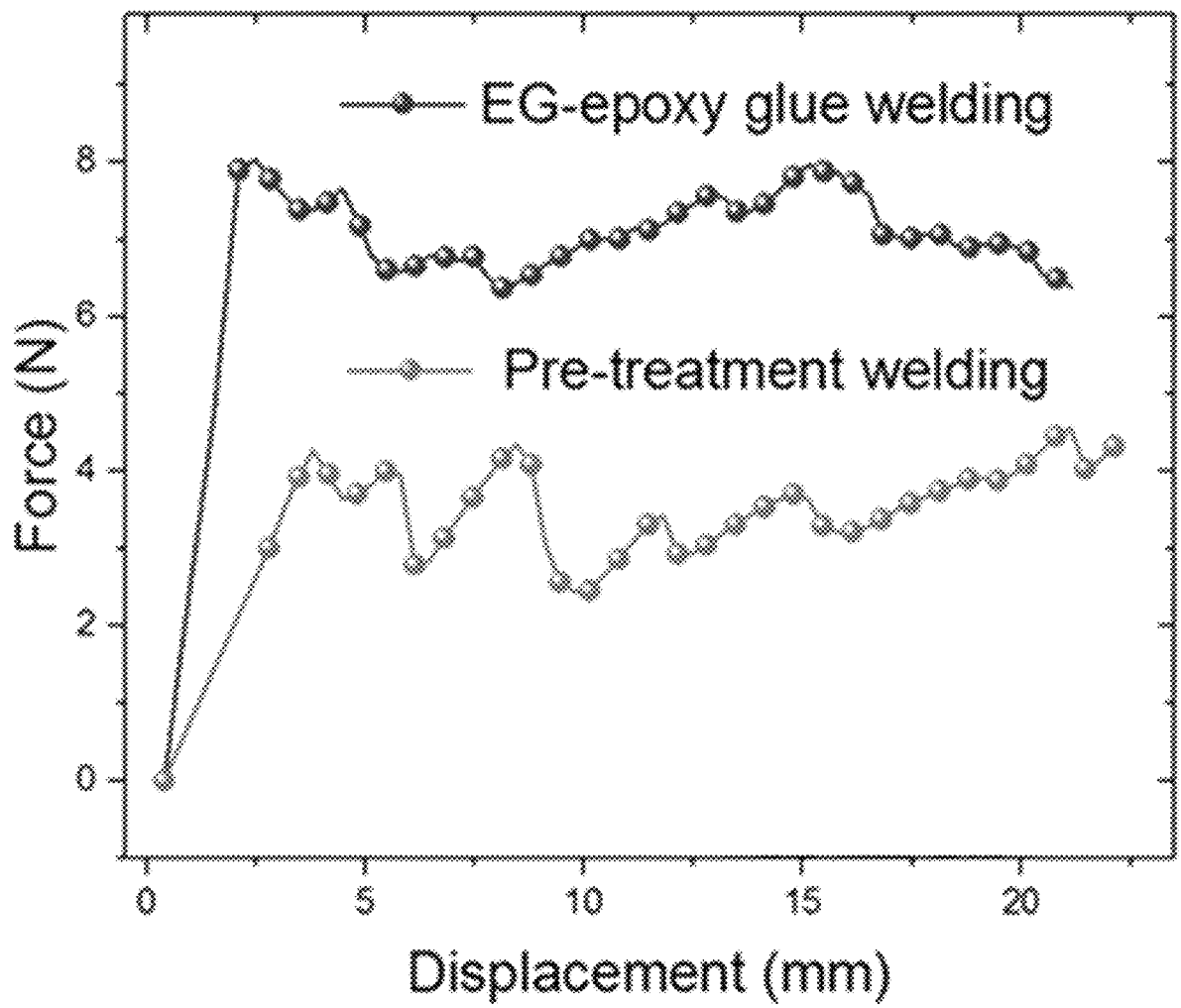
FIGS. 10A-10D are graphs showing the interfacial fracture energy of welded epoxy samples tested by using T-peeling tests. The welding temperature is 180° C.

To quantify the dependence of welding efficiency on catalyst concentration, the interfacial fracture energy was tested by using the T-peeling test. The inset in FIG. 10A shows the experimental setup, and FIG. 10A shows the typical peeling force vs. displacement curves for the pre-treatment and EG-epoxy glue methods, where the two epoxy strips (with 5 mol % catalyst) were welded at 180° C. for 180 min. It should be noted that although FIG. 10A shows that the EG-epoxy glue method requires a higher peeling force, its magnitude actually depends on the geometrical size and pre-treatment conditions, such as time and temperature, which deserves more study in the future.

According to the Griffith's energy balance law, when the welding substrate is an elastomeric polymer, the cohesive fracture energy $G_c$ can be calculated as:

$$G_c = \frac{2\overline{P}(1+e)}{b} - E_0 he^2, \text{ with } \overline{P} = \frac{\int_{t_1}^{t_2} P(t)dt}{t_2 - t_1}, \quad (3)$$

where $\overline{P}$ is the average peeling force during the steady propagation of the crack (from $t_1$ to $t_2$); $E_0$ is the modulus of the material, h is the sample thickness, b is the width, and e is the elastic strain under force $\overline{P}$.

Figure 10B:
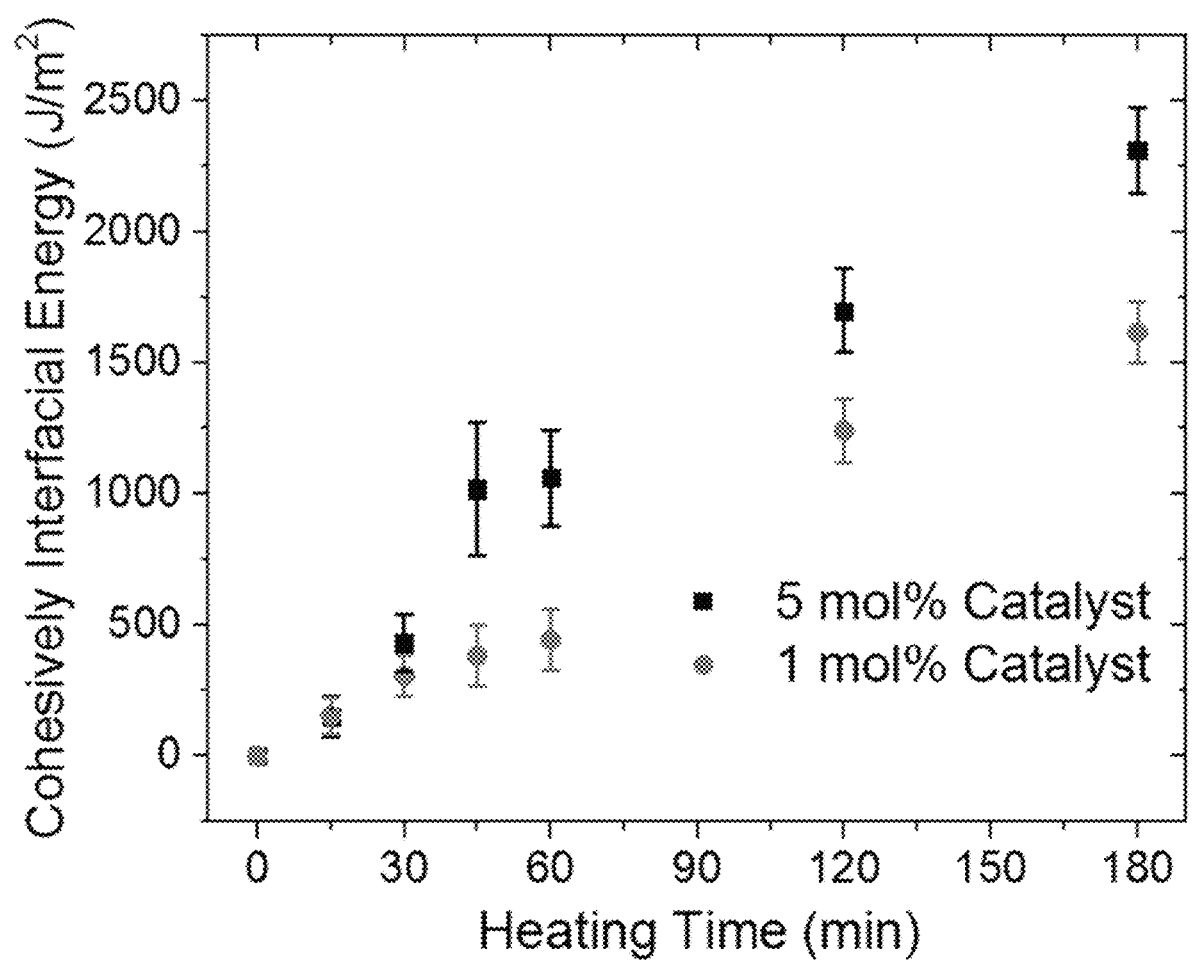
Figure 10C:
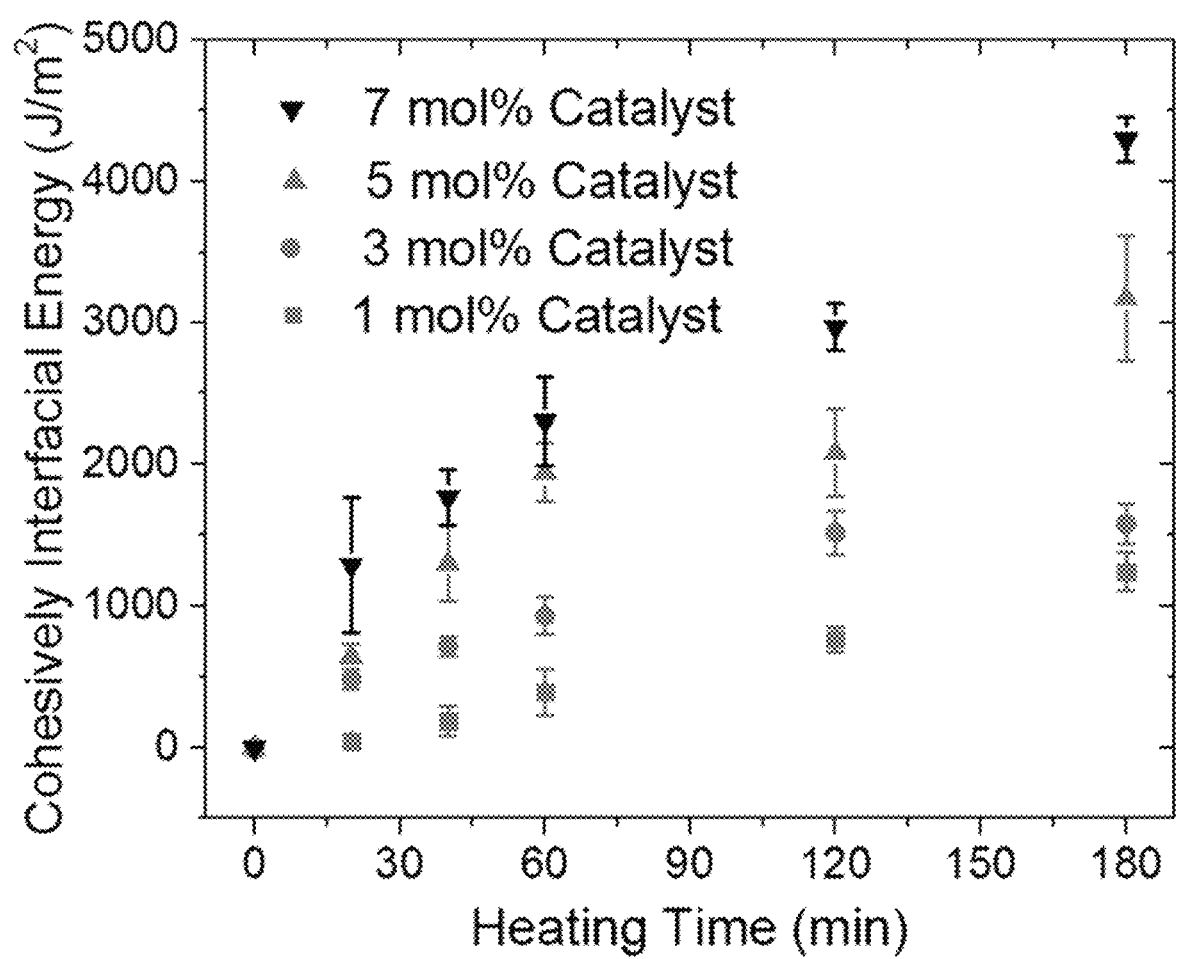

FIGS. 10B-10C show the effects of catalyst concentration and welding time on the fracture energy of pre-treatment and EG-epoxy glue welding, respectively. It is noted that the interfacial energy increases both with the catalyst concentration and with the welding time (see FIGS. 10B-10C). It is apparent that sufficient reaction time can yield enough BERs over the interface. The more crosslinked chains that penetrate into the opposite face of an interface, the higher the fracture energy is obtained. In addition, a higher catalyst concentration leads to a higher BER rate, which also increases the interfacial fracture energy. As shown in the figures, for the pre-treatment welding method, the fracture energy after welding for 180 min increases from ~1600 J/m² to ~2300 J/m² when the catalyst concentration is increased from 1 mol % and 5 mol %; for the EG-epoxy glue method, the corresponding fracture energy is increased from ~1200 J/m² to ~3200 J/m². FIG. 10C also shows that the maximum fracture energy reaches a value over 4000 J/m² at 7 mol % catalyst heating for 180 min.

Figure 10D:
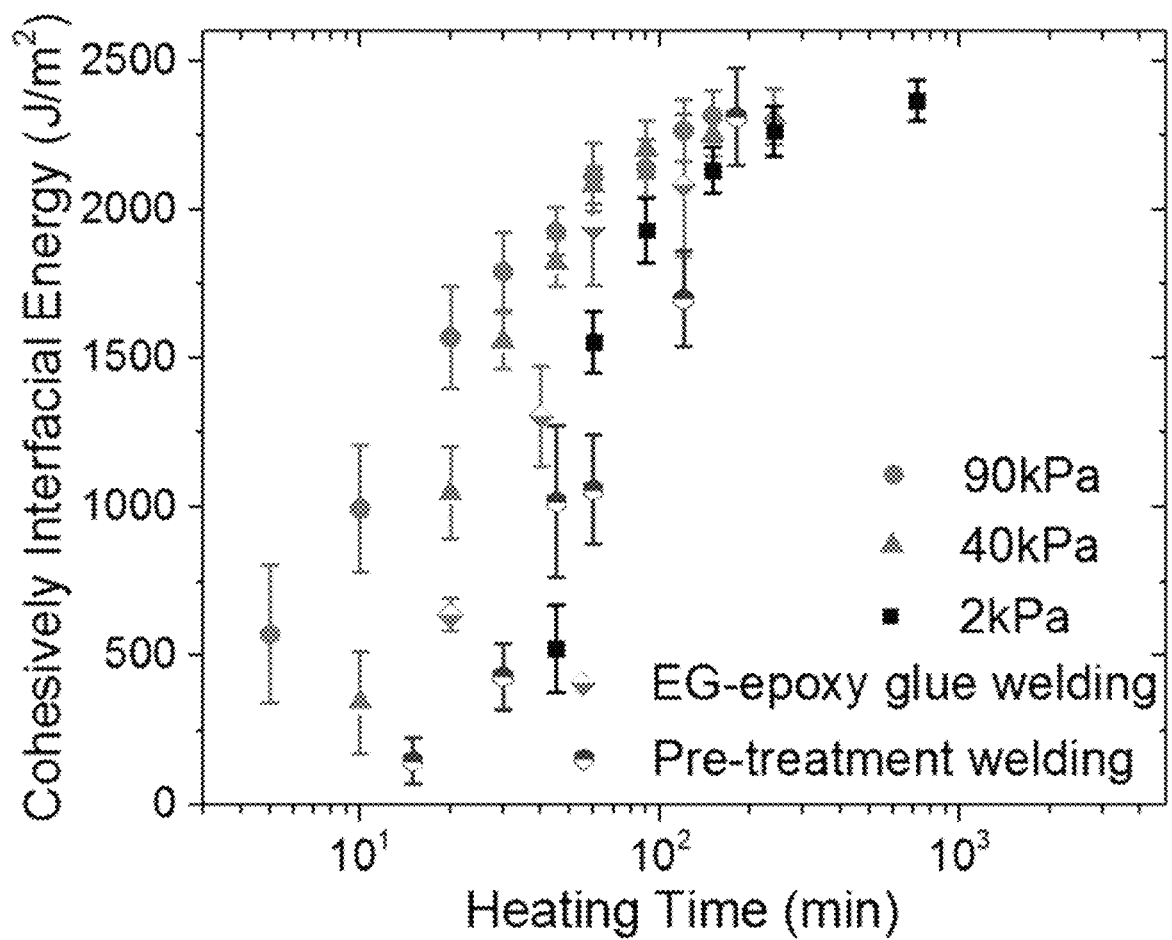

As mentioned above, the welding methods are completely pressure-free and are only driven by EG solvent, which are advantageous in many practical applications of adaptable thermosets. In FIG. 10D the cohesively fracture energy of epoxy samples welded under different pressures (namely: 2 kPa, 40 kPa and 90 kPa) are plotted together with that in pressure-free pre-treatment and EG-epoxy glue welding, where the catalyst concentration in the epoxy CANs are all 5 mol %. Overall, when 40 kPa and 90 kPa is applied, the pressure-assisted welding has higher efficiency. This is because it promotes better surface contact as well as it involves less complicated physical procedure; but in the EG-assisted welding methods, the welding depends on not only the BER efficiency, but also the diffusion and evaporation of EG during welding. However, it is seen that EG-assisted welding can achieve the same fracture energy level after about 2 hours. Even tests of less than 2 hours, the EG-epoxy glue method demonstrates higher fracture energy than that in the pressure-assisted welding condition with 2 kPa applied. In future research, it will be interesting to further explore the dependency of solvent-driven welding performance on multiple influencing parameters in addition to the welding time and catalyst concentration. For example, for the pre-treatment method, increasing the pre-soaking time increases the thickness of the interfacial bonding layer, which consequently improves the ultimate fracture energy; but the tradeoff is that this requires more welding time to evaporate the EG solvent on the interface. For the EG-epoxy glue method, the residual EG solvent in the epoxy glue should also be studied, as it can penetrate into the fresh epoxy to be welded and promote the welding. The accomplishment of these studies could help to gain a more comprehensive understanding of the physics of EG-assisted transesterification, as well as to assist in the selection of optimized conditions to improve the ultimate fracture energy and welding speed.

Figure 11A:
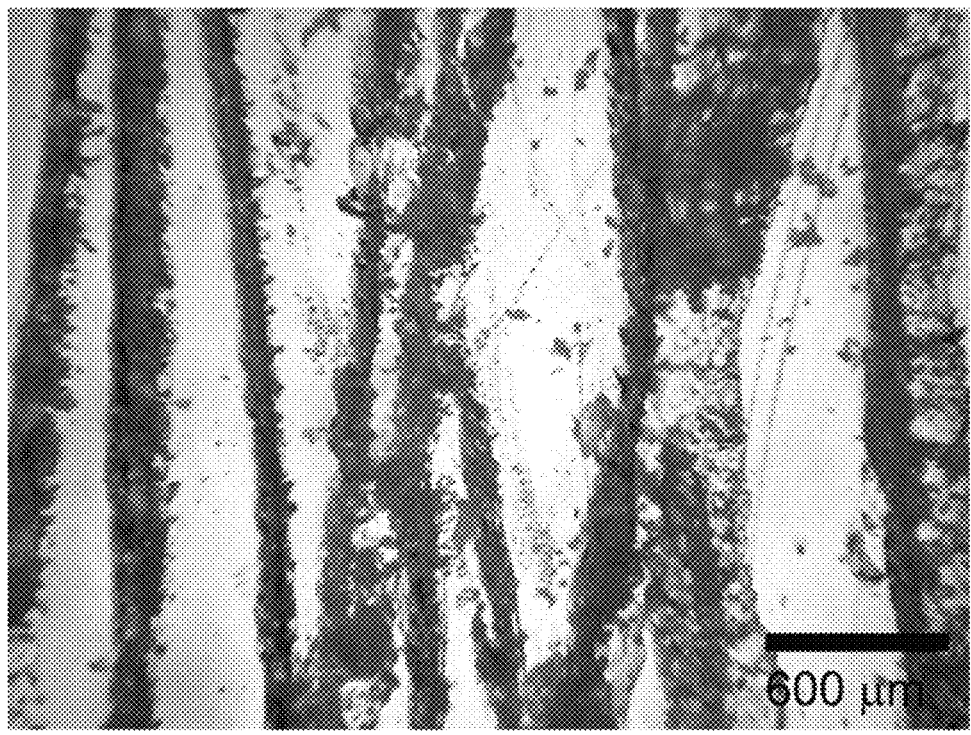
FIGS. 11A-11B are optical microscopic images showing the EG-assisted repair of CAN surface.
Figure 11B:
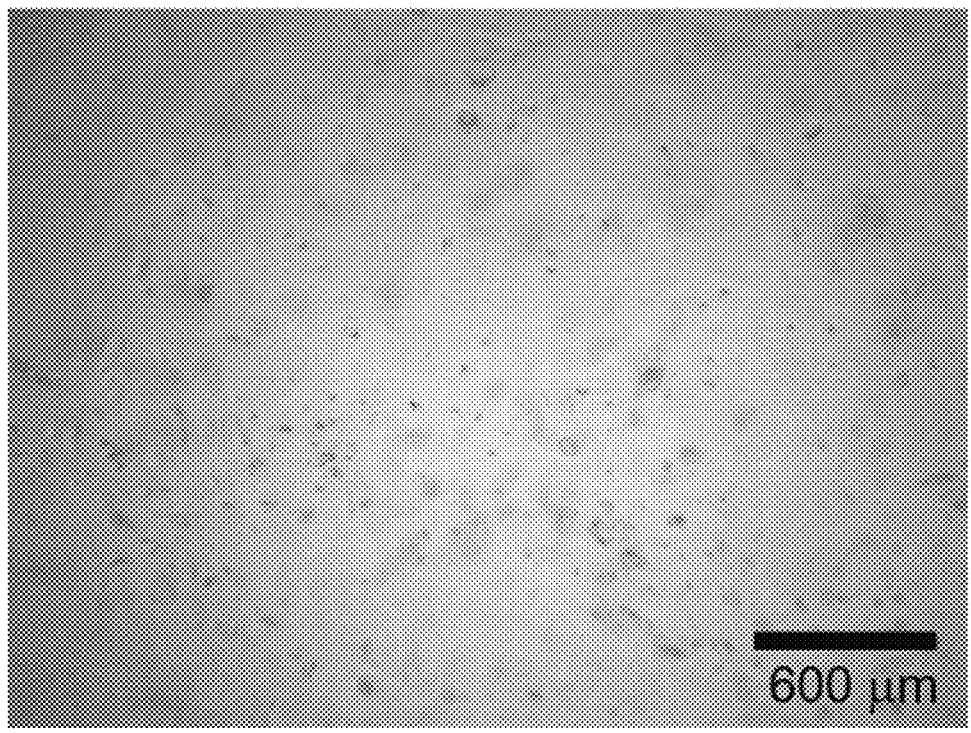

Inspired by the aforementioned EG-epoxy glue method, we conducted experiments on surface damage repair (FIGS. 11A-11B). The surface of a CAN epoxy (30 mm×12 mm×5 mm) with 5 mol % catalyst was scratched by using a needle (FIG. 11A). Next, the damaged surface was covered by a thin layer (~0.5 mm) of dissolved epoxy solution with the same catalyst content, following by heating at 180° C. for 3 h. FIG. 11B shows an optical microscope image of the repaired surface, which is seen to be smooth and damage free. This ability to repair micro-cracks on a CAN epoxy surface is of great interest because it could prevent the cracks from developing to macro-scale failure, and would broaden the service lifetime and guarantee the safe performance of materials.

Powder-Based Reprocessing

Figure 12:
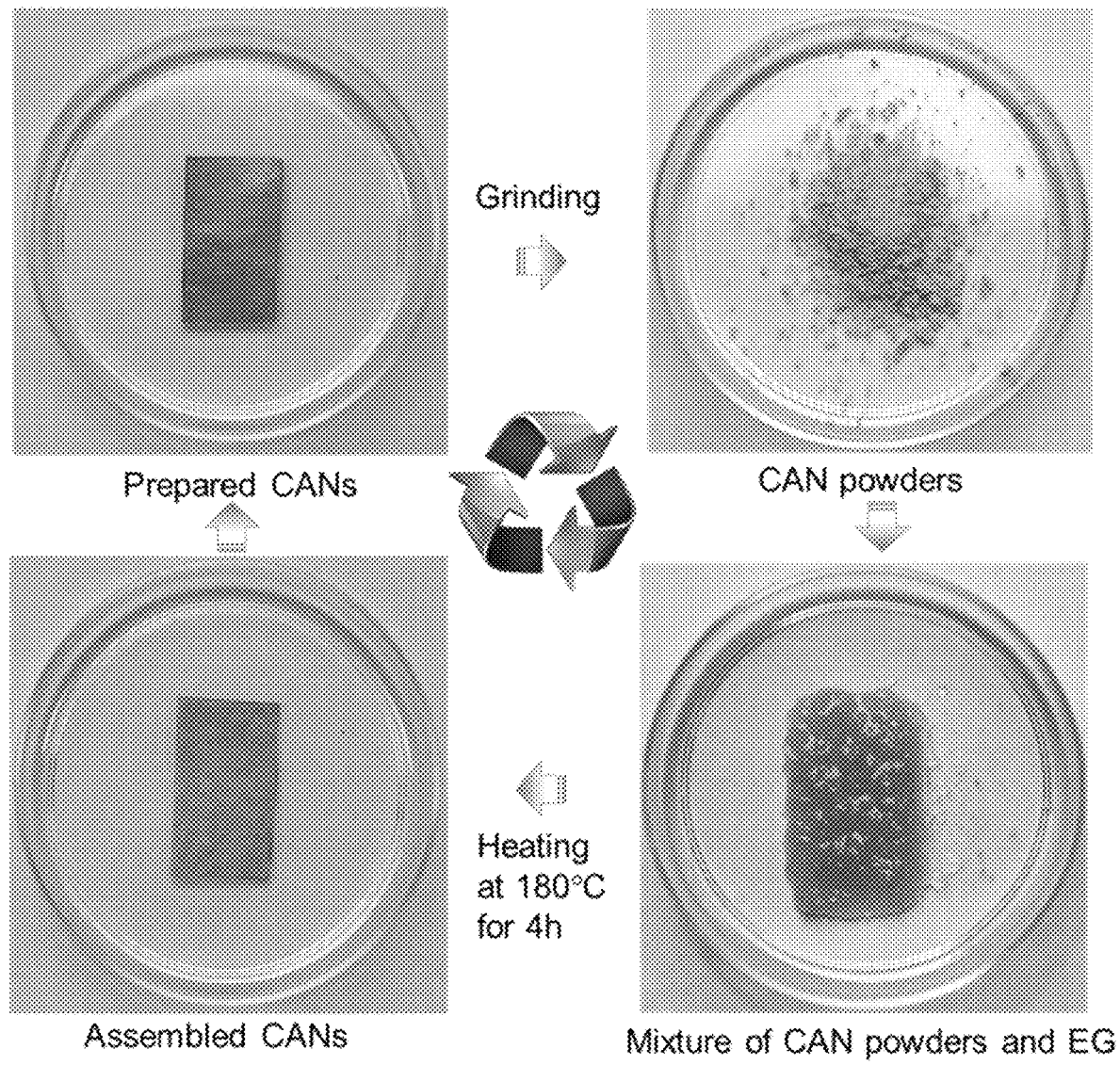
FIG. 12 depicts an exemplary process for the EG-assisted reprocessing of epoxy thermoset from powder state (a) starting from a fresh piece of epoxy thermoset; (b) an epoxy powder is prepared by grinding (c) the epoxy powder is mixed with EG; and (d) the reprocessed epoxy is assembled after heating at 180° C. for 4 hours. Note: the sample was trimmed into a rectangle for good demonstration.

The above-mentioned pre-treatment welding is shown to be effective to weld two bulk epoxy thermosets without the use of welding pressure. The method can be utilized to weld objects with more complex interfaces. Here, we demonstrate powder-based reprocessing using EG solvent by following the procedure illustrated in FIG. 4. With the evaporation of EG solvent, the partially dissolved epoxy particles gradually merge into a solid film. The capillary force and relatively low viscosity introduced by the EG evaporation help to maintain a glossy film surface. FIG. 12 shows images of the sample at each step, whereas FIG. 12, step (d) shows the strip of the material that was cut from the whole film for a better demonstration.

Figure 13A:
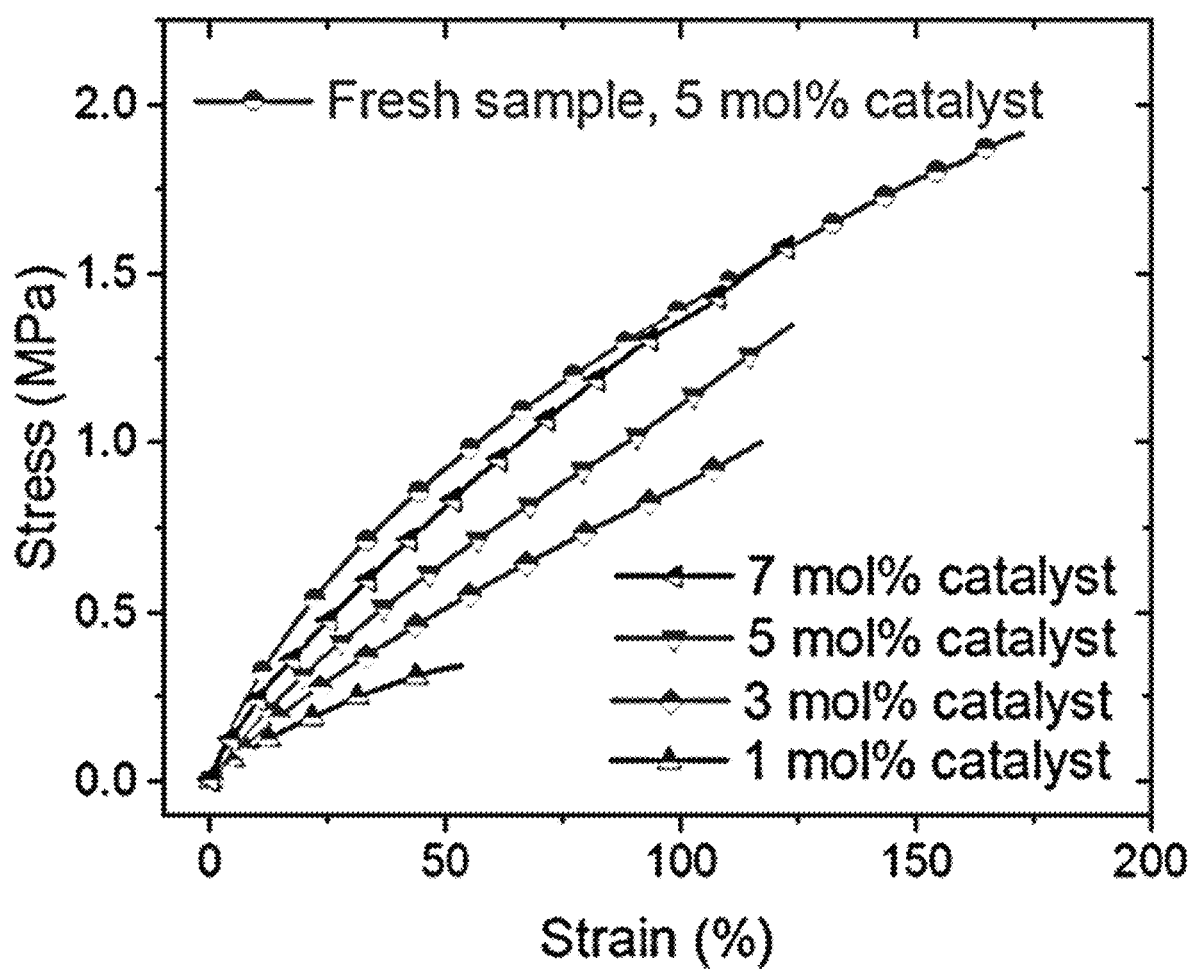
FIGS. 13A-13C demonstrate the mechanical properties of epoxy thermoset reprocessed at 180° C.

To quantitatively identify the catalytic effects on the reprocessing ability of CANs, the mechanical properties of assembled CAN powders over different catalyst concentrations were tested. FIG. 13A shows a comparison of the tensile stress-strain behaviors of fresh samples and reprocessed samples with different catalyst concentrations. It is obvious that with the same amount of reprocessing time (180 min), both the elastic modulus and the ultimate strength of the reprocessed samples are increased as the catalyst concentration increases, indicating that the catalyst could promote reprocessing efficiency. The mechanical behavior of the reprocessed sample with 7 mol % catalyst almost completely recovered to the values of a fresh sample.

Figure 13B:
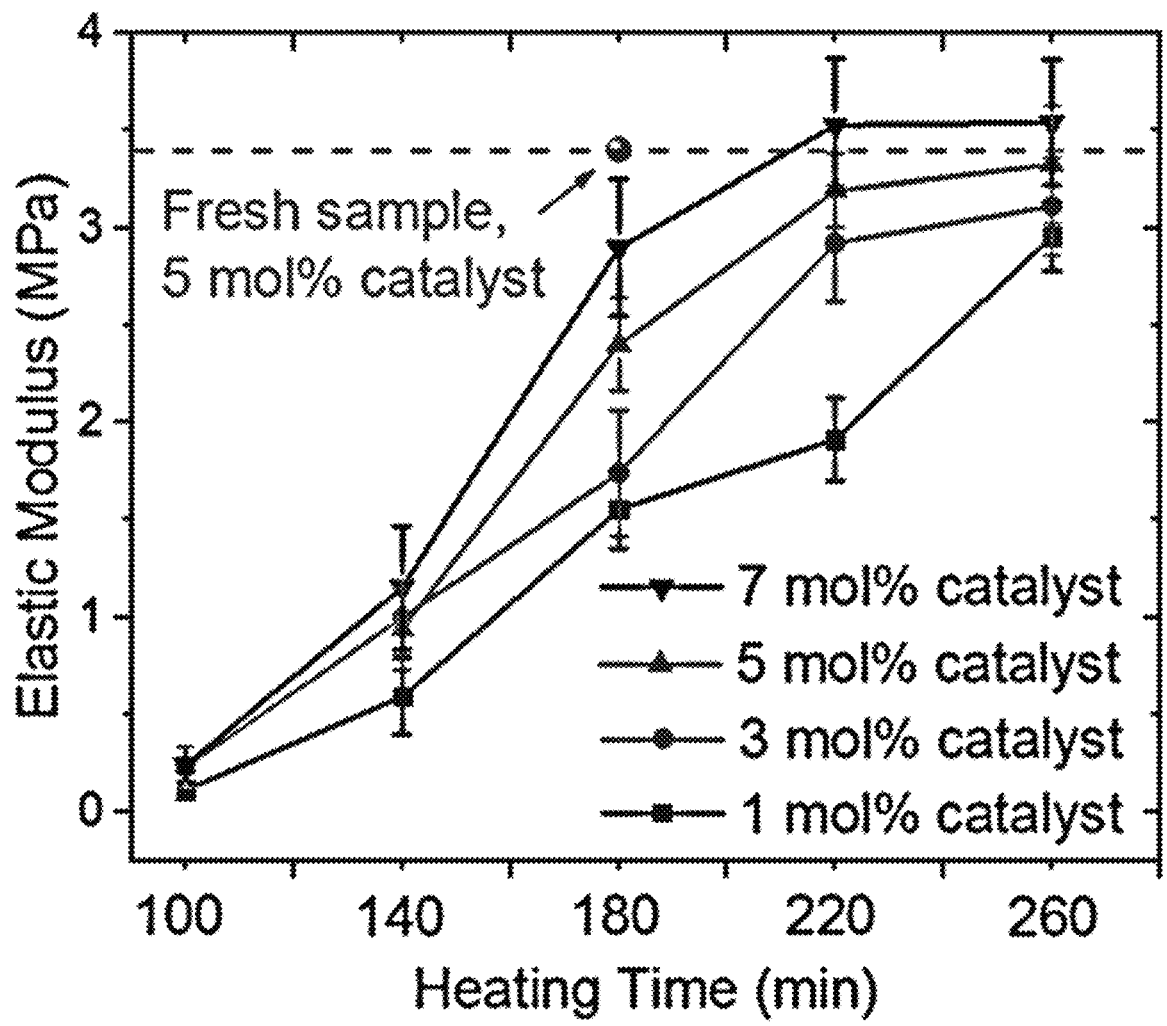
Figure 13C:
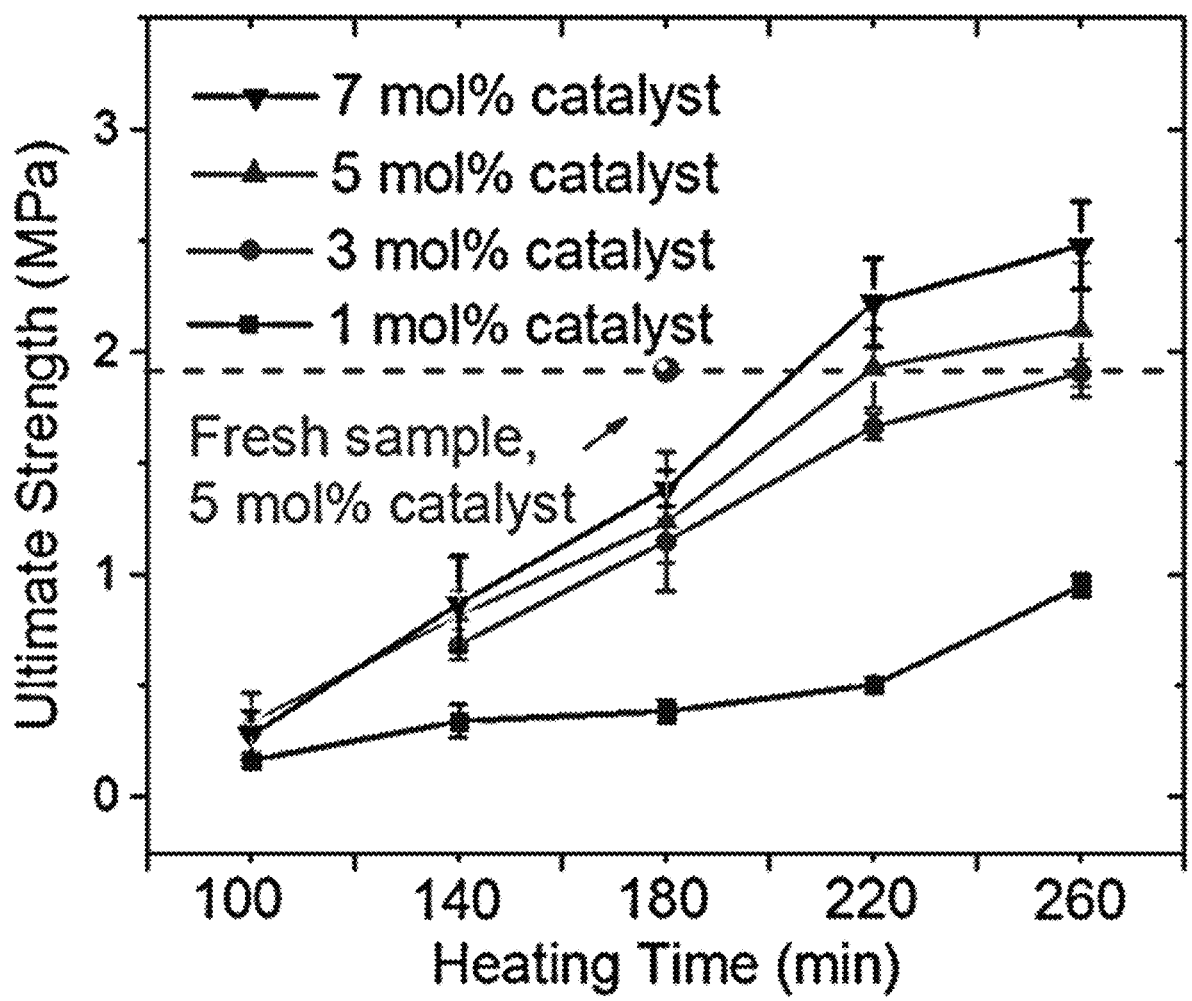

Increasing the reprocessing time also improves the final properties of reprocessed samples with a specific catalyst concentration. FIGS. 13B-13C respectively summarize the elastic modulus (within the first ~2% stretch) and ultimate strength of the reprocessed samples, where the reprocessing time at 180° C. is increased from 100 min to 260 min. It can be seen that increasing the reprocessing time is more effective in recovering the elastic modulus than in recovering the ultimate strength. With 5 mol % catalyst, the ultimate strength is only recovered by ~65.3% (1.24 MPa compared with 1.90 MPa of fresh epoxy) after being heated for 180 min, while the modulus is recovered by ~73.4% (2.5 MPa compared with 3.4 MPa of fresh epoxy). Especially for the 1% mol catalyst, the recovery of ultimate strength is obviously slower than the recovery of modulus. This might be attributed to the complex interfacial behaviors in the microscale.

Recycling of Epoxy Thermosets by Using Mono-Alcohol 2-Ethyl-1-Hexanol (2E1H)

Figure 15A:
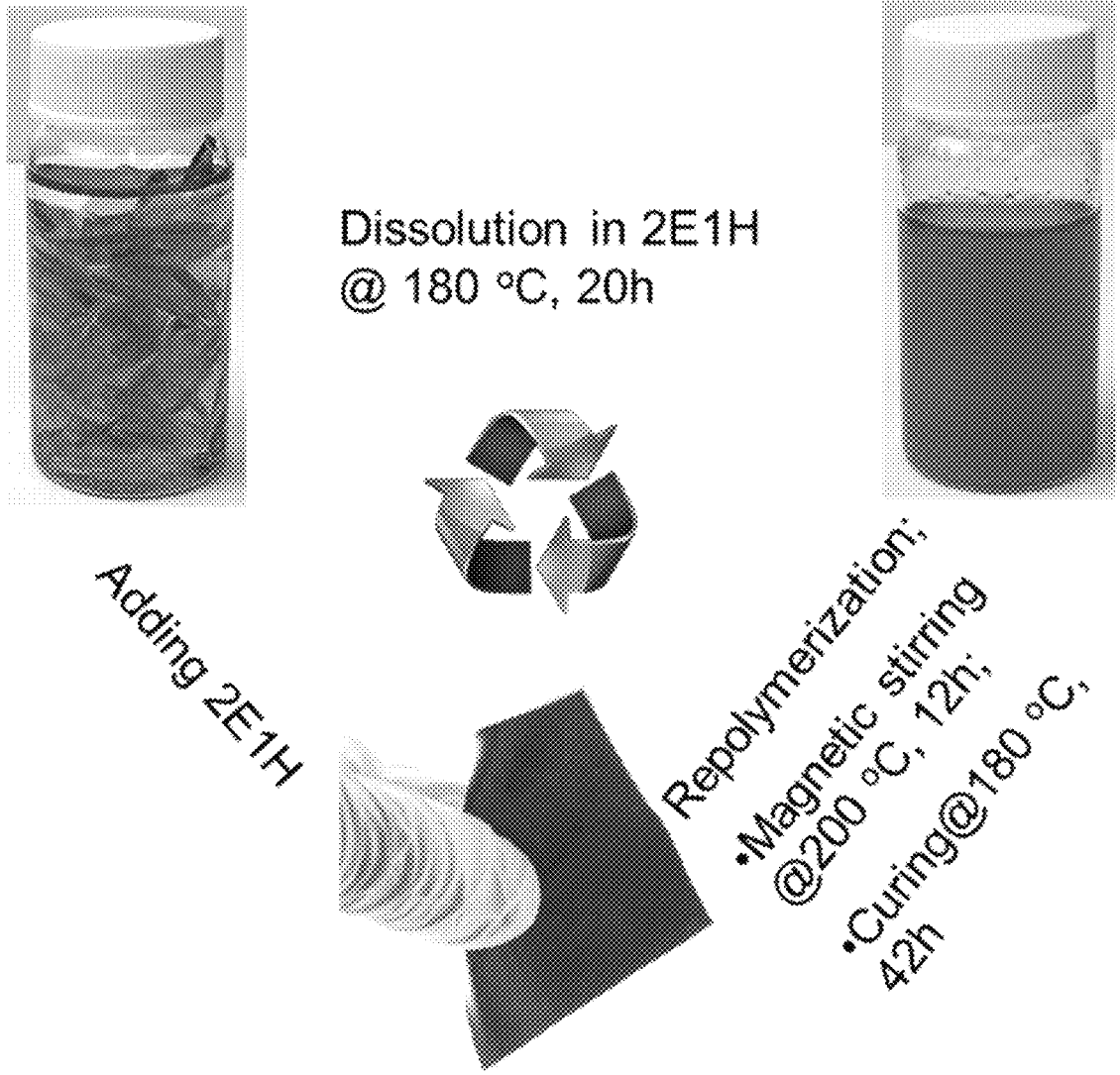
FIGS. 15A-15B demonstrate comparisons of thermomechanical properties between EG-recycled and 2E1H-recycled CANs.

The recyclability of the epoxy thermosets were also demonstrated by using a mono-alcohol 2-ethyl-1-hexanol (2E1H), which is shown in FIG. 15A. The epoxy material was seen to be fully dissolved in an enclosed (sealed) environment after being heated at 180° C. for ~20 h. The repolymerization was performed in an open-air environment to facilitate the evaporation of 2E1H. After being heated at 200° C. for ~12 h (with magnetic stirring) and then at 180° C. for ~42 h, the dissolved polymer solution was repolymerized. Compared with the recycling with EG solvent, the recycling efficiency with mono-alcohol 2E1H is much lower. This is because that each 2E1H molecule only provides one hydroxyl group, which consequently leads to a lower BER efficiency compared with that using di-functional alcohol EG.

Figure 15B:
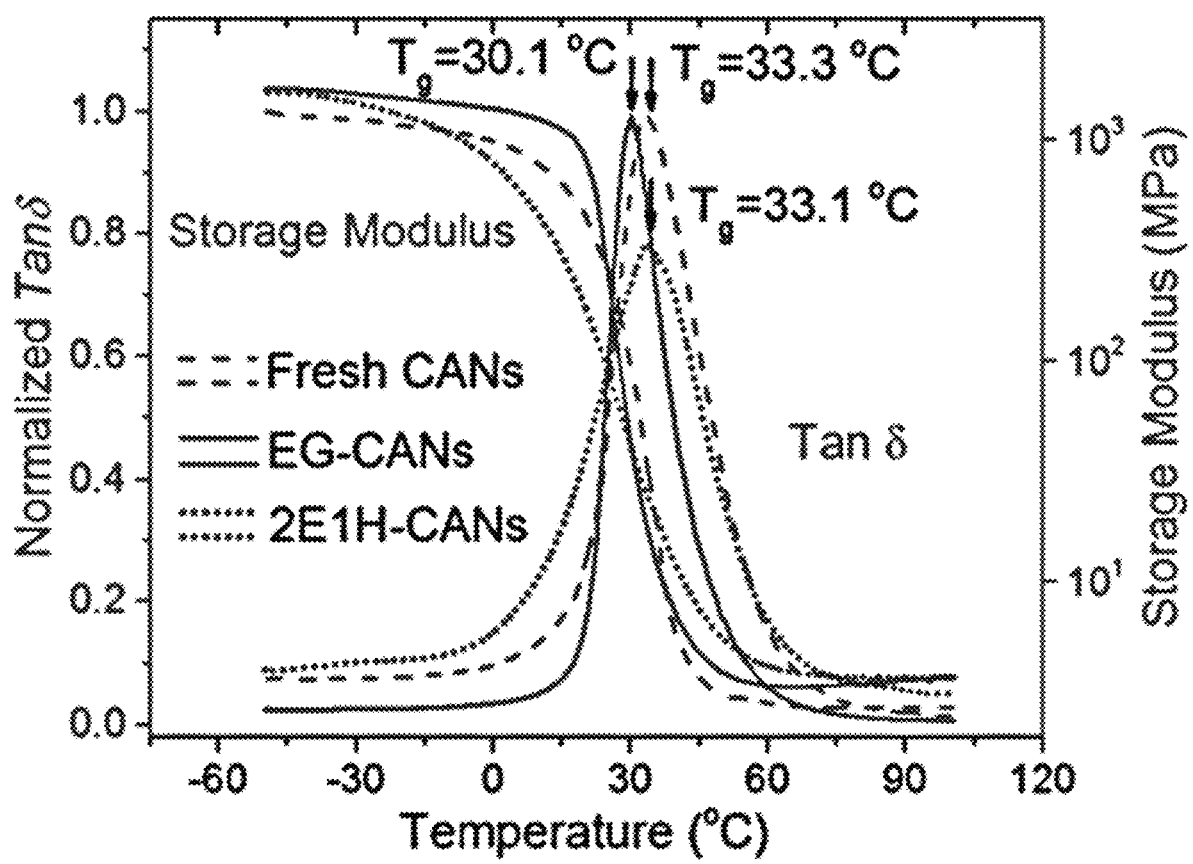

FIG. 15B compares the glass transition behavior of fresh epoxy and recycled epoxy by using EG and 2E1H solvents, where all the three epoxy samples exhibit similar transition temperature and storage modulus within the tested temperature range. Specifically, the storage modulus of the recycled epoxy is slightly higher than that of fresh sample, which might be resulted from the oxidation of epoxy during the repolymerization. This observation is also consistent with previous studies on the effect of inherent thermo-oxidation of epoxy materials. However, since the modulus change is small, we expected a minimal influence of oxidation on the BER kinetics and associated thermomechanical properties of epoxy thermosets.

Figure 16A:
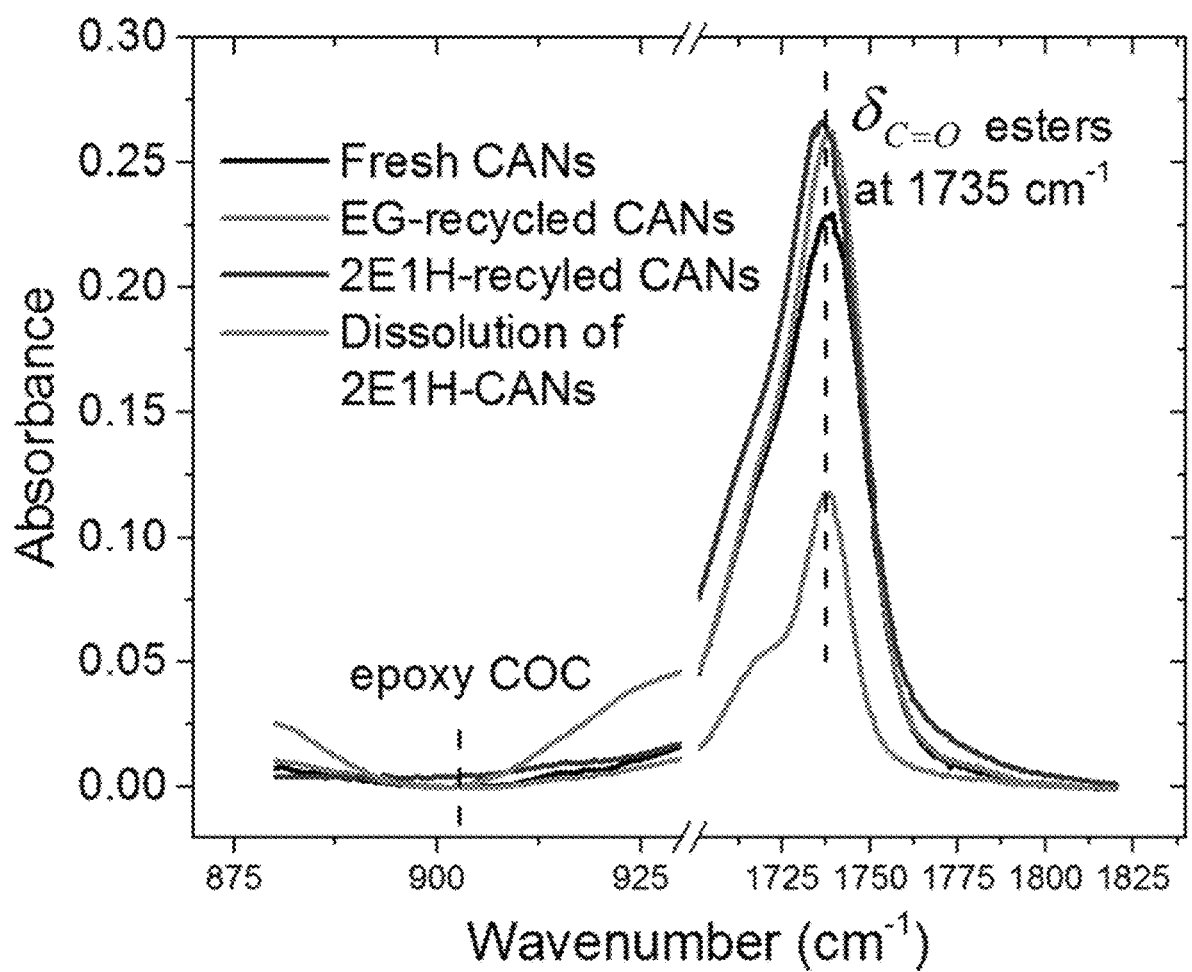
FIGS. 16A-16B demonstrate comparisons of FTIR spectra between EG-recycled and 2E1H-recycled CANs in the inner surface: 1) fresh CANs, 2) EG-recycled CANs (180° C., 3 h), 3) 2E1H-recycled CANs (180° C., 42 h), 4) fully dissolved CANs in 2E1H (180° C., 20 h).
Figure 16B:
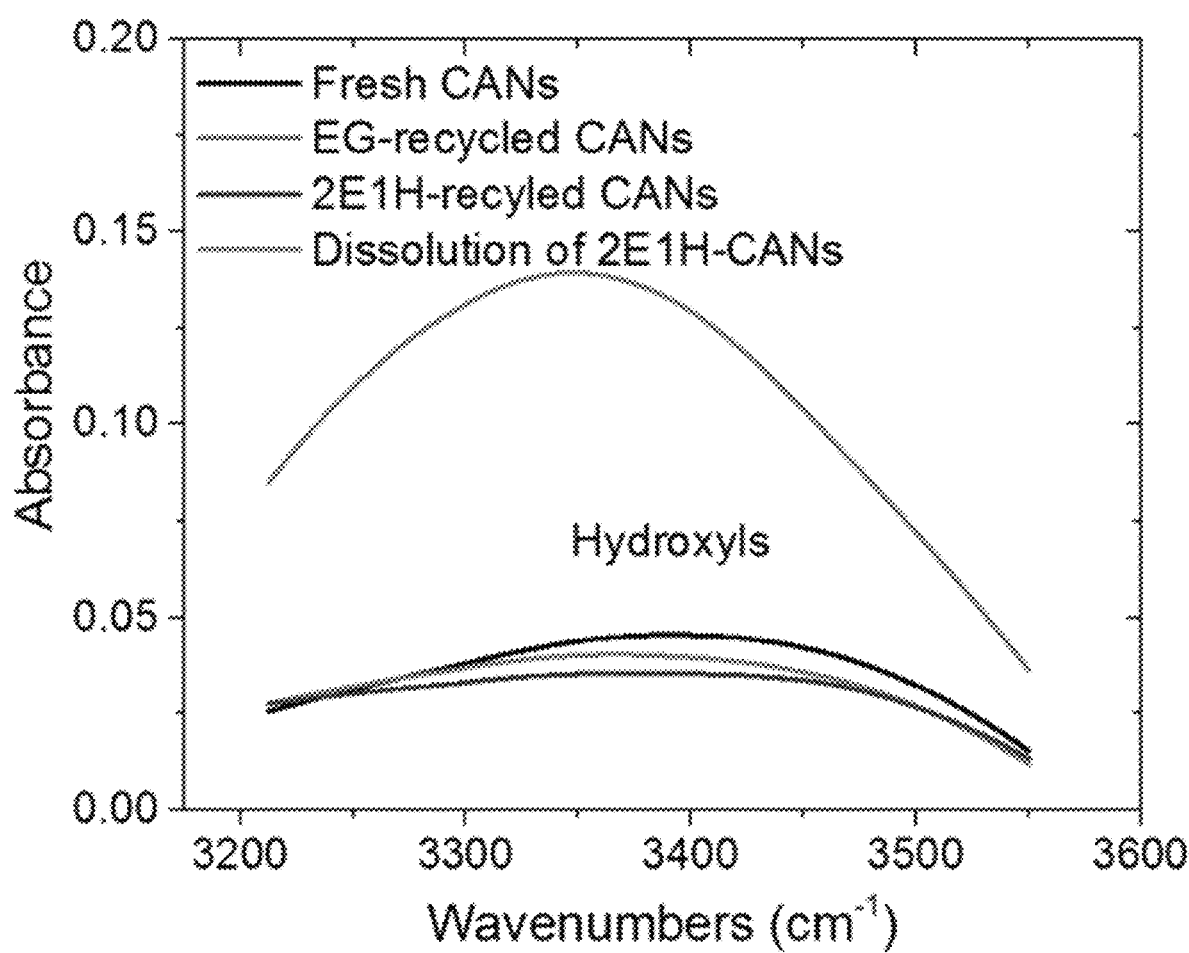

FTIR tests were also performed to examine the conversions of functional groups (esters, hydroxyls, and epoxy COC groups) during the 2E1H assisted recycling process. Specifically, the fully recycled epoxy thermoset was cut in the middle, and FTIR scan was performed on the cross-section to probe the chemical composition inside the material. The results are compared with those in EG assisted recycling process in FIGS. 16A-16B. As shown in the figures, both ester and hydroxyl groups in the recycled epoxy return to the same level as that of fresh epoxy, which indicates that there is no remnant 2E1H molecules left in the whole epoxy network, and the dissolved polymer solution is fully polymerized.

Conclusion

A pressure-free, solvent driven surface welding technique for an epoxy based covalent adaptable network (CAN) is demonstrated. This method uses ethylene glycol (EG) to participate in the bond exchange reactions (BERs) and to tune the integrity of the network. When EG is present in abundance, the EG molecules participate in BERs, and effectively break the long polymer chains into small chain segments, namely a dissolution process; when EG is under evaporation condition, the EG molecules are regenerated and escape, resulting in repolymerization of the CAN epoxy. When such dissolution and repolymerization processes occur on a material interface, they offer a way to realize pressure free surface welding and powder-based reprocessing. We first tested dissolution rate as a function of time, temperature, catalyst concentration and amount of EG. We found that the catalyst concentration defines the initiating point of degradation, while its rate depends on the temperature as well as the diffusion rate of the dissolved polymer chains. Thermomechanical characterization was performed to verify that the properties of repolymerized epoxy are very close to those of fresh one. We also developed two solvent driven surface welding techniques: the pre-treatment method and the EG-epoxy glue method. It was shown that the interfacial fracture energy can eventually reach the same level as that obtained in the pressure-assisted surface welding method. In addition, the EG-epoxy welding mechanism was extended to repair the epoxy thermosets with surface damage. Finally, the EG-assisted transesterification method was utilized to reprocess CAN epoxy from powders. We found that the elastic modulus of the reprocessed sample can be fully recovered after it has been heated for a sufficiently long time. These exciting explorations open new possibilities in application of thermosetting polymers, such as convenient healing or reprocessability in a more available and practical way. In welding and powder-based reprocessing, increasing the concentration of catalyst can increase the efficiency of welding and reprocessing.

Example 2: Carbon Fiber Reinforced Thermoset Composite with Near 100% Recyclability An environmentally and economically favorable recycling method is demonstrated for CFRP composite, which takes advantage of the dynamic nature of recently emerged CANs. Briefly, thermosetting polymers capable of transesterification type bond exchange reactions (BERs) are seen to be fully dissolved in alcohol solvents at relatively low temperature (160° C. 180° C.). Further heating the dissolved polymer solution leads to the evaporation of residual alcohol solvents, and repolymerization of the thermoset with the near-identical thermomechanical properties as fresh polymers. Based on this, when the CANs are used as composite binders, we are able to reclaim both thermoset matrix and carbon fiber with their original properties undiminished, to repair the polymer matrix in a CFRP composite, as well as to fully recycle the CFRP by using the reclaimed fiber and dissolved polymer solution. Such a recycling paradigm is advantageous by virtue of its low cost, easy implementation, and almost 100% recyclability.

Experimental Section

Materials

The epoxy based CAN is cross-linked by fatty acid to enable the transesterification type BERs. It was synthesized by using diglycidyl ether of bisphenol A (DGEBA, Sigma Aldrich, St. Louis, Mo., USA), fatty acids (Pripol 1040, Uniqema Inc., Paterson, N.J., USA), and metal catalyst ($Zn(Ac)_2$, Sigma Aldrich, St. Louis, Mo., USA). The carbon fiber used is a plain weave fabric (Fibre Glast Developments Corp., Brookville, Ohio), with tensile strength from 4.2 GPa to 4.4 GPa, and tensile modulus from 227.5 GPa to 240.6 GPa. For the dissolution of thermosetting polymers, anhydrous ethylene glycol (EG, Sigma Aldrich, St. Louis, Mo., USA) was used in this study, with a purity of 99.8% and a boiling point at 197.3° C.

Synthesis of the Epoxy Thermoset and its Composite

In the previous work of Leibler and coworkers, the synthesis method of epoxy thermosets was demonstrated (Montarnal, D., et al., Science, 2011. 334(6058): p. 965-968.). In this example, we adopt the same method to fabricate their composite material: In the first step, $Zn(Ac)_2$ catalyst (263.61 g/mol) was mixed with fatty acids (296 g/mol) in a beaker. The mole ratio between catalyst and COOH groups is 0.05:1. The mixture was then transferred into an oven at 180° C. and heated under vacuum. Catalyst particles were fully solubilized in fatty acids when no gas evolution was observed. This typically takes 2-3 h. Subsequently, melted DGEBA was added to the mixture and manually stirred until the mixture became homogeneous and translucent. The mole ratio between epoxy groups in DGEBA and COOH groups is 1:1. After this, the mixture was placed in vacuum to remove the bubbles. Finally, the mixture was poured into a mold, with carbon fiber fabric laid in the middle (the fiber will be removed when the pure epoxy is prepared). After being heated at 130° C. for 6 h, the epoxy matrix can be fully cured. Throughout this study, the weight fraction of carbon fiber in the composite is always 13.7 wt %

Uniaxial Tension Tests

A uniaxial tension test was adopted to evaluate the mechanical properties of the fresh, repaired and recycled CFRP composites. All the samples were cut to the same dimension (87.0 mm×10.8 mm×1.88 mm). The tests were performed on an MTS Universal Materials Testing Machine with a load capacity of 10 kN (Model Insight 10). During the room-temperature uniaxial tension test, the separation rate of the clamping heads is 5 mm/min for all cases.

Stress Relaxation Tests

The time and temperature dependent stress relaxation behavior of fresh and repolymerized epoxy thermosets was tested by a DMA tester (Model Q800, TA Instruments, New Castle, Del., USA). Samples with the same dimensions (15.0 mm×4.0 mm×1.0 mm) were first preloaded by a $1 \times 10^{-3}$N force to ensure straightness. After reaching the testing temperature, they were allowed 30 min for thermal equilibrium. The specimens were then stretched by 1% on the DMA machine and the deformation was maintained during the test. The decrease of stress was recorded and the stress relaxation modulus was calculated.

Glass Transition and Stress-Strain Behavior of Repolymerized Epoxy

Figure 21A:
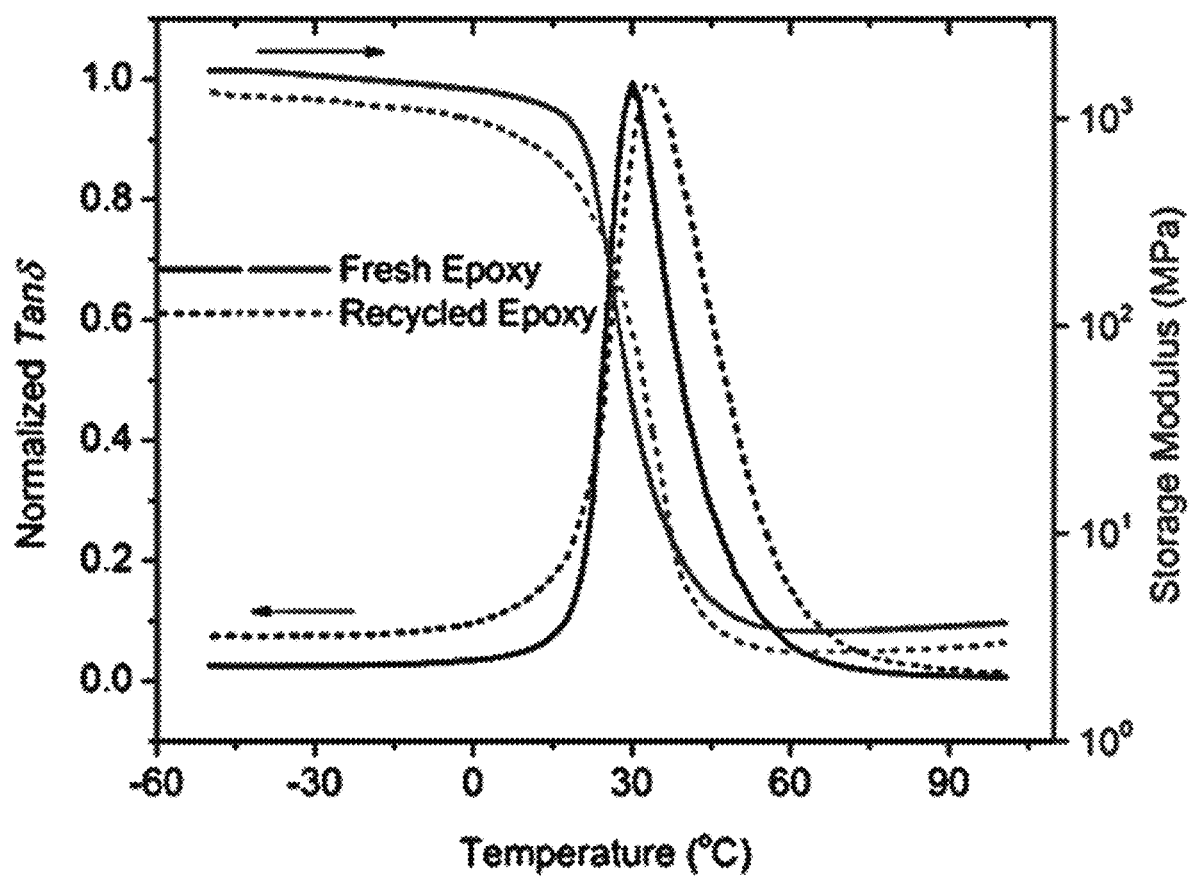
FIGS. 21A-21B are graphs of the glass transition (FIG. 21A) and stress-strain behavior (FIG. 21B) between fresh epoxy (solid lines) and recycled epoxy (dash lines).
Figure 21B:
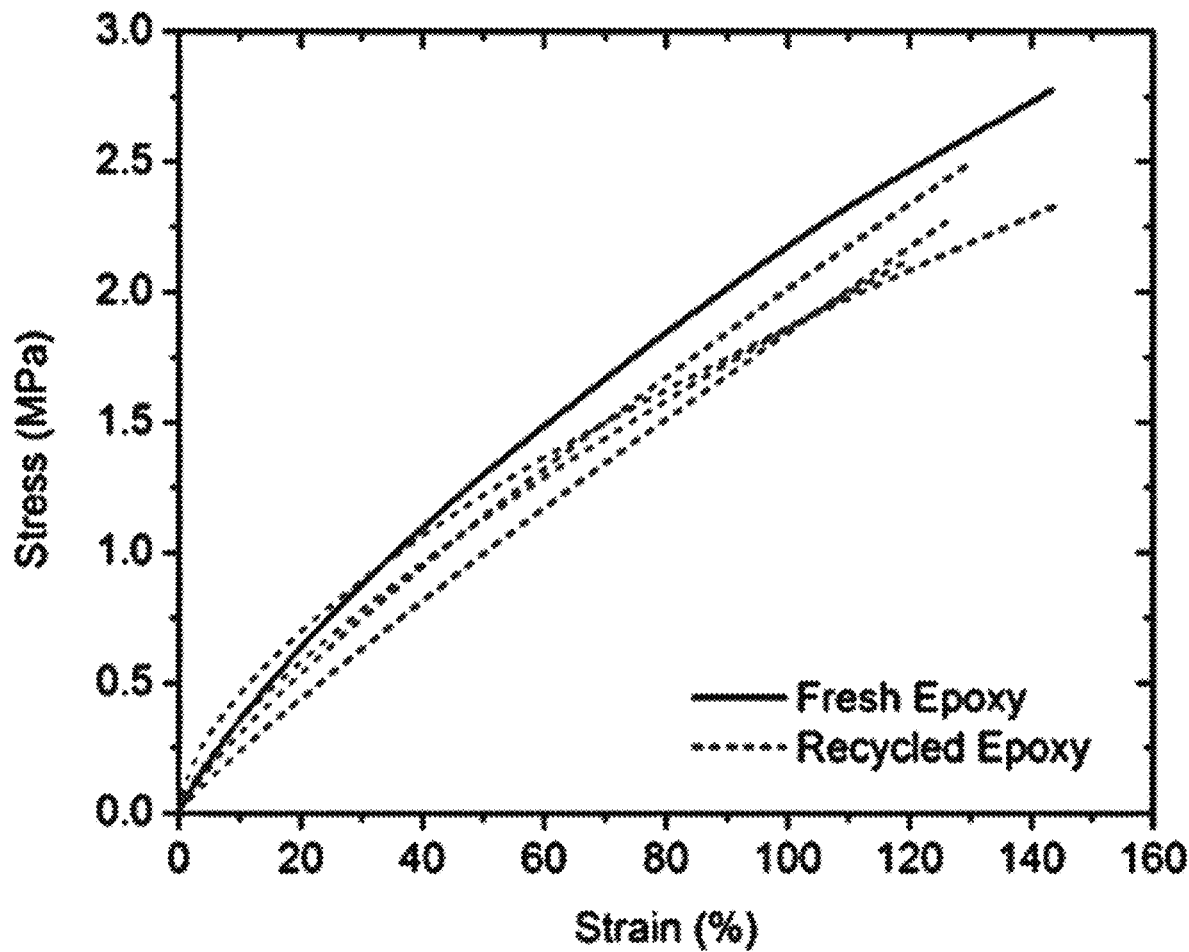

The glass transition of the epoxy thermoset was tested by using a dynamic mechanical analysis (DMA) tester (Model Q800, TA Instruments, New Castle, Del., USA). During the DMA test, polymer sheet was first heated and then held at 100° C. for 20 min to reach thermal equilibrium, followed by applying a preload of 1 kPa to maintain the sample staying straight. During the experiment, the strain was oscillated at a frequency of 1 Hz with a peak-to-peak amplitude of 0.1% while the temperature was decreased from 100° C. to −50° C. at a rate of 1° C. $\min^{-1}$. Once the temperature reached −50° C., it was maintained for 30 min and then increased to 100° C. at the same rate. This procedure was repeated for multiple times and the data from the last cooling step is reported. The DMA tester was used to carry out room-temperature uniaxial tension tests for the repolymerized epoxy. The loading rate was chosen to be a small value (5%/min for all tests) to minimize viscoelastic effects. FIG. 21A shows the glass transition behavior of both fresh and repolymerized epoxy, where the normalized tan δ and storage modulus are plotted as a function of temperature. The temperature corresponding to the peak of tan δ is referred as the glass transition temperature $T_g$ of the material. The $T_g$ of the repolymerized epoxy is 33.2° C., which is almost same with that fresh CAN epoxy. FIG. 21B shows the stress-strain behavior. The results also show that the repolymerized epoxy has nearly the same stress-strain behavior as that of the fresh epoxy.

Results and Discussions

Figure 17A:
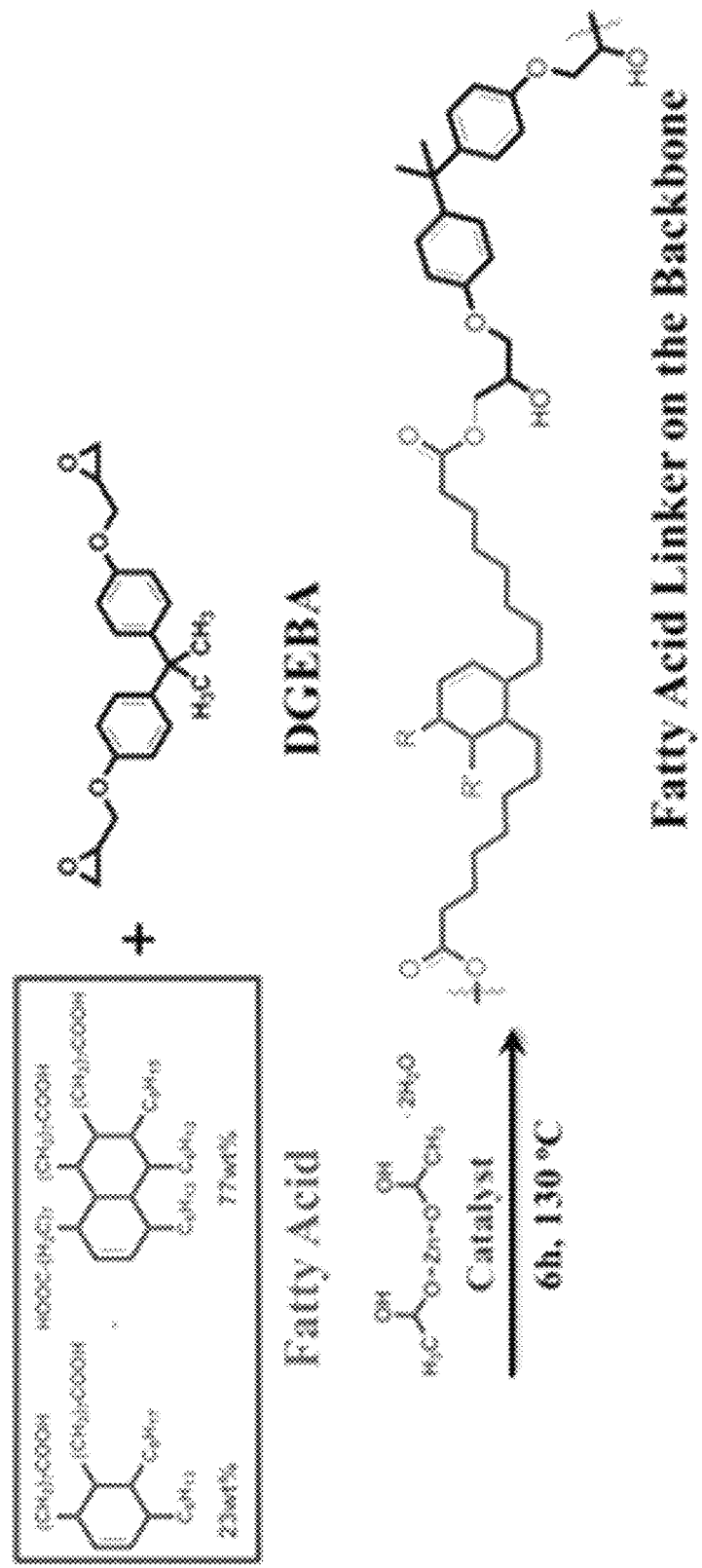
FIGS. 17A-17E demonstrate the dissolution and repolymerization of the epoxy thermosets in EG solvent.

The recycling method for CFRPs was demonstrated using an epoxy based thermosetting polymer. FIG. 17A depicts the formation of fatty acid linkers on the backbone of the polymer chains during polymerization, where the fatty acid linker is the reaction derivative from the epoxy/fatty acid reaction. In the previous example, the material's thermomechanical properties and malleability were tested. It was shown that at 180° C., which is ~150° C. above the glass transition temperature $T_g$ (~30° C.), the epoxy can relax the internal stress by 80% within 30 min due to the transesterification BERs. Yet at low temperature, the epoxy behaves like traditional thermosetting polymers. Since the alcohol solvent is expected to participate in the BERs at high temperature, we will use ethylene glycol (EG) due to its relatively high boiling point (197.3° C.)

Dissolution and Repolymerization of Epoxy Thermosets

Figure 17B:
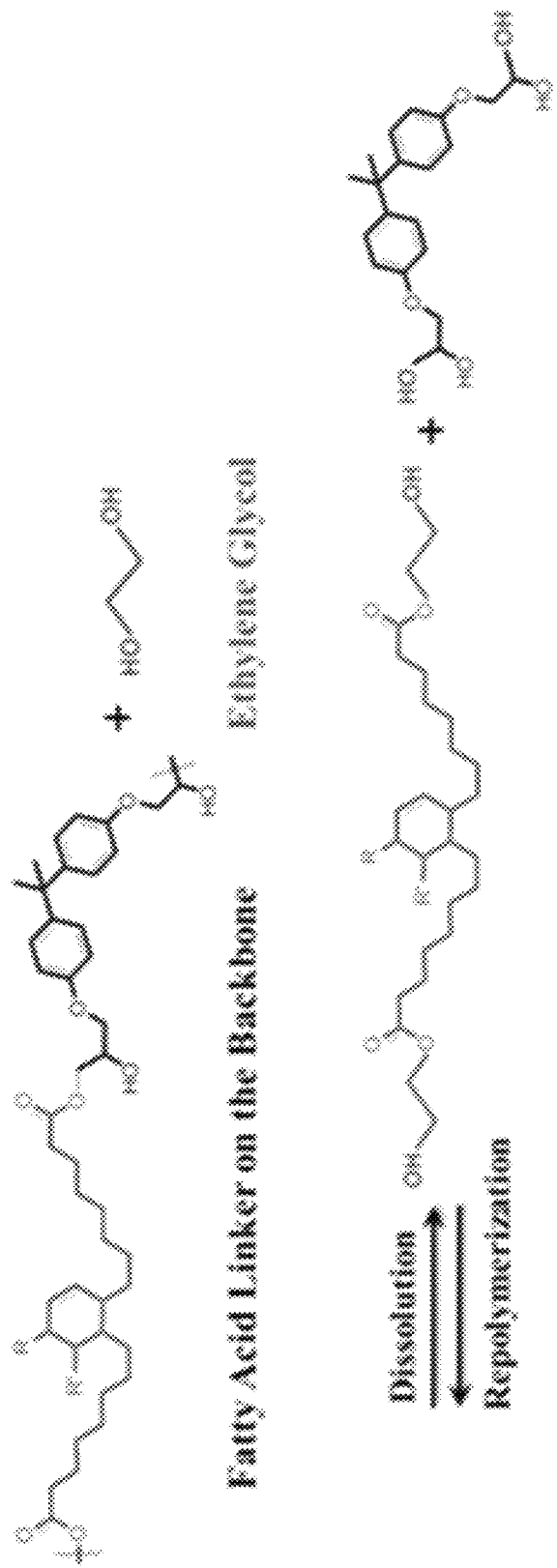

The developed method for recycling CFRPs relies on the dissolution and repolymerization of epoxy thermoset in the EG solvent via transesterification at high temperature; it is illustrated in FIG. 17B. Transesterification includes the process of exchanging the organic group of an ester with the organic group of an alcohol. When a piece of CAN epoxy is immersed in the solvents, the hydroxyl group in EG participates in transesterification reactions; since EG molecules are small and are not linked to long chain polymers, they effectively break the long polymer chains into small sections. It should be noted that the reverse reaction, where an EG molecule is regenerated (i.e. the repolymerization reaction in FIG. 17B), can also occur; but when EG is in excess amount, the dissolution reaction dominates. Therefore, when sufficient EG solvent is provided, the dissolution event starts at the polymer surface and proceeds as the broken chain segments diffuse away from the polymer-solvent interface. Eventually, the epoxy network can be fully dissolved. However, this will change if the reactions are conducted in an environment where EG solvent tends to evaporate. There, the EG solvent will leave the solution, leaving the repolymerization reaction shown in FIG. 17B to dominate. This means that the dissolved thermoset network will be polymerized again at a higher temperature when the EG molecules are gradually evaporated out.

While it is straightforward to conjecture that a full dissolution can be eventually realized with sufficiently long period of soaking in a sufficient amount of alcohol solvent, we are interested in examining how fast a given piece of CAN could be dissolved and the minimum amount of EG solvent we should use. The dissolution rate of epoxy thermosets in the EG solvent is determined by the following processes: the diffusion of EG molecules into the polymer network, the breaking and reforming of polymer chains due to the transesterification, and the diffusion of broken chain segments into the solvent. While the kinetics of all these three processes depend on the heating time and temperature, the diffusion processes also depend on the sample's dimensions. As a starting point, all the epoxy samples under test have the same dimension (11.2 mm×6 mm×3 mm). Besides, the dissolution temperature is set to be 180° C. in all cases. The temperature dependent dissolution rate can be easily extrapolated according to the kinetics of the aforementioned processes. For example, it is well known that the diffusivity in solids and liquids can be well predicted by the Arrhenius and the Stokes-Einstein equations respectively. The kinetics of the transesterification BER follows an Arrhenius type time-temperature superposition.

Figure 17C:
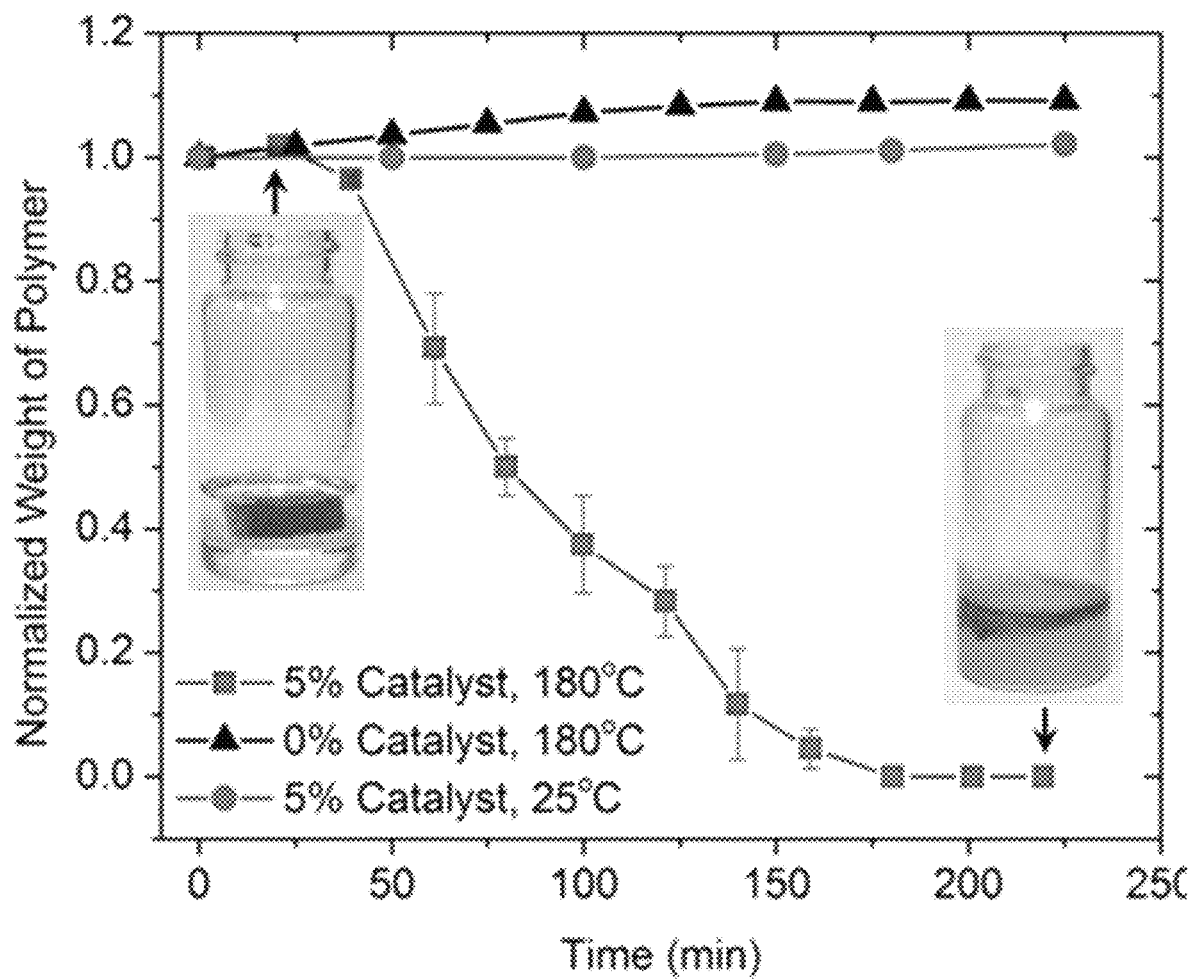

Two groups of dissolution tests were performed. In the first group of experiments, epoxy samples with 5 mol % catalyst (see the Materials Section for details) were immersed in 3 g EG solvents and their weights were measured at different time points. To avoid the evaporation of EG, the container was sealed when it was heated at high temperature. FIG. 17C plots the average weight of the epoxy samples (normalized by the initial weight of epoxy) as a function of soaking time in EG at 180° C. It is seen that the epoxy block starts to dissolve at ~25 min of soaking and can be fully dissolved after ~160 min. In contrast, if there is no BER involved in the epoxy network, for example if no catalyst was present or if the test was conducted at low temperature (25° C.), no dissolution was observed in the samples even after being immersed in the solvent for 4 hours. Specifically, the epoxy sample without catalyst was seen to swell ~4 wt % of EG after being heated at 180° C. for 4 hours.

Figure 17D:
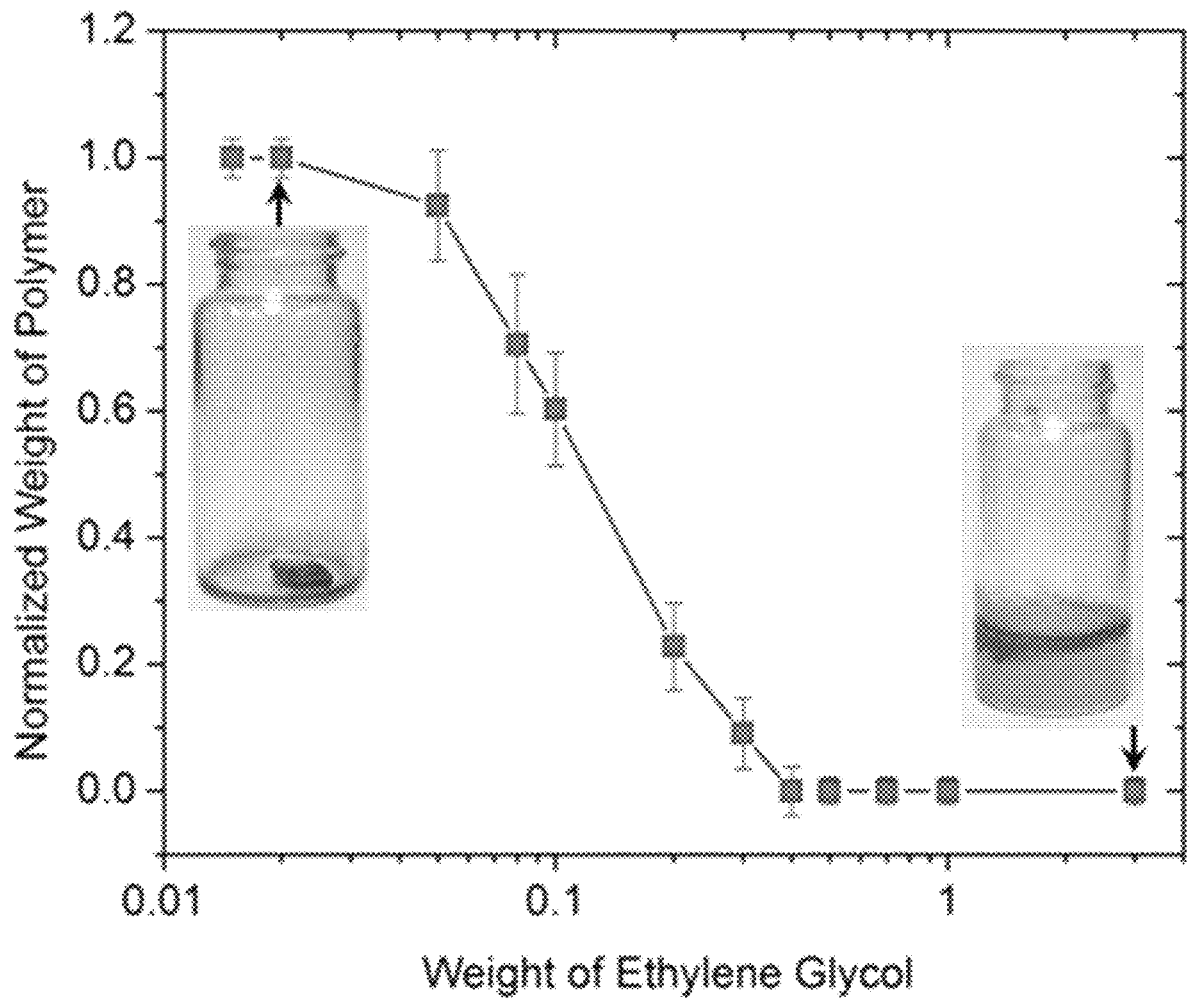

In the second group of experiments, epoxy samples were immersed in different amounts of EG solvent, while the soaking time was set to be 4 h in each case. FIG. 17D shows the normalized weight of epoxy as a function of EG weight (normalized by the initial weight of epoxy). It is seen that the minimum amount of EG for a full dissolution of 1 g epoxy is ~0.4 g. This is consistent with the following stoichiometry consideration: For 1 g of epoxy with $5.59 \times 10^{-3}$ mol ester group, there should be at least $5.59 \times 10^{-3}$ mol EG molecules to break all the polymer chains for full dissolution, which equals to 0.342 g.

Figure 17E:
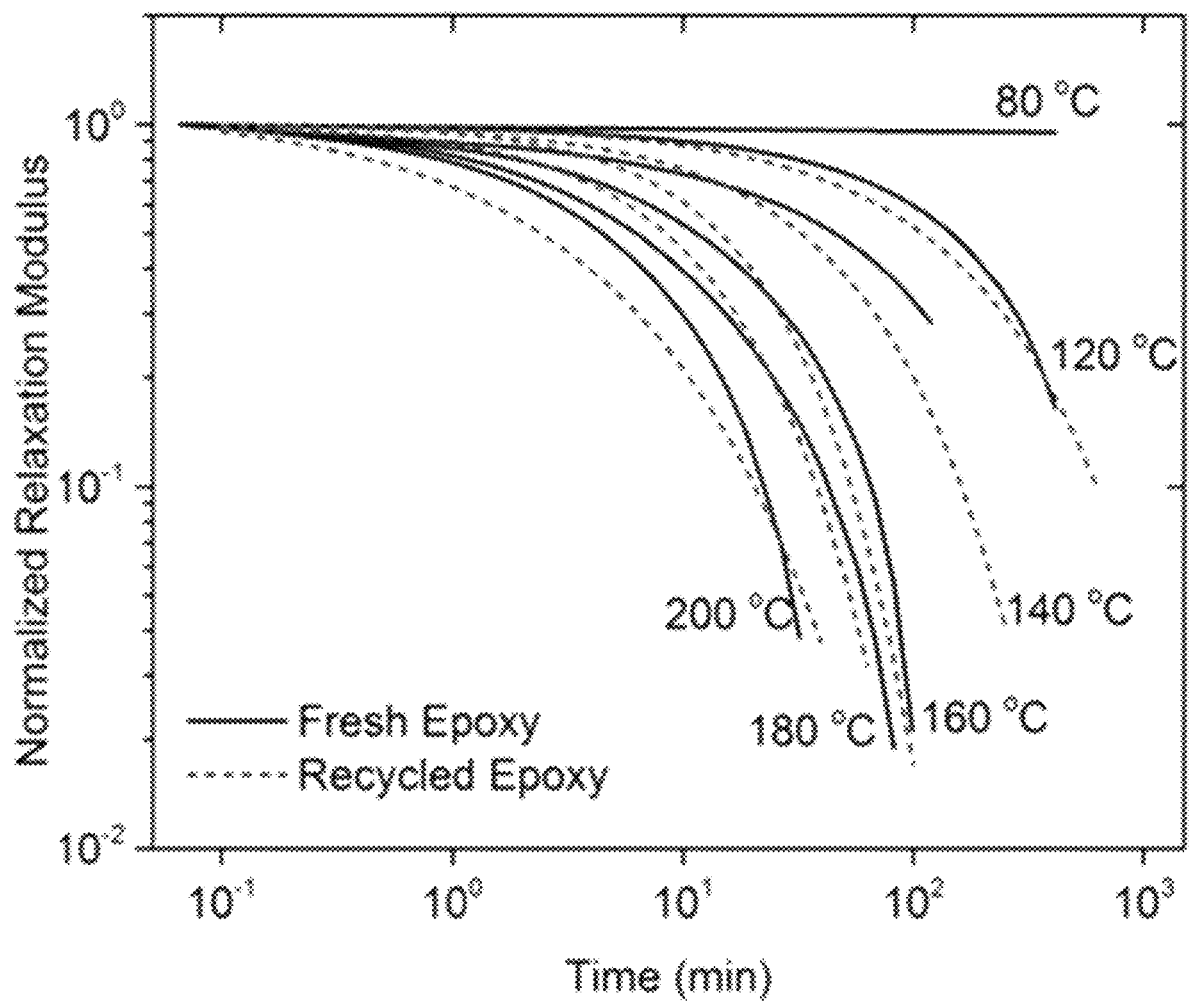

As illustrated in FIG. 17B, the depolymerized thermoset network can be polymerized again when the EG molecules are allowed to evaporate. In this study, we focus on the thermomechanical properties of repolymerized epoxy, and compare them with those of fresh material. During the experiments, the dissolved polymer solution was heated at 180° C. for another 10 h, where the container was unsealed to allow the evaporation of EG. FIGS. 21A-21B show the comparison of glass transition and stress-strain behavior between the fresh and repolymerized epoxy. FIG. 17E shows the BER-induced stress relaxation behaviors at different temperatures (120° C., 140° C., 160° C., 180° C. and 200° C. respectively). The results show that the repolymerized epoxy has nearly the same thermomechanical properties and malleability as those of the fresh epoxy. The epoxy can be fully recycled by using the EG solvent.

Repairing of Composite

In the CFRPs, polymer matrix is mainly used to maintain the shape of composites, transfer load to the embedded carbon fiber, and protect the fiber from the environment. Although fiber damage is possible (such as at the site of impact), matrix damage in the form of delaminations, cracks, surface abrasion and corrosion is more common in engineering applications. Traditional methods to repair the polymer matrix of CFRPs, such as the patch repair, scarf repair and resin injection, usually require high skill and might change the weight and geometry of the composite. Besides, they are not efficient for repairing damage in the form of cracks that form deep within the structure where detection is difficult and repair is almost impossible. Recent advances in CANs open an avenue to develop self-healing thermosetting polymers, where polymer chains can be re-connected on the interface for welding. This further enables the full repair of thermosetting polymers. For example in our previous work, polymer powder was applied to repair broken thermosetting polymers (Yu, K., et al., RSC Advances, 2014. 4(20): p. 10108-10117). However, for these self-healing materials, pressure is necessary to guarantee a good contact of interfaces during the repair, which would be challenging in most engineering applications, especially when the CFRPs are in service.

Figure 18A:
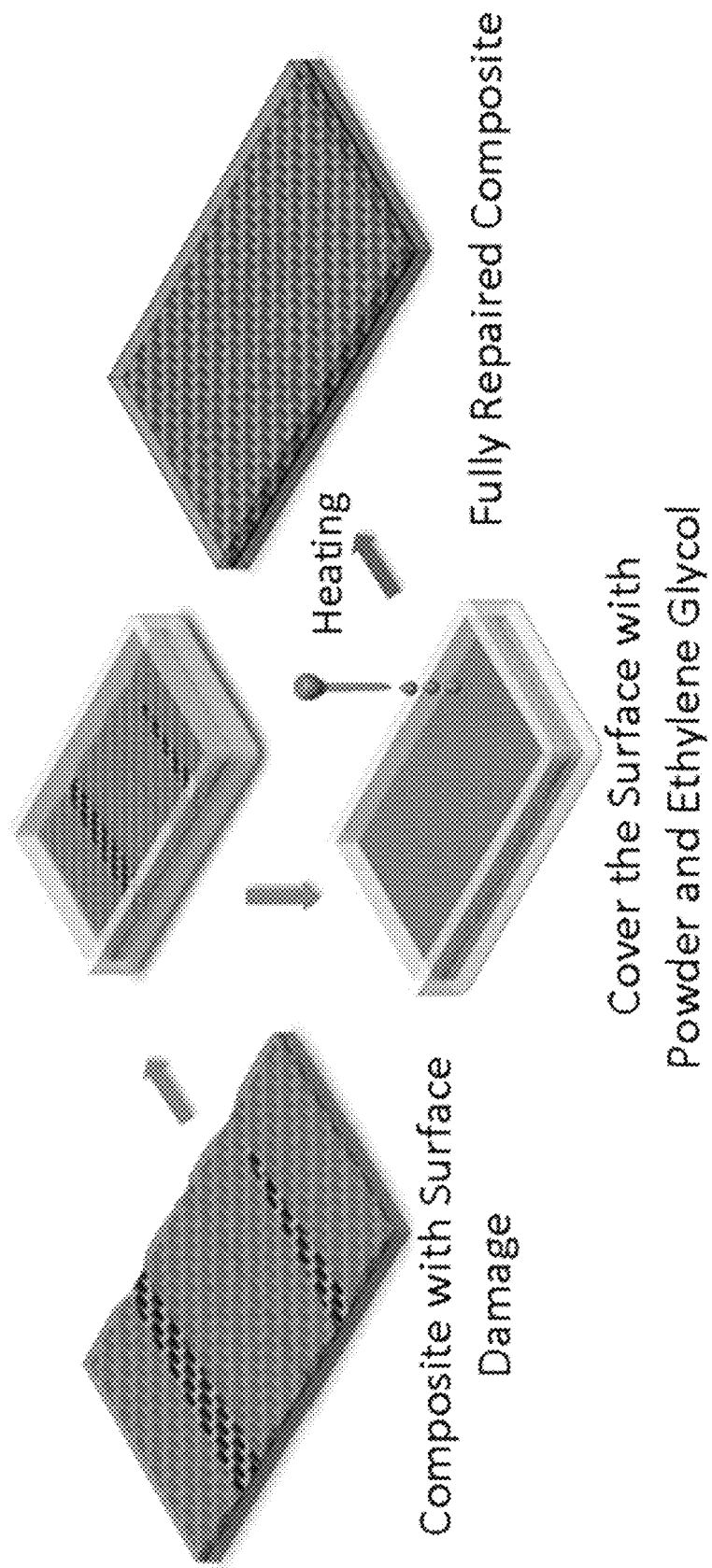
FIGS. 18A-18B demonstrate an exemplary process for repairing CFRP composite with surface damage.

Here, we demonstrate the repairability of the CFRP composite based on the mechanism of polymer dissolution and repolymerization, where only heating is required to fully repair the composite while obtaining the same dimensions and mechanical properties. The repairing procedure is illustrated in FIG. 18A. Initially, a fresh composite was manually scratched on the polymer surface to render a damage area. The weight loss of the CFRP was recorded. Then the sample was embedded into a mold that fit the composite's dimensions. The damaged surface was covered by CAN powder whose weight equaled the weight lost during the scratching. Sufficient EG solvent was instilled into the mold, and the temperature was ramped to induce transesterifications. During heating, the polymer powder was be dissolved, diffused together and repolymerized with the polymer matrix. Eventually, the damaged area on the composite surface was repaired. It should be noted that in this study, the composite repair only involves the repair of the polymer matrix, while the embedded carbon fiber is intact. We start with the CFRP composite with surface damages. The repair of damages in the form of delaminations and cracks can be readily implemented.

Figure 18B:
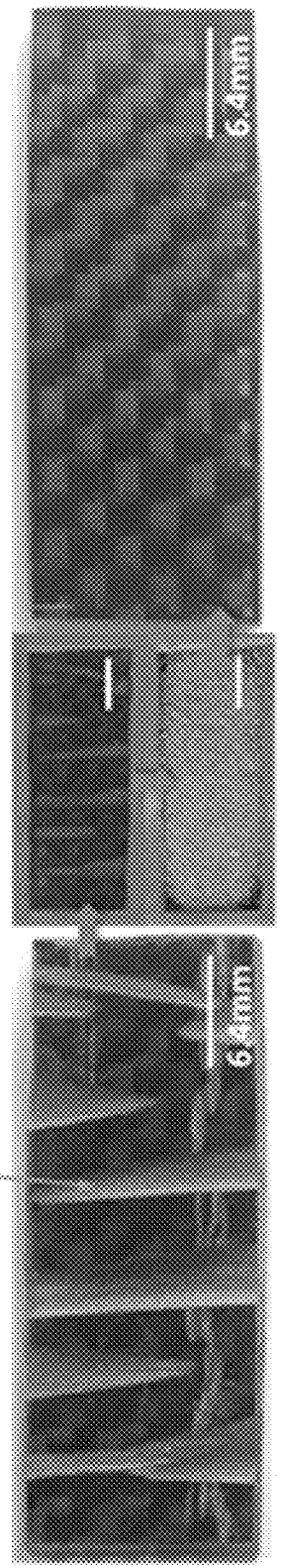

FIG. 18B shows experimental pictures obtained during the composite repair. The initial fresh composite sample (25.4 mm×10.8 mm×1.88 mm) consists of ~0.66 g epoxy matrix and ~0.11 g carbon fiber. When manually scratching the composite surface on sandpaper, caution was taken to avoid any damages to the carbon fiber fabric. After scratching, the weight loss of the composite was determined to be ~0.16 g. The composite was then transferred to a mold, and 0.16 g (same amount as the weight loss) of epoxy powder, with an average size of ~20 um to ~120 um, was refilled to cover the damaged surface. According to the analysis in Section 2.1, at least ~0.055 g EG solvent (34.2 wt % of the epoxy) was needed to dissolve the refilled epoxy powder, and ~0.23 g was needed to dissolve all the epoxy material in the mold. Indeed, for good repair performance, in addition to fully dissolving the powder, excessive EG solvent is necessary to depolymerize the surface layer of the damaged CFRP, so the repolymerized epoxy can bond well with the remnant bulk epoxy. However, it is not necessary to dissolve all the epoxy material in the mold for the purpose of repair. In our experiments, 0.1 g, 0.15 g, and 0.2 g EG solvent was respectively instilled into the mold, and FIG. 18B shows the case of 0.15 g EG being applied. Subsequently, the mold was covered by a glass slide to prevent evaporation of the EG solvent. After being heated at 180° C. for 4 hours, which is a sufficiently long time to dissolve the epoxy powder (according to FIG. 17C), the glass slide was removed to facilitate evaporation and repolymerization. Finally, the CFRP composite with surface damage was fully repaired after being heated for another 10 hours, In our demonstrated repair routine, the application of EG avoids the use of pressure when repairing the CFRP composites, which is easier to implement in real engineering applications. The mechanical properties of the repaired composite were examined by using uniaxial tension tests on the MTS machine. We observed that the three repaired composites with different amounts of EG being applied exhibit almost identical mechanical properties. The stress-strain curves of the repaired CFRPs will be compared with those of fresh composites and recycled composites as shown in the next section.

Recycling the CFRP Composite

Figure 19A:
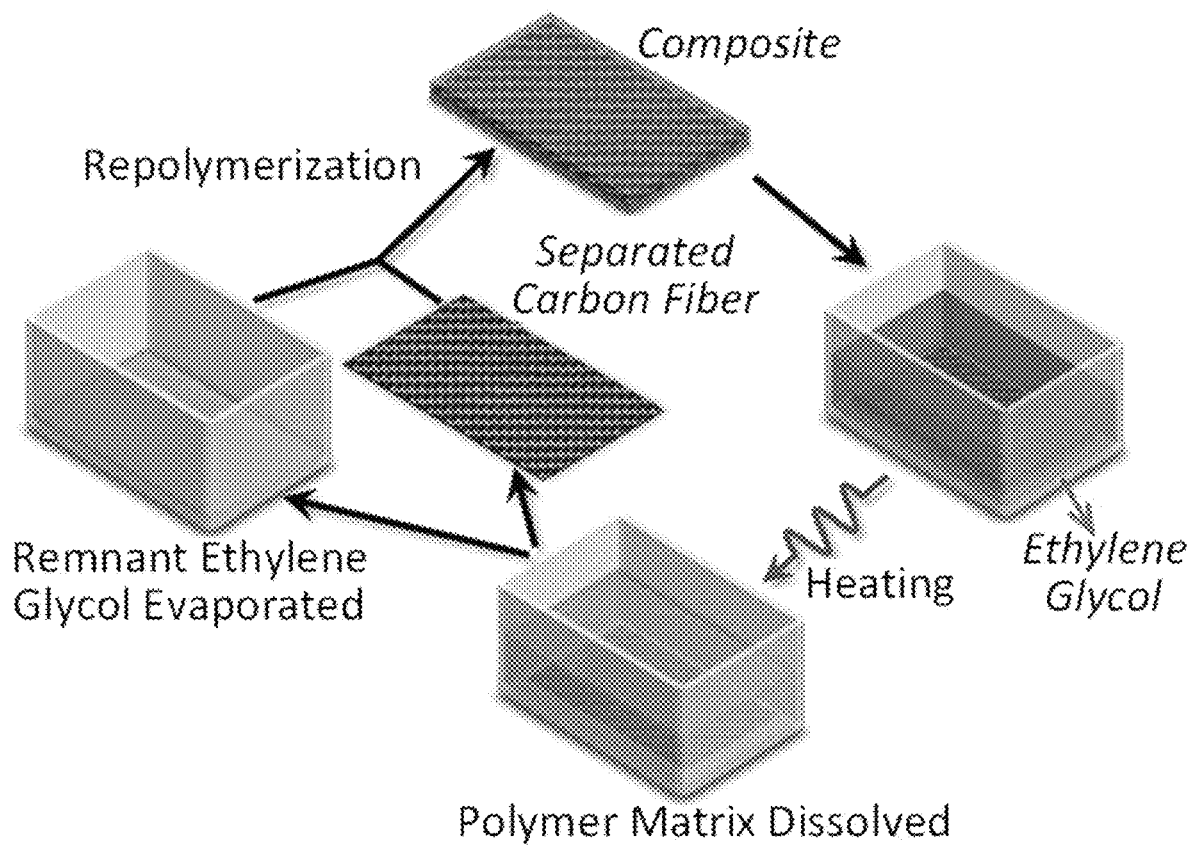
FIGS. 19A-19C demonstrate an exemplary closed-loop recycling paradigm for CFRP composite.

The closed-loop recycling paradigm of the CFRP composite is illustrated in FIG. 19A. A fresh composite is first bathed in EG solvent at high temperature. The matrix epoxy is gradually dissolved, and the clean fiber fabric can be separated. Subsequently, the polymer solution is further heated to evaporate the EG solvent. Since the alcohol solvent and dissolved polymers are not compatible, it is easy to inspect the amount of excessive EG. Finally, both the reclaimed fiber fabric and the polymer solution are put into a mold that fits with the fiber fabric dimension. A new composite is remanufactured after repolymerizing the polymer solution.

Figure 19B:
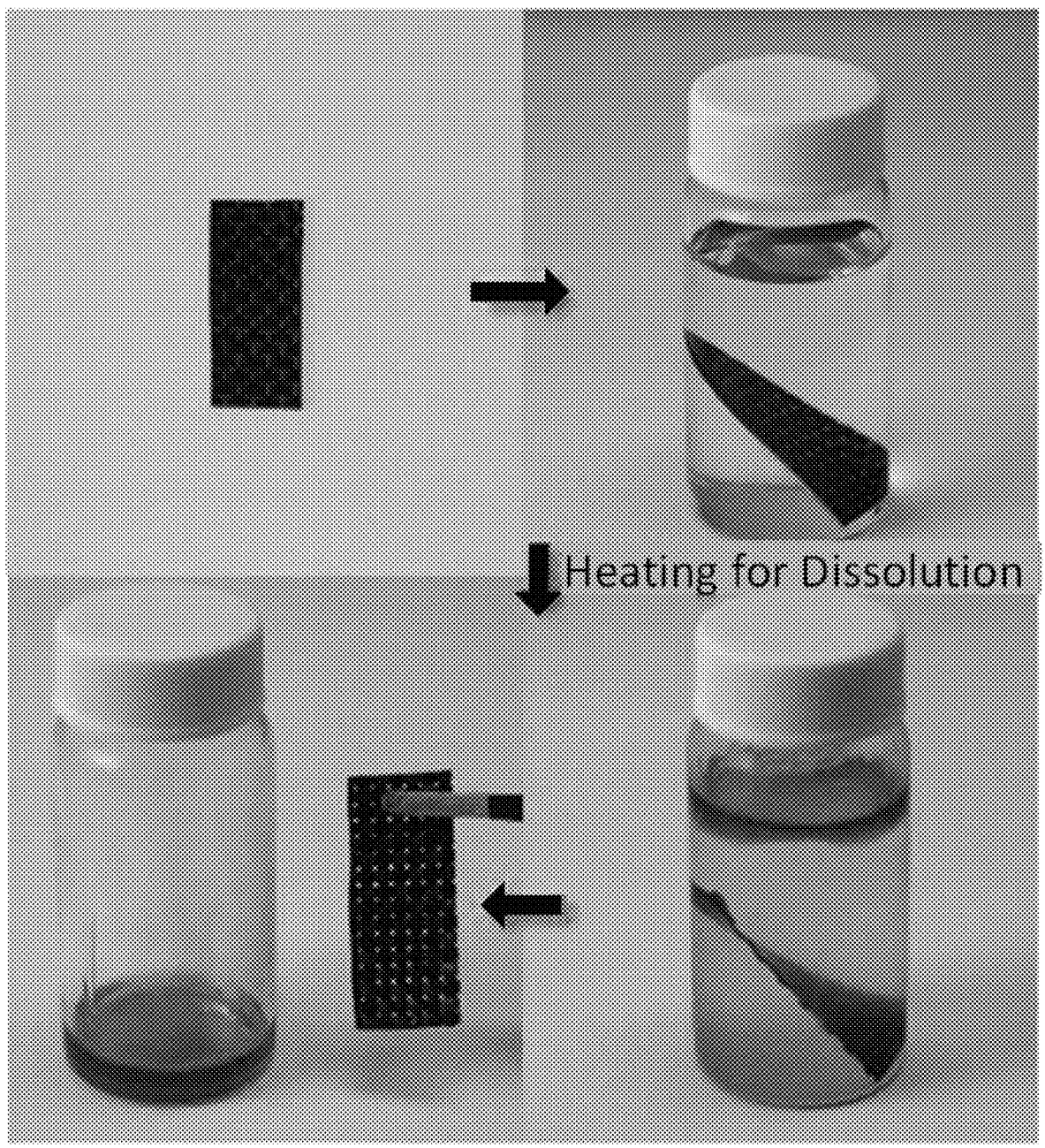
Figure 19C:
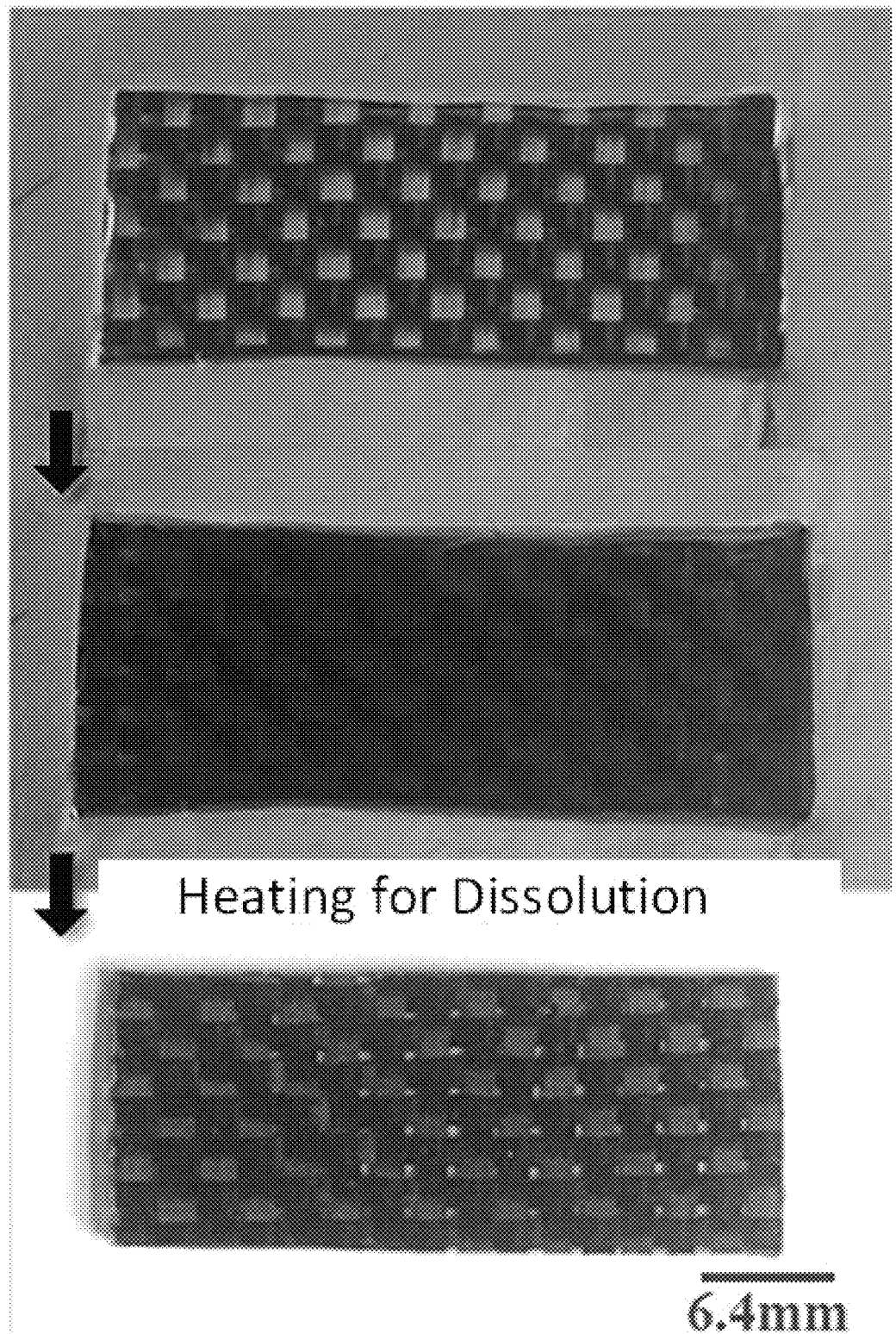

FIGS. 19B-19C show pictures obtained during an experiment that follows the procedure illustrated in FIG. 19A. The initial fresh composite has a dimension of 27.1 mm×10.8 mm×1.88 mm, and consists of 0.7 g epoxy matrix and 0.118 g carbon fiber. After immersing the composite in 20.9 g EG solvent at 180° C. for 4 h, the matrix was fully dissolved, and the clean carbon fiber was reclaimed. Further heating the dissolved polymer solution for another 3 hours evaporated the excessive EG solvent (see FIG. 19B). Subsequently, this polymer solution was transferred into a mold with the reclaimed fiber laid in the middle, as shown in FIG. 19C. After being heated at 180° C. for ~10 hours, the epoxy was repolymerized, and the first generation recycled CFRP composite was fabricated. The weight of the recycled composite is 0.805 g, which is slightly smaller than that of the fresh one (0.818 g) because of loss of epoxy resin during the transfer. This recycling procedure was repeated for multiple times and the stress-strain behavior of each generation of recycled CFRP composite was measured on the MTS machine at room temperature.

Figure 20A:
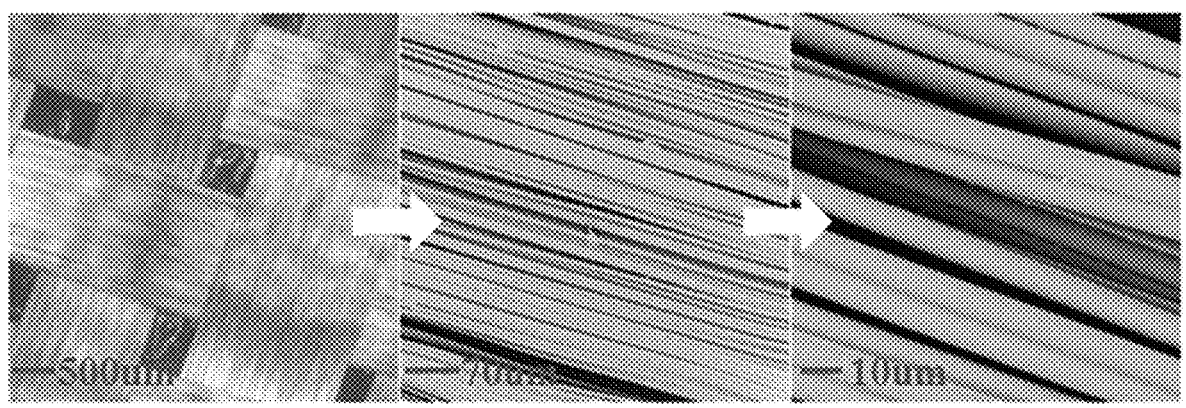
FIGS. 20A-20E compare the fresh and reclaimed carbon fibers.
Figure 20B:
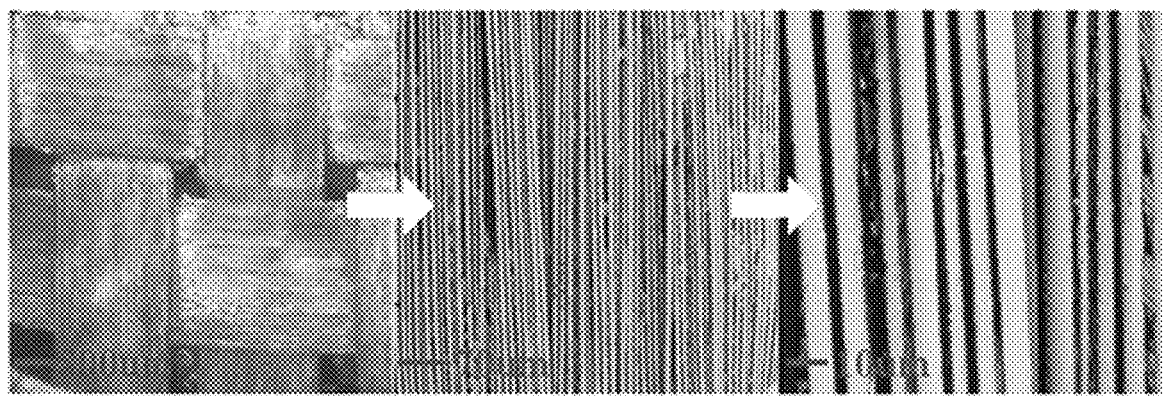

The microscale morphology of both fresh and reclaimed fiber was observed by using a Scanning Electron Microscope (SEM, Model Phenom Pro, PhenomWorld, Netherlands), and the imagines are shown in FIGS. 20A-20B. Before the SEM, the fiber fabric was coated with a thin gold film on a Sputter Coater (Mode 108 Auto, Cressington Scientific Instruments Ltd., Watford, UK). The thickness of the gold film was around 100 nm. As shown in the figure, the reclaimed carbon fiber retains the same fabric pattern as the original one. Besides, there is no visible damage or alternation in fiber dimension. It is also seen that some residual polymer solution is attached on the fabric surface, so the weight of the reclaimed fiber (0.121 g) is slightly higher than that embedded in the fresh composite (0.118 g).

Figure 20C:
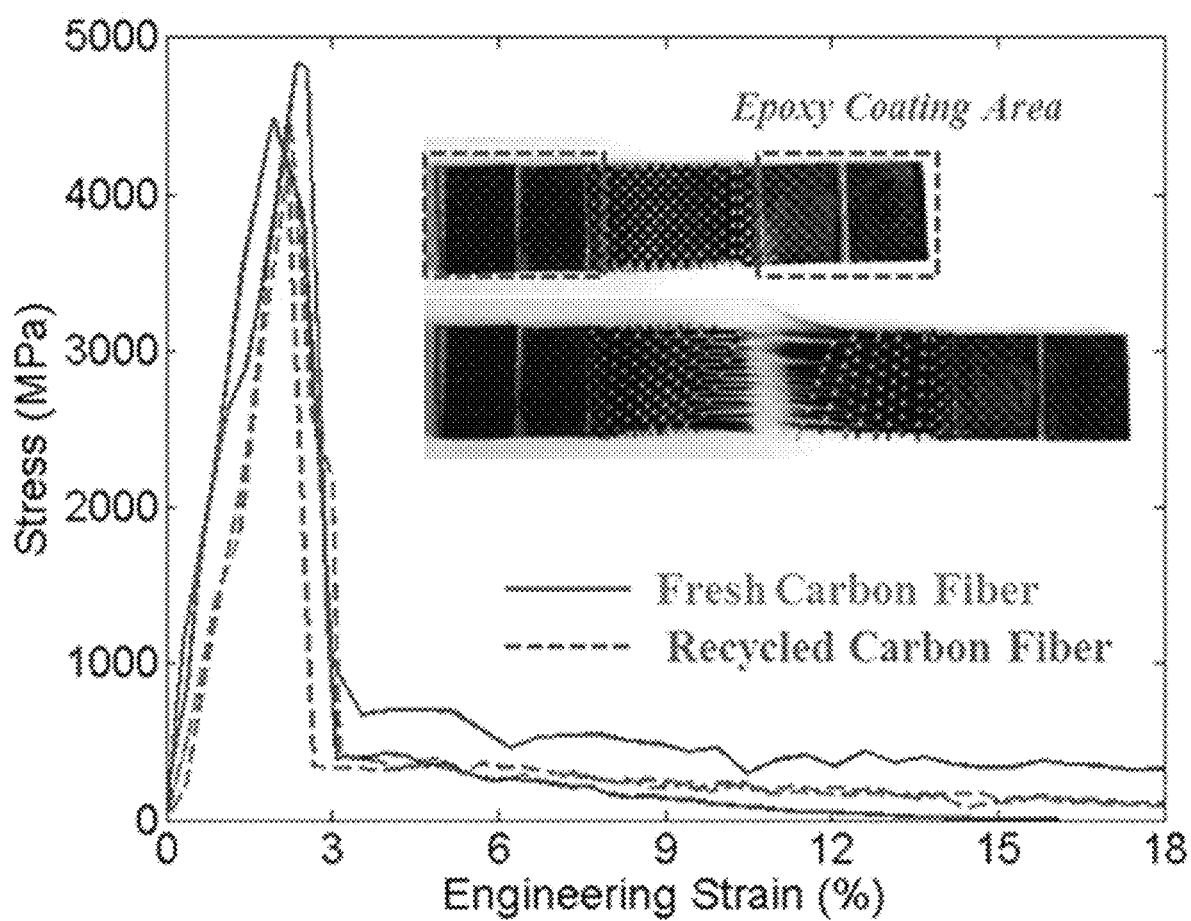

Uniaxial tension tests were applied to examine the mechanical properties, such as modulus and strength, of both fresh and reclaimed carbon fiber. The experimental results are shown in FIG. 20C. Here, all the fiber fabrics were cut into the same dimension (115.6 mm in length and 22.3 mm in width), with 11 bundles along the stretching direction. Since the fiber fabrics are plain woven ones, we expect minimum influence on the uniaxial tension behavior from the fiber bundles vertical to the stretching direction.

The tests were performed on the MTS Machine with a load capacity of 10 kN, where the fiber fabric was stretched at a constant displacement rate until it fully broke. The separation rate of the clamps was set to be 2.3 mm/s in each case, and the corresponding strain rate was 2.4%/s. The inset images of FIG. 20C show the appearance of the fiber fabric before and after tests. Specifically, the two ends of the fiber fabrics were embedded in epoxy matrix (~3 mm in thickness), which facilitates easy clamping on the MTS machine. The average stress in each carbon fiber can be estimated according to the fabric architecture: there are 1000 T300 carbon fibers in each fiber bundle, and the diameter of each fiber is 7 um.

The typical stress-strain curves of both fresh and reclaimed fiber are shown in FIG. 20C. Two samples from fresh fibers and from reclaimed fibers are shown in FIG. 20C, respectively. As the fiber fabric stretches, the stress is seen to ramp linearly with strain until a critical value is reached. Then the stress drops dramatically, which indicates the breaking of a majority of carbon fibers. It is shown that the stress-strain curves of both fresh and reclaimed fiber fabrics agree well. For the reclaimed carbon fiber, the measured modulus (223 GPa±16.3 GPa) and strength (4.4 GPa±0.53 GPa) is very close to those of fresh ones (239 GPa±11.7 Gpa, 4.2 GPa±0.19 Gpa respectively), i.e. the reclaimed fibers retained 97% of the modulus and 95% of the tensile strength of the original fibers. The results in FIGS. 20A-20C demonstrate that the reclaimed carbon fiber retains the same dimension and mechanical properties, which results from the friendly operational conditions being applied during recycling: the applied EG solvent is non-corrosive to the carbon fiber even at high temperatures. In addition, the recycling temperature (180° C.) is far below the thermal decomposition temperature of T300 carbon fiber that was reported before (up to ~500° C.), below which the fiber still retains excellent mechanical and dimensional stability.

Figure 20D:
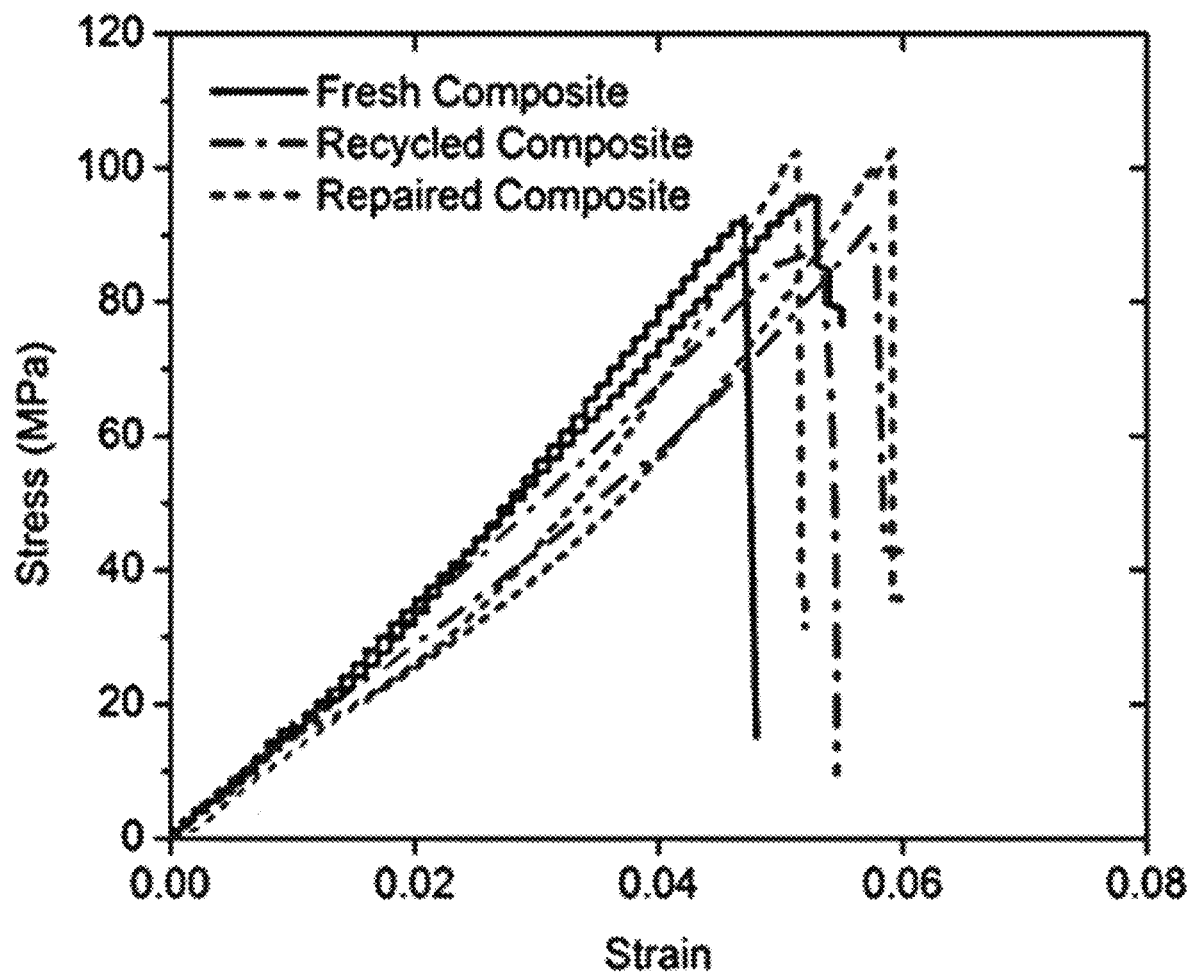
Figure 20E:
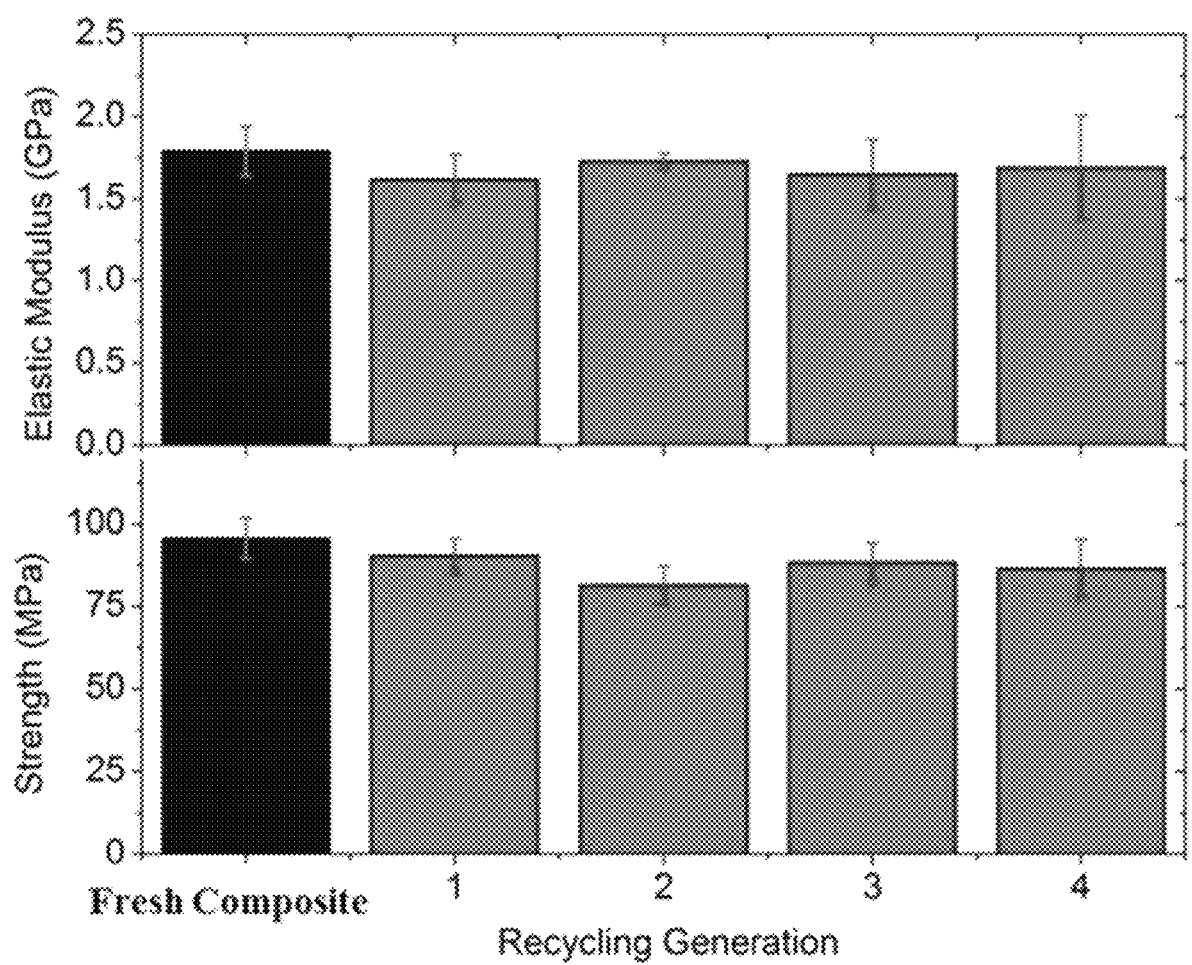

FIG. 20D plots the room-temperature stress-strain curves of fresh composite, first generation recycled composite, as well as the repaired composite discussed in Section 2.2. The good consistency shown in the figure indicates that the mechanical properties of the repaired and recycled CFRP can be fully recovered. Specifically, since the ultimate strength of CFRP composite is mainly determined by the carbon fiber, the agreement in the material strength further proves that the carbon fiber fabric remains intact during the recycling. Besides, a single piece of CFRP composite can be recycled for multiple times. As shown in FIG. 20E, each generation of recycled composite maintains the same level of the elastic modulus (within the first 2% stretch) and ultimate strength, which indicates good repeatability of the developed recycling method.

Discussion

An environmentally and economically favorable recycling method for the CFRP composites is presented. This approach has the advantage of low cost, easy implementation, zero pollution and full recyclability; therefore, it will greatly facilitate waste management and environmental protection.

The CFRP composite studied in this example is flexible due to the low transition temperature of the epoxy matrix ($T_g = \sim -30°$ C.). However, in many engineering applications, stiffer composites are preferred as structural materials. The method can be applied to recycle other types of epoxy composites with different thermomechanical properties. Indeed, the possibility can be easily demonstrated after considering previous works on the CAN epoxy, where fatty acid is replaced by the glutaric anhydride to crosslink the network. Since the anhydride hard linker has shorter backbone chains of carbon atoms than the fatty acid linker shown in FIGS. 17A-17B, the resulting network is stiffer with higher modulus, and the $T_g$ is elevated to $\sim 63°$ C. Even though the thermomechanical properties are tuned, the underlying dynamic chemistry is unchanged, and the network is still capable of transesterification type BERs. In terms of this, when using such stiffer epoxy as binder, the CFRP composite can still be fully recycled and repaired by using the developed method.

In addition to the ester-containing epoxy, the recycling paradigm can be readily extended to other types of thermoset, as long as a proper small molecule solvent is chosen to break the polymer chains from backbone, and to subsequently evaporate away during the repolymerization step. For example, epoxy thermosets with dynamic C—S bonds can be dissolved by using a thiol-containing solvent (2-mercaptoethanol solvent). Polyimide thermosets with dynamic C—N bonds can be fully dissolved and recycled using amine solvent.

Conclusions

A method to fully recycle fiber reinforced epoxy composites is demonstrated. After immersing the composite in solvent, small molecules with proper functional groups will participate in BERs with the CAN matrix upon stimuli, and break the long polymer chains into small segments. The resulted clean fibers, with the same dimensions and mechanical properties as fresh ones, can be reclaimed after the polymer matrix is fully dissolved. The reclaimed fibers retain 97% of the modulus and 95% of the tensile strength of the original fibers. Both the recycled fiber and the dissolved polymer solution can be reused to fabricate a new generation of composite, which enables a closed-loop near 100% recycling paradigm. We demonstrated the effectiveness of the recycling method by using an epoxy based CFRP. The dissolution rate of this epoxy in EG solvent was first examined, and the minimum amount of EG to fully dissolve the epoxy was revealed. By using the EG solvent, the epoxy based CFRP was shown to be fully repaired and recycled. Compared with traditional recycling methods, this new method mainly involves simple heating and usage of a proper solvent that is environmentally friendly and easy to manage. In addition, there is no damage in either the epoxy or the fiber during the recycling. The recycled and repaired composite can exhibit the same or nearly the same mechanical properties as fresh ones.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed:

1. A method of repairing a surface of a thermoset polymer or a composite thereof, wherein the thermoset polymer or composite thereof comprises a thermoset polymer matrix having a plurality of exchangeable covalent bonds, and
   wherein the surface comprises an imperfection;
   the method comprising:
   (A) applying a powder of the thermoset polymer to the surface of the thermoset polymer or composite thereof,
   (B) contacting the surface of the thermoset polymer or composite thereof and the powder with a small molecule alcohol in the presence of a catalyst at a first elevated temperature for a first period of time sufficient to dissolve the powder and at least a portion of the thermoset polymer matrix at the surface of the thermoset polymer or composite thereof, wherein the catalyst is selected from the group consisting of a lead oxide, a lead sulfide, a lead hydroxide, a plumbite, a plumbate, a lead carbonate, a copper compound, a silver compound, a gold compound, a zinc compound, a cadmium compound, an iron compound, a cobalt compound, a salt thereof, and a combination thereof, and
   (C) evaporating the small molecule solvent at a second elevated temperature for a second period of time sufficient to re-polymerize the thermoset polymer matrix incorporating the thermoset polymer from the powder to repair the imperfection;
   wherein the small molecule solvent has a boiling point above a bond exchange reaction (BER) activation temperature for the plurality of exchangeable covalent bonds.

2. The method according to claim 1, wherein the small molecule alcohol is a polyol.

3. The method according to claim 2, wherein the small molecule alcohol is selected from the group consisting of ethylene glycol, propylene glycol, 1,3-butanediol, diethylene glycol, 2-ethyl-hexanol, and benzyl alcohol.

4. The method according to claim 1, wherein the thermoset polymer matrix comprises an anhydride cured epoxy, an unsaturated polyester, or a combination thereof.

5. The method according to claim 1, wherein the plurality of exchangeable covalent bonds are sulfide bonds and the small molecule solvent is a small molecule thiol.

6. The method according to claim 5, wherein the small molecule thiol is mono-thiol or poly-thiol solvents.

7. The method according to claim 5, wherein the small molecule thiol is selected from the group consisting of 2-mercaptoethanol, dithiothreitol, 3-mercaptopropane-1,2-diol, butanethiol, or 1,3-propanedithiol.

8. The method according to claim 5, wherein the thermoset polymer matrix comprises a dithiodianiline cured epoxy, a disulfide based epoxy, or a combination thereof.

9. The method according to claim 1, wherein the plurality of exchangeable covalent bonds are imide bonds and the small molecule solvent is a small molecule amine.

10. The method according to claim 9, wherein the small molecule amine is mono-amine or poly-amine solvent.

11. The method according to claim 9, wherein the small molecule amine is selected from the group consisting of hexylamine, 2-ethyl-1-hexylamine, 2-amino-5-methyl-hexane, ethylenediamine, diethylenetriamine.

12. The method according to claim 9, wherein the thermoset polymer matrix comprises a polyimine crosslinked by tris(2-aminoethyl)amine with a spacer monomer of diethylene triamine, ethylene diamine, or a combination thereof.

13. The method according to claim 1, comprising repairing a surface of a thermoset polymer composite, wherein the thermoset polymer composite comprises a reinforcing material dispersed within the thermoset polymer matrix.

14. The method according to claim 13, wherein the reinforcing material comprises a material selected from the group consisting of a glass fiber, a carbon fiber, an aramid fiber, a boron fiber, a graphite, and a combination thereof.

15. The method according to claim 13, wherein the reinforcing material has a thermal decomposition temperature of about 500° C. or less.

16. The method according to claim 13, wherein the reinforcing material has a structure selected from the group consisting of a continuous fiber, a cloth, a fabric, a yarn, and a tape.

17. The method according to claim 1, wherein the small molecule solvent has a molecular weight of about 50 g/mol to 150 g/mol.

18. The method according to claim 1, wherein the boiling point of the small molecule solvent is about 250° C. or less.

19. The method according to claim 1, wherein the bond exchange reaction (BER) activation temperature is about 120° C. or higher.

20. The method according to claim 1, wherein the thermoset polymer matrix comprises a plurality of ester bonds.

* * * * *